(12) United States Patent
Xing et al.

(10) Patent No.: US 12,382,501 B2
(45) Date of Patent: Aug. 5, 2025

(54) RANDOM ACCESS METHOD AND APPARATUS

(71) Applicant: HUAWEI TECHNOLOGIES CO., LTD., Guangdong (CN)

(72) Inventors: Shuangshuang Xing, Shenzhen (CN); Yiqun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 673 days.

(21) Appl. No.: 17/707,388

(22) Filed: Mar. 29, 2022

(65) Prior Publication Data

US 2022/0225425 A1 Jul. 14, 2022

Related U.S. Application Data

(63) Continuation of application No. PCT/CN2020/118751, filed on Sep. 29, 2020.

(30) Foreign Application Priority Data

Sep. 30, 2019 (CN) .......................... 201910945948.7

(51) Int. Cl.
*H04W 74/0833* (2024.01)
(52) U.S. Cl.
CPC ............................. *H04W 74/0833* (2013.01)
(58) Field of Classification Search
CPC ... H04L 27/2602; H04L 5/001; H04L 5/0044; H04L 5/0048; H04L 5/008; H04W 72/0453; H04W 74/002; H04W 74/0833
See application file for complete search history.

(56) References Cited

U.S. PATENT DOCUMENTS

| 11,343,735 B2 * | 5/2022 | Cirik | .................. | H04B 7/06964 |
| 11,728,957 B2 * | 8/2023 | Loehr | .................... | H04W 80/02 370/329 |

(Continued)

FOREIGN PATENT DOCUMENTS

| CN | 109803396 A | 5/2019 |
| CN | 109982430 A | 7/2019 |

(Continued)

OTHER PUBLICATIONS

Provisional U.S. Appl. No. 62/796,854 (Year: 2019).*

(Continued)

*Primary Examiner* — Dung B Huynh
(74) *Attorney, Agent, or Firm* — Fish & Richardson P.C.

(57) ABSTRACT

Embodiments of this application disclose a random access method and an apparatus. The method includes: A terminal device performs first-type random access in a first bandwidth part, where the first bandwidth part is an active uplink bandwidth part; the terminal device determines a first parameter, where the first parameter is duration for performing first-type random access in the first bandwidth part, or the first parameter is a quantity of times of sending a first-type random access message; and the terminal device performs random access in a second bandwidth part if the first parameter is greater than a first threshold, where the second bandwidth part is an uplink bandwidth part, and an identifier of the second bandwidth part is different from an identifier of the first bandwidth part. Through implementation of the method described in embodiments of this application, a success rate of random access can be improved, and the terminal device can access a network in a timely manner.

18 Claims, 22 Drawing Sheets

(56) References Cited

U.S. PATENT DOCUMENTS

| | | | |
|---|---|---|---|
| 11,968,713 B2* | 4/2024 | Xiong | H04W 52/146 |
| 2018/0139778 A1* | 5/2018 | Chou | H04W 76/27 |
| 2018/0288746 A1 | 10/2018 | Zhang et al. | |
| 2019/0132882 A1 | 5/2019 | Li et al. | |
| 2019/0166529 A1* | 5/2019 | Chen | H04W 74/006 |
| 2019/0254074 A1* | 8/2019 | Jeon | H04W 36/0085 |
| 2019/0306842 A1* | 10/2019 | Cirik | H04W 72/23 |
| 2020/0100298 A1* | 3/2020 | Pan | H04W 56/001 |
| 2020/0120584 A1* | 4/2020 | Yi | H04W 16/28 |
| 2020/0137821 A1* | 4/2020 | Cirik | H04W 72/1268 |
| 2020/0145089 A1* | 5/2020 | Wei | H04W 76/27 |
| 2020/0235896 A1* | 7/2020 | Lee | H04L 5/0098 |
| 2020/0245369 A1* | 7/2020 | Chen | H04W 48/16 |
| 2020/0260500 A1* | 8/2020 | Agiwal | H04W 74/006 |
| 2020/0266942 A1* | 8/2020 | Akkarakaran | H04W 74/02 |
| 2020/0288506 A1* | 9/2020 | Lei | H04W 74/0833 |
| 2020/0351946 A1* | 11/2020 | Pang | H04W 74/0833 |
| 2020/0359420 A1* | 11/2020 | Chen | H04L 5/0005 |
| 2021/0014903 A1* | 1/2021 | Zhang | H04W 56/0045 |
| 2021/0022058 A1* | 1/2021 | Islam | H04W 36/0077 |
| 2021/0022143 A1* | 1/2021 | Xiong | H04L 5/10 |
| 2021/0045124 A1* | 2/2021 | Wang | H04W 72/23 |
| 2021/0045147 A1* | 2/2021 | Zhou | H04L 5/0098 |
| 2021/0045159 A1* | 2/2021 | Lei | H04W 72/23 |
| 2021/0050666 A1* | 2/2021 | Cirik | H04W 76/38 |
| 2021/0051672 A1* | 2/2021 | Rastegardoost | H04W 74/006 |
| 2021/0058971 A1* | 2/2021 | MolavianJazi | H04B 17/318 |
| 2021/0136827 A1* | 5/2021 | Xiong | H04L 5/0094 |
| 2021/0168862 A1* | 6/2021 | Murray | H04W 74/002 |
| 2021/0274550 A1* | 9/2021 | Zhang | H04W 80/02 |
| 2021/0274555 A1* | 9/2021 | Alfarhan | H04W 72/23 |
| 2021/0298108 A1* | 9/2021 | Wu | H04W 56/0055 |
| 2021/0345424 A1* | 11/2021 | Cirik | H04W 72/23 |
| 2022/0039158 A1* | 2/2022 | Awadin | H04W 72/23 |
| 2022/0046710 A1* | 2/2022 | Zhang | H04W 74/0816 |
| 2022/0078856 A1* | 3/2022 | Jeon | H04L 1/1671 |
| 2022/0166564 A1* | 5/2022 | Babaei | H04W 76/15 |
| 2022/0173856 A1* | 6/2022 | Ko | H04L 5/0053 |
| 2022/0174750 A1* | 6/2022 | Ohara | H04L 5/0051 |
| 2022/0225430 A1* | 7/2022 | Zhang | H04W 52/02 |
| 2022/0232642 A1* | 7/2022 | Ko | H04W 72/0446 |
| 2022/0248376 A1* | 8/2022 | Hui | H04W 76/20 |
| 2022/0264659 A1* | 8/2022 | Enbuske | H04B 17/318 |
| 2022/0272760 A1* | 8/2022 | Murray | H04W 74/0833 |
| 2023/0217504 A1* | 7/2023 | Xiong | H04W 74/0891 370/329 |
| 2024/0007262 A1* | 1/2024 | Moon | H04L 5/10 |

FOREIGN PATENT DOCUMENTS

| | | |
|---|---|---|
| CN | 110199551 A | 9/2019 |
| EP | 3972375 A1 | 3/2022 |

OTHER PUBLICATIONS

Provisional U.S. Appl. No. 62/969,755 (Year: 2020).*

Sony, "Considerations on initial access procedures for NR unlicensed," 3GPP TSG-RAN WG2 Meeting #103 R2-1817075, Spokane, USA, Nov. 12-16, 2018, 4 pages.

OPPO, "On Procedure for 2-step RACH," 3GPP TSG RAN WG1 #98 R1-1909223, Prague, Czech, Aug. 26-30, 2019, 7 pages.

OPPO, "RACH initialization and resource selection for 2-step RACH," 3GPP TSG-RAN WG2 Meeting #107 R2-1908772, Prague, Czech Republic, Aug. 26-Aug. 30, 2019, 4 pages.

Extended European Search Report in European Appln 20872336.1, dated Oct. 18, 2022, 13 pages.

Office Action issued in Chinese Application No. 201910945948.7 on May 31, 2022, 7 pages.

3GPP TS 38.321 V15.7.0 (Sep. 2019), "3rd Generation Partnership Project; Technical Specification Group Radio Access Network; NR; Medium Access Control (MAC) protocol specification (Release 15)," Sep. 2019, 78 pages.

Ericsson, "NR two-step random access procedure," 3GPP TSG-RAN WG1 NR adhoc, R1-1700300, Spokane, USA, Jan. 16-20, 2017, 4 pages.

Interdigital, "Random access in NR-Unlicensed," 3GPP RAN WG2 Meeting #106, R2-1906402, Reno, USA, May 13-17, 2019, 5 pages.

OPPO, "Remaining issues on supporting 2-step RACH configuration on a UL BWP without 4-step RACH resource," 3GPP TSG-RAN WG2 Meeting #107bis, R2-1912084, Chongqing, China, Oct. 14-18, 2019, 2 pages.

PCT International Search Report and Written Opinion issued in International Application No. PCT/CN2020/118751 on Dec. 31, 2020, 18 pages (with English translation).

OPPO, "BWP operation impacts for NR-U," 3GPP TSG-RAN WG2 Meeting #106, R2-1905611, Reno, USA, May 13-17, 2019, 4 pages.

EP Communication Pursuant to Article 94(3) EPC in European Appln. No. 20872336.1, mailed on Feb. 10, 2025, 7 pages.

* cited by examiner

RANDOM ACCESS METHOD AND APPARATUS

CROSS-REFERENCE TO RELATED APPLICATIONS

This application is a continuation of International Application No. PCT/CN2020/118751, filed on Sep. 29, 2020, which claims priority to Chinese Patent Application No. 201910945948.7, filed on Sep. 30, 2019. The disclosures of the aforementioned applications are hereby incorporated by reference in their entireties.

TECHNICAL FIELD

This application relates to the field of communications technologies, and in particular, to a random access method and an apparatus.

BACKGROUND

In a conventional MBB (mobile broadband) service scenario, a wireless transmission service does not have a high requirement on a transmission latency, an MBB service packet transmitted each time is relatively large, and an overhead proportion corresponding to a control channel transmitted along with a data channel is relatively low. Therefore, when a conventional terminal device in an idle mode or an inactive (inactive) mode needs to initiate random access, a 4-step random access (4-Step RACH) procedure is usually used to complete a random access process. A complete 4-step random access procedure is shown in FIG. 1.

101. A terminal device sends a Msg1 (message 1) to an access network device, where the Msg1 includes a preamble carried on a physical random access channel (physical random access channel, PRACH).

102. The access network device sends a Msg2 to the terminal device, where the Msg2 includes a response message for the preamble (Msg1). The response message includes a timing advance command (timing advance command, TA). After receiving the Msg1, the access network device measures TA by using the preamble, and notifies the terminal device of a measured TA value by using the TA command in the response message (Msg2) for the Msg1.

103. The terminal device sends a Msg3 to the access network device, where the Msg3 includes uplink data carried on a physical uplink shared channel (physical uplink shared channel, PUSCH). A resource of the PUSCH in the Msg3 is obtained based on an uplink scheduling grant (UL grant) in the response message Msg2.

104. The access network device sends a Msg4 to the terminal device, where the Msg4 includes a response message for the uplink data, for example, may include a contention resolution message CRM (contention resolution message, CRM).

In 3GPP, for 5th generation (5th Generation, 5G) mobile communications technologies, there are three application scenarios: enhanced mobile broadband (enhanced mobile broadband, eMBB), ultra-reliable low-latency communication (ultra-reliable low-latency communication, URLLC), and massive machine-type communications (massive machine-type communication, mMTC). For a service with a relatively small data packet, UE needs to perform a complete 4-step random access process each time to enter an RRC connected mode to send data once, and then returns to an idle mode or an inactive mode, resulting in a relatively high latency and relatively high signaling overheads. To further reduce an access latency and signaling overheads, a 2-step random access (2-Step RACH) process is proposed in the industry. A complete 2-step random access procedure is shown in FIG. 2.

201. A terminal device sends a MsgA to an access network device, where the MsgA includes a preamble carried on a PRACH and uplink data carried on a PUSCH.

202. The access network device sends a MsgB to the terminal device, where the MsgB includes at least one of a response message for the preamble and a response message for the uplink data.

In a 5G system, a terminal device initiates random access or data transmission in an uplink bandwidth part (Uplink Bandwidth Part, BWP), and one or more BWPs are configured for the terminal device. When initiating random access, the terminal may perform random access in an active UL BWP or an initial UL BWP. When the terminal initiates random access and the random access fails, how to ensure a success rate of random access of the terminal device is an urgent problem to be resolved currently.

SUMMARY

Embodiments of this application provide a random access method and an apparatus, to help improve a success rate of random access of a terminal device.

According to a first aspect, an embodiment of this application provides a random access method. The method includes: A terminal device performs first-type random access in a first bandwidth part, where the first bandwidth part is an active uplink bandwidth part; the terminal device determines a first parameter, where the first parameter is duration for performing first-type random access in the first bandwidth part, or the first parameter is a quantity of times of sending a first-type random access message; and the terminal device performs random access in a second bandwidth part if the first parameter is greater than a first threshold, where the second bandwidth part is an uplink bandwidth part, and an identifier of the second bandwidth part is different from an identifier of the first bandwidth part. Based on the method described in the first aspect, a success rate of random access can be improved, and it can be ensured that the terminal device accesses a network in a timely manner.

In an optional implementation, the first-type random access is one of grant-free random access, 2-step random access, or 4-step random access; a random access message of the grant-free random access includes only uplink data carried on a physical uplink shared channel PUSCH; a random access message of the 2-step random access includes a preamble carried on a physical random access channel PRACH and uplink data carried on a PUSCH; and a random access message of the 4-step random access includes a preamble carried on a PRACH. Based on this optional implementation, when grant-free random access, 2-step random access, or 4-step random access in the first bandwidth part is unavailable, random access can be switched to the second bandwidth part in a timely manner, so that a success rate of random access is improved, and it can be ensured that the terminal device accesses a network in a timely manner.

In an optional implementation, the first-type random access is the 2-step random access; and when a random access transmission occasion RO resource that corresponds to the first-type random access and that is configured in the first bandwidth part is unavailable and a physical uplink shared channel transmission occasion PO resource corresponding to the random access transmission occasion RO resource is available, a specific implementation in which the terminal device performs first-type random access in the first bandwidth part is: The terminal device sends a random access message to an access network device on the PO resource in the first bandwidth part, where the random access message includes uplink data carried on a PUSCH. In this optional implementation, the uplink data can be sent to the access network device in a timely manner.

Optionally, if the RO resource corresponding to the 2-step random access is unavailable, and the PO resource corresponding to the RO resource is available, the terminal device may discard the PO resource. The terminal device waits for a next available RO resource and PO resource, sends, on the available RO resource, the preamble carried on the PRACH, and sends, on the available PO resource associated with the available RO resource, the uplink data carried on the PUSCH.

In an optional implementation, the first-type random access is the 2-step random access; and when a random access transmission occasion RO resource that corresponds to the first-type random access and that is configured in the first bandwidth part is available and a physical uplink shared channel transmission occasion PO resource corresponding to the random access transmission occasion RO resource is unavailable, a specific implementation in which the terminal device performs first-type random access in the first bandwidth part is: The terminal device sends a random access message to an access network device on the RO resource in the first bandwidth part, where the random access message includes a preamble carried on a PRACH. In this optional implementation, the preamble can be sent to the access network device in a timely manner.

Optionally, when the RO resource corresponding to the 2-step random access is available, and the PO resource corresponding to the RO resource is unavailable, the access network device sends a response message for the random access message after successfully detecting the preamble sent by the terminal device. The information includes uplink scheduling grant indication information, and the uplink scheduling grant indication information is used to indicate a transmission resource of a MsgA PUSCH. After receiving the response message from the access network device, the terminal device sends, on the transmission resource indicated by the uplink scheduling grant indication information, uplink data carried on the PUSCH. In this optional implementation, it helps the terminal device send the uplink data to the access network device in a timely manner.

Optionally, if the RO resource corresponding to the 2-step random access is available, and the PO resource corresponding to the RO resource is unavailable, the terminal device may discard the RO resource. The terminal device waits for a next available RO resource and PO resource, sends, on the available RO resource, the preamble carried on the PRACH, and sends, on the available PO resource associated with the available RO resource, the uplink data carried on the PUSCH.

In an optional implementation, the first-type random access is the 2-step random access, and a specific implementation in which the terminal device performs first-type random access in the first bandwidth part is: The terminal device performs first-type random access in the first bandwidth part if a second parameter satisfies a first condition, where the second parameter includes at least one of a reference signal received power RSRP measurement value, a size of to-be-transmitted uplink data, a network status of random access, and a time difference measurement value.

The terminal device may alternatively perform random access in the second bandwidth part if the second parameter satisfies a second condition, where the first condition is different from the second condition.

For example, if the second parameter is the RSRP measurement value, the first condition may be that the RSRP measurement value is greater than or equal to an RSRP threshold, and the second condition may be that the RSRP measurement value is less than the RSRP threshold. Determining random access based on the RSRP measurement value helps improve a success rate of random access.

For another example, if the second parameter is the size of the to-be-transmitted uplink data, the first condition may be that the size of the to-be-transmitted uplink data is less than or equal to an uplink data size threshold, and the second condition may be that the size of the to-be-transmitted uplink data is greater than the uplink data size threshold. Determining random access based on the size of the to-be-transmitted uplink data helps the terminal device access a network in a timely manner.

For another example, the network status of random access may include a quantity of active users of random access, a random access resource amount, a system capacity, or the like. If the second parameter is the quantity of active users of random access, the first condition is that the quantity of active users of random access is less than or equal to an active user quantity threshold, and the second condition is that the quantity of active users of random access is greater than the active user quantity threshold. A case in which the second parameter is the random access resource amount or the system capacity is similar, and details are not described herein. Determining random access based on the network status of 2-step random access helps improve a success rate of random access of the terminal device.

For another example, the second parameter is the time difference measurement value. The time difference measurement value may be a difference between a reference time point of the 2-step random access and a reference time point of a random access trigger event. For example, the reference time point may be a start symbol or an end symbol of a transmission occasion, a start symbol or an end symbol of a preamble in a random access message, a start symbol or an end symbol of a payload part in a random access message, a start symbol or an end symbol of a random access response corresponding to a random access message, or another specific location. Y0 is a difference between a reference time point X0 of the 2-step random access and a reference time point X2 of the random access trigger event, and Y0=X2−X0. The first condition is that Y0 is greater than or equal to a time difference threshold T0, and the second condition is that Y0 is less than the time difference threshold T0. Determining random access based on the time difference measurement value helps the terminal device access a network in a timely manner.

In an optional implementation, the first-type random access is the grant-free random access, and a specific implementation in which the terminal device performs first-type random access in the first bandwidth part is: The terminal device performs grant-free random access in the first bandwidth part if a timing advance TA timer does not expire or a TA status is valid.

The terminal device may alternatively perform random access in the second bandwidth part if the TA timer expires or the TA status is invalid.

Based on this optional implementation, grant-free random access is performed in the first bandwidth part only when the TA timer does not expire or the TA status is valid. This helps improve a success rate of random access.

In an optional implementation, the first-type random access is the grant-free random access, and a specific implementation in which the terminal device performs first-type random access in the first bandwidth part is: The terminal device performs first-type random access in the first bandwidth part if a second parameter satisfies a first condition, where the second parameter includes at least one of a reference signal received power RSRP measurement value, a size of to-be-transmitted uplink data, a network status of random access, and a time difference measurement value.

The terminal device may alternatively perform random access in the second bandwidth part if the second parameter satisfies a second condition, where the first condition is different from the second condition.

For a specific implementation and beneficial effects of this optional implementation, refer to the foregoing beneficial effects and the foregoing specific implementation in which the terminal device selects a random access manner based on the second parameter when the first-type random access is the 2-step random access. The 2-step random access in the foregoing description of the second parameter may be replaced with the grant-free random access. Details are not described herein.

In an optional implementation, a configuration of the first bandwidth part includes a configuration parameter of the grant-free random access and a configuration parameter of the 2-step random access, and the first-type random access is the grant-free random access or the 2-step random access.

Based on this optional implementation, when the grant-free random access and the 2-step random access are configured for the first bandwidth part of the terminal device, random access may be switched to the second bandwidth part when the grant-free random access or the 2-step random access in the first bandwidth part is unavailable. This helps improve a success rate of random access.

In an optional implementation, the first-type random access is the 2-step random access, and the terminal device may perform grant-free random access in the first bandwidth part if a timing advance TA timer does not expire or a TA status is valid.

A specific implementation in which the terminal device performs first-type random access in the first bandwidth part is: The terminal device performs first-type random access in the first bandwidth part if the TA timer expires or the TA status is invalid, or duration for performing grant-free random access in the first bandwidth part or a quantity of times of sending a random access message is greater than a second threshold.

Based on this optional implementation, when the TA timer does not expire or the TA status is valid, the terminal device effectively chooses to perform grant-free random access in the first bandwidth part. This helps improve a success rate of random access and reduce an uplink data transmission latency.

In an optional implementation, the first-type random access is the 2-step random access, and the terminal device may perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value.

A specific implementation in which the terminal device performs first-type random access in the first bandwidth part is: The terminal device performs first-type random access in the first bandwidth part if duration for performing grant-free random access in the first bandwidth part or a quantity of times of sending a random access message is greater than a second threshold, or the second parameter satisfies a second condition.

The terminal device may alternatively perform random access in the second bandwidth part if the second parameter satisfies a third condition, where the first condition, the second condition, and the third condition are different from each other.

For example, if the second parameter is the RSRP measurement value, the first condition is that the RSRP measurement value is greater than or equal to a first RSRP threshold. The second condition is that the RSRP measurement value is less than the first preset RSRP threshold and greater than a second RSRP threshold. The third condition is that the RSRP measurement value is less than the second RSRP threshold.

For another example, when the second parameter is the size of the to-be-transmitted uplink data, the first condition is that the size of the to-be-transmitted uplink data is less than or equal to a first uplink data size threshold. The second condition is that the size of the to-be-transmitted uplink data is greater than the first uplink data size threshold and less than or equal to a second uplink data size threshold. The third condition is that the size of the to-be-transmitted uplink data is greater than the second uplink data size threshold.

For another example, the network status of random access may include a quantity of active users of random access, a random access resource amount, a system capacity, or the like. If the second parameter is the quantity of active users of random access, the first condition is that the quantity of active users of random access is less than or equal to a first active user quantity threshold. The second condition is that the quantity of active users of random access is greater than the first active user quantity threshold and less than a second active user quantity threshold. The third condition is that the quantity of active users of random access is greater than the second active user quantity threshold.

For another example, the second parameter is the time difference measurement value. Time difference measurement values include a time difference measurement value Y1, a time difference measurement value Y2, and a time difference measurement value Y3. The time difference measurement value Y1 between a reference time point X2 of a time-frequency resource of the 2-step random access and a reference time point X1 of a time-frequency resource of the 4-step random access is X2−X1. The time difference measurement value Y2 between a reference time point X3 of a time-frequency resource of the grant-free random access and the reference time point X2 of the time-frequency resource of the 2-step random access is X3−X2. The time difference measurement value Y3 between the reference time point X3 of the time-frequency resource of the grant-free random access and the reference time point X1 of the time-frequency resource of the 4-step random access is X3−X1. The first condition is that Y3 is less than or equal to a time difference threshold T3, and Y2 is less than or equal to a time difference threshold T2. The second condition is that Y3 is greater than the time difference threshold T3, and Y1 is less than or equal to a time difference threshold T1. The third condition is that Y3 is greater than the time difference threshold T3, and Y1 is greater than the time difference threshold T1.

For beneficial effects, refer to the foregoing corresponding descriptions. Details are not described herein again.

In an optional implementation, a configuration of the first bandwidth part includes a configuration parameter of the grant-free random access and a configuration parameter of the 4-step random access, and the first-type random access is the grant-free random access or the 4-step random access.

Based on this optional implementation, when the grant-free random access and the 4-step random access are configured for the first bandwidth part of the terminal device, random access may be switched to the second bandwidth part when the grant-free random access or the 4-step random access in the first bandwidth part is unavailable. This helps improve a success rate of random access.

In an optional implementation, the first-type random access is the 4-step random access, and the terminal device may perform grant-free random access in the first bandwidth part if a timing advance TA timer does not expire or a TA status is valid.

A specific implementation in which the terminal device performs first-type random access in the first bandwidth part is: The terminal device performs first-type random access in the first bandwidth part if the TA timer expires or the TA status is invalid, or duration for performing grant-free random access in the first bandwidth part or a quantity of times of sending a random access message is greater than a second threshold.

Based on this optional implementation, grant-free random access is performed in the first bandwidth part only when the TA timer does not expire or the TA status is valid. This helps improve a success rate of random access.

In an optional implementation, the first-type random access is the 4-step random access, and the terminal device may perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value.

A specific implementation in which the terminal device performs first-type random access in the first bandwidth part is: The terminal device performs first-type random access in the first bandwidth part if duration for performing grant-free random access in the first bandwidth part or a quantity of times of sending a random access message is greater than a second threshold, or the second parameter satisfies a second condition, where the first condition is different from the second condition.

For example, if the second parameter is the RSRP measurement value, the first condition is that the RSRP measurement value is greater than or equal to a first RSRP threshold, and the second condition is that the RSRP measurement value is less than the first RSRP threshold.

For another example, if the second parameter is the size of the to-be-transmitted uplink data, the first condition is that the size of the to-be-transmitted uplink data is less than or equal to a first uplink data size threshold, and the second condition is that the size of the to-be-transmitted uplink data is greater than the first uplink data size threshold.

For another example, the network status of random access may include a quantity of active users of random access, a random access resource amount, a system capacity, or the like. If the second parameter is the quantity of active users of random access, the first condition is that the quantity of active users of random access is less than or equal to a first active user quantity threshold. The second condition is that the quantity of active users of random access is greater than the first active user quantity threshold.

For another example, the second parameter is the time difference measurement value. The time difference measurement value is Y3. The time difference measurement value Y3 between a time-frequency resource of the grant-free random access and a time-frequency resource of the 4-step random access is X3−X1. The first condition is that Y3 is less than or equal to a time difference threshold T3. The second condition is that Y3 is greater than the time difference threshold T3.

For beneficial effects, refer to the foregoing corresponding descriptions. Details are not described herein again.

In an optional implementation, a configuration of the first bandwidth part includes a configuration parameter of the grant-free random access, a configuration parameter of the 2-step random access, and a configuration parameter of the 4-step random access.

Based on this optional implementation, when the grant-free random access, the 2-step random access, and the 4-step random access are configured for the first bandwidth part of the terminal device, random access may be switched to the second bandwidth part when the grant-free random access, the 2-step random access, or the 4-step random access in the first bandwidth part is unavailable. This helps improve a success rate of random access.

In an optional implementation, the first-type random access is the 4-step random access; and the terminal device may perform grant-free random access in the first bandwidth part if a timing advance TA timer does not expire or a TA status is valid and a second parameter satisfies a first condition, where the second parameter includes at least one of a reference signal received power RSRP measurement value, a size of to-be-transmitted uplink data, a network status of random access, and a time difference measurement value; or the terminal device may perform 2-step random access in the first bandwidth part if the TA timer expires or the TA status is invalid, the second parameter satisfies a second condition, or duration for performing grant-free random access in the first bandwidth part or a quantity of times of sending a random access message is greater than a second threshold.

A specific implementation in which the terminal device performs first-type random access in the first bandwidth part is: The terminal device performs first-type random access in the first bandwidth part if the second parameter satisfies a third condition, or duration for performing 2-step random access in the first bandwidth part or a quantity of times of sending a random access message is greater than a third threshold, where the first condition, the second condition, and the third condition are different from each other.

For example, if the second parameter is the RSRP measurement value, the first condition is that the RSRP measurement value is greater than or equal to a first RSRP threshold. The second condition is that the RSRP measurement value is less than the first preset RSRP threshold and greater than a second RSRP threshold. The third condition is that the RSRP measurement value is less than the second RSRP threshold.

For another example, when the second parameter is the size of the to-be-transmitted uplink data, the first condition is that the size of the to-be-transmitted uplink data is less than or equal to a first uplink data size threshold. The second condition is that the size of the to-be-transmitted uplink data is greater than the first uplink data size threshold and less than or equal to a second uplink data size threshold. The third condition is that the size of the to-be-transmitted uplink data is greater than the second uplink data size threshold.

For another example, the network status of random access may include a quantity of active users of random access, a random access resource amount, a system capacity, or the like. If the second parameter is the quantity of active users of random access, the first condition is that the quantity of active users of random access is less than or equal to a first active user quantity threshold. The second condition is that the quantity of active users of random access is greater than the first active user quantity threshold and less than a second active user quantity threshold. The third condition is that the quantity of active users of random access is greater than the second active user quantity threshold.

For another example, the second parameter is the time difference measurement value. Time difference measurement values include Y1, Y2, and Y3. Y1 is a time difference measurement value between a reference time point X2 of a time-frequency resource of the 2-step random access and a reference time point X1 of a time-frequency resource of the 4-step random access. Y2 is a time difference measurement value between a reference time point X3 of a time-frequency resource of the grant-free random access and the reference time point X2 of the time-frequency resource of the 2-step random access. The time difference measurement value Y3 between the reference time point X3 of the time-frequency resource of the grant-free random access and the reference time point X1 of the time-frequency resource of the 4-step random access is X3−X1. For descriptions of the reference time point, refer to the foregoing descriptions.

The first condition is that Y3 is less than or equal to a time difference threshold T3, Y2 is less than or equal to a time difference threshold T2, and Y1 is less than or equal to a time difference threshold T1. The first condition is that Y3 is greater than the time difference threshold T3, and Y1 is less than or equal to the time difference threshold T1. The third condition is that Y3 is greater than the time difference threshold T3, and Y1 is greater than the time difference threshold T1.

For beneficial effects, refer to the foregoing corresponding descriptions. Details are not described herein again.

In an optional implementation, before the terminal device performs first-type random access in the first bandwidth part, the terminal device may further select the first-type random access, and determine the first bandwidth part from a plurality of uplink bandwidth parts, where the first bandwidth part is an uplink bandwidth part for which a configuration parameter of the first-type random access is configured.

Based on this optional implementation, random access can be first determined, and then the bandwidth part is determined. In this way, random access can be more flexible.

In an optional implementation, a configuration of the second bandwidth part includes one or more of the configuration parameter of the grant-free random access, the configuration parameter of the 2-step random access, or the configuration parameter of the 4-step random access.

Optionally, if a plurality of types of random access may be configured for the second bandwidth part, when the terminal device switches to the second bandwidth part because the first parameter is greater than the first threshold, the terminal device may select one of the plurality of random access manners to perform random access. Alternatively, the terminal device may select, based on a third parameter, one of the plurality of types of random access configured for the second bandwidth part, to perform random access. For example, the third parameter may be at least one of a reference signal received power RSRP measurement value, a size of to-be-transmitted uplink data, a network status of random access, and time difference measurement values corresponding to the plurality of types of random access.

Based on this optional implementation, the random access manner selected from the second bandwidth part helps improve a success rate of random access or helps access a network in a timely manner.

According to a second aspect, a communications apparatus is provided. The apparatus includes: a communications unit, configured to perform first-type random access in a first bandwidth part, where the first bandwidth part is an active uplink bandwidth part; and a processing unit, configured to determine a first parameter, where the first parameter is duration for performing first-type random access in the first bandwidth part, or the first parameter is a quantity of times of sending a first-type random access message. The communications unit is further configured to perform random access in a second bandwidth part if the first parameter is greater than a first threshold, where the second bandwidth part is an uplink bandwidth part, and the second bandwidth part is different from the first bandwidth part.

In an optional implementation, the first-type random access is one of grant-free random access, 2-step random access, or 4-step random access; a random access message of the grant-free random access includes uplink data carried on a physical uplink shared channel PUSCH; a random access message of the 2-step random access includes a preamble carried on a physical random access channel PRACH and uplink data carried on a PUSCH; and a random access message of the 4-step random access includes a preamble carried on a PRACH.

In an optional implementation, the first-type random access is the 2-step random access; and when a random access transmission occasion RO resource that corresponds to the first-type random access and that is configured in the first bandwidth part is unavailable and a physical uplink shared channel transmission occasion PO resource corresponding to the random access transmission occasion RO resource is available, a manner in which the communications unit performs first-type random access in the first bandwidth part is specifically: sending a random access message to an access network device on the PO resource in the first bandwidth part, where the random access message includes uplink data carried on a PUSCH.

In an optional implementation, the first-type random access is the 2-step random access; and when a random access transmission occasion RO resource that corresponds to the first-type random access and that is configured in the first bandwidth part is available and a physical uplink shared channel transmission occasion PO resource corresponding to the random access transmission occasion RO resource is unavailable, a manner in which the communications unit performs first-type random access in the first bandwidth part is specifically: sending a random access message to an access network device on the RO resource in the first bandwidth part, where the random access message includes a preamble carried on a PRACH.

In an optional implementation, the first-type random access is the 2-step random access, and a manner in which the communications unit performs first-type random access in the first bandwidth part is specifically: performing first-type random access in the first bandwidth part if a second parameter satisfies a first condition, where the second parameter includes at least one of a reference signal received power RSRP measurement value, a size of to-be-transmitted uplink data, a network status of random access, and a time difference measurement value. The communications unit is alternatively configured to perform random access in the second bandwidth part if the second parameter satisfies a second condition, where the first condition is different from the second condition.

In an optional implementation, the first-type random access is the grant-free random access, and a manner in which the communications unit performs first-type random access in the first bandwidth part is specifically: performing grant-free random access in the first bandwidth part if a timing advance TA timer does not expire or a TA status is valid. The communications unit is alternatively configured to perform random access in the second bandwidth part if the TA timer expires or the TA status is invalid.

In an optional implementation, the first-type random access is the grant-free random access, and a manner in which the communications unit performs first-type random access in the first bandwidth part is specifically: performing first-type random access in the first bandwidth part if a second parameter satisfies a first condition, where the second parameter includes at least one of a reference signal received power RSRP measurement value, a size of to-be-transmitted uplink data, a network status of random access, and a time difference measurement value. The communications unit is alternatively configured to perform random access in the second bandwidth part if the second parameter satisfies a second condition, where the first condition is different from the second condition.

In an optional implementation, a configuration of the first bandwidth part includes a configuration parameter of the grant-free random access and a configuration parameter of the 2-step random access, and the first-type random access is the grant-free random access or the 2-step random access.

In an optional implementation, the first-type random access is the 2-step random access, and the communications unit is further configured to perform grant-free random access in the first bandwidth part if a timing advance TA timer does not expire or a TA status is valid. A manner in which the communications unit performs first-type random access in the first bandwidth part is specifically: performing first-type random access in the first bandwidth part if the TA timer expires or the TA status is invalid, or duration for performing grant-free random access in the first bandwidth part or a quantity of times of sending a random access message is greater than a second threshold.

In an optional implementation, the first-type random access is the 2-step random access, and the communications unit is further configured to perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value. A manner in which the communications unit performs first-type random access in the first bandwidth part is specifically: performing first-type random access in the first bandwidth part if duration for performing grant-free random access in the first bandwidth part or a quantity of times of sending a random access message is greater than a second threshold, or the second parameter satisfies a second condition. The communications unit is alternatively configured to perform random access in the second bandwidth part if the second parameter satisfies a third condition, where the first condition, the second condition, and the third condition are different from each other.

In an optional implementation, a configuration of the first bandwidth part includes a configuration parameter of the grant-free random access and a configuration parameter of the 4-step random access, and the first-type random access is the grant-free random access or the 4-step random access.

In an optional implementation, the first-type random access is the 4-step random access, and the communications unit is further configured to perform grant-free random access in the first bandwidth part if a timing advance TA timer does not expire or a TA status is valid. A manner in which the communications unit performs first-type random access in the first bandwidth part is specifically: performing first-type random access in the first bandwidth part if the TA timer expires or the TA status is invalid, or duration for performing grant-free random access in the first bandwidth part or a quantity of times of sending a random access message is greater than a second threshold.

In an optional implementation, the first-type random access is the 4-step random access, and the communications unit is further configured to perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value. A manner in which the communications unit performs first-type random access in the first bandwidth part is specifically: performing first-type random access in the first bandwidth part if duration for performing grant-free random access in the first bandwidth part or a quantity of times of sending a random access message is greater than a second threshold, or the second parameter satisfies a second condition, where the first condition is different from the second condition.

In an optional implementation, a configuration of the first bandwidth part includes a configuration parameter of the grant-free random access, a configuration parameter of the 2-step random access, and a configuration parameter of the 4-step random access.

In an optional implementation, the first-type random access is the 4-step random access, and the communications unit is further configured to perform grant-free random access in the first bandwidth part if a timing advance TA timer does not expire or a TA status is valid and a second parameter satisfies a first condition, where the second parameter includes at least one of a reference signal received power RSRP measurement value, a size of to-be-transmitted uplink data, a network status of random access, and a time difference measurement value; or the communications unit is further configured to perform 2-step random access in the first bandwidth part if the TA timer expires or the TA status is invalid, the second parameter satisfies a second condition, or duration for performing grant-free random access in the first bandwidth part or a quantity of times of sending a random access message is greater than a second threshold. A manner in which the communications unit performs first-type random access in the first bandwidth part is specifically: performing first-type random access in the first bandwidth part if the second parameter satisfies a third condition, or duration for performing 2-step random access in the first bandwidth part or a quantity of times of sending a random access message is greater than a third threshold, where the first condition, the second condition, and the third condition are different from each other.

In an optional implementation, the processing unit is further configured to select the first-type random access before the communications unit performs first-type random access in the first bandwidth part; and the processing unit is further configured to determine the first bandwidth part from a plurality of uplink bandwidth parts, where the first bandwidth part is an uplink bandwidth part for which a configuration parameter of the first-type random access is configured.

In an optional implementation, a configuration of the second bandwidth part includes one or more of the configuration parameter of the grant-free random access, the configuration parameter of the 2-step random access, or the configuration parameter of the 4-step random access.

For operations performed by the communication apparatus and beneficial effects thereof, refer to the method in the first aspect and the beneficial effects thereof. Repeated parts are not described again.

According to a third aspect, a communications apparatus is provided. The apparatus may be a terminal device, an apparatus in the terminal device, or an apparatus that can be used together with the terminal device. The communications apparatus may alternatively be a chip system. The communications apparatus may perform the method according to the first aspect. A function of the communications apparatus may be implemented by hardware, or may be implemented by hardware by executing corresponding software. The hardware or software includes one or more units corresponding to the foregoing function. The unit may be software and/or hardware. For operations performed by the communication apparatus and beneficial effects thereof, refer to the method in the first aspect and the beneficial effects thereof. Repeated parts are not described again.

According to a fourth aspect, an embodiment of this application provides a communications apparatus. The communications apparatus includes a communications interface and a processor, and the communications interface is used by the apparatus to communicate with another device, for example, to send and receive data or signals. For example, the communications interface may be a transceiver, a circuit, a bus, a module, or a communications interface of another type, and the another device may be an access network device. The processor is configured to invoke a group of programs, instructions, or data to perform the method described in the first aspect. The apparatus may further include a memory, configured to store the programs, the instructions, or the data invoked by the processor. The memory is coupled to the processor, and when executing the instructions or the data stored in the memory, the processor can implement the method described in the first aspect.

According to a fifth aspect, an embodiment of this application provides a chip system. The chip system includes a processor, may further include a memory, and is configured to implement the method according to the first aspect. The chip system may include a chip, or may include a chip and another discrete component.

According to a sixth aspect, an embodiment of this application provides a computer-readable storage medium. The computer-readable storage medium is configured to store instructions, and when the instructions are executed, the method according to the first aspect is implemented.

According to a seventh aspect, an embodiment of this application provides a computer program product including instructions. When the instructions are executed, the method according to the first aspect is implemented.

DESCRIPTION OF EMBODIMENTS

The following further describes specific embodiments of this application in detail with reference to accompanying drawings.

Embodiments of this application provide a random access method and an apparatus, to resolve a problem that a success rate of random access is relatively low. The method and the apparatus are based on a same concept. Because a problem-resolving principle of the method is similar to that of the apparatus, mutual reference may be made to implementations of the apparatus and the method. Repeated parts are not described in detail. In descriptions of embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. In this application, "at least one" means one or more, and "a plurality of" means two or more. In addition, it should be understood that, in descriptions of this application, words such as "first" and "second" are merely used for differentiation, and cannot be understood as indicating or implying relative importance, nor can be understood as indicating or implying a sequence.

To make embodiments of this application more comprehensible, the following describes a communications system to which embodiments of this application are applicable.

Figure 3:
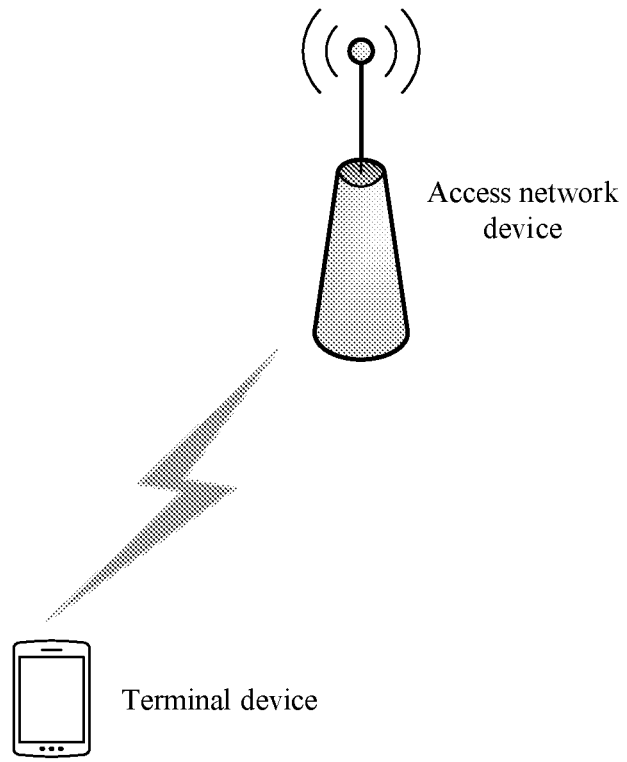
FIG. 3 is a schematic diagram of a system architecture according to an embodiment of this application.

FIG. 3 is a schematic diagram of a communications system according to an embodiment of this application. As shown in FIG. 3, the communications system includes an access network device and a terminal device. The terminal device is connected to the access network device in a wireless manner. FIG. 3 is merely a schematic diagram of a communications system according to an embodiment of this application. An example in which the communications system includes one access network device and one terminal device is used in FIG. 3. Certainly, the communications system may alternatively include a plurality of network devices and a plurality of terminal devices. Alternatively, the communications system may further include another device, for example, a wireless relay device and a wireless backhaul device. This is not limited in this embodiment of this application.

A random access method provided in this application may be applied to various communications systems, for example, an Internet of things (Internet of things, IoT) system, a narrowband Internet of things (narrow band Internet of things, NB-IoT) system, a long term evolution (long term evolution, LTE) system, a 5th generation (5G) communications system, a hybrid LTE and 5G architecture, a 5G new radio (new radio, NR) system, and a new communications system emerging in future communication development. The random access method provided in embodiments of this application can be used provided that random access needs to be performed in the communications system.

The terminal device in embodiments of this application is an entity for receiving or transmitting a signal on a user side. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (radio access network, RAN). The terminal device may also be referred to as a wireless terminal, a subscriber unit (subscriber unit), a subscriber station (subscriber station), a mobile station (mobile station), a mobile (mobile) console, a remote station (remote station), an access point (access point), a remote terminal (remote terminal), an access terminal (access terminal), a user terminal (user terminal), a user agent (user agent), a user device (user device), user equipment (user equipment, UE), or the like. The terminal device may be a mobile terminal, for example, a mobile phone (or referred to as a "cellular" phone), or a computer that has a mobile terminal. For example, the terminal device may be a portable, pocket-sized, handheld, computer built-in, or in-vehicle mobile apparatus, which exchanges a voice and/or data with the radio access network. For example, the terminal device may alternatively be a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). For example, common terminal devices include a mobile phone, a tablet computer, a notebook computer, a palmtop computer, a mobile Internet device (mobile Internet device, MID), and a wearable device such as a smartwatch, a smart band, or a pedometer. However, embodiments of this application are not limited thereto.

The access network device in embodiments of this application is an entity for transmitting or receiving a signal on a network side, may be configured to mutually convert a received over-the-air frame and an Internet protocol (Internet protocol, IP) packet, and serves as a router between a terminal device and a remaining part of an access network. The remaining part of the access network may include an IP network and the like. The access network device may further coordinate attribute management of an air interface. For example, the access network device may be an evolved NodeB (evolutional Node B, eNB or e-NodeB) in LTE, a new radio controller (new radio controller, NR controller), a gNodeB (gNB) in a 5G system, a centralized unit (centralized unit), a new radio base station, a remote radio module, a micro base station, a relay (relay), a distributed unit (distributed unit), a transmission reception point (transmission reception point, TRP), a transmission point (transmission point, TP), or any other radio access device. However, embodiments of this application are not limited thereto.

To better understand embodiments of this application, the following describes 4-step random access, 2-step random access, and grant-free random access in embodiments of this application.

In wireless communications systems such as LTE, 5G, and NR, a terminal device may enter a radio resource control (radio resource control, RRC) connected mode from an RRC idle mode or inactive (inactive) mode through random access, establish various bearers with an access network device, obtain some necessary resources and parameter configurations, and then communicate with a network device. Alternatively, when the terminal device is not synchronized with the access network device in terms of time, the terminal device may keep time synchronization with the access network device through random access.

Currently, there are two types of random access: 4-step random access (4-Step RACH) and 2-step random access (2-Step RACH).

Figure 1:
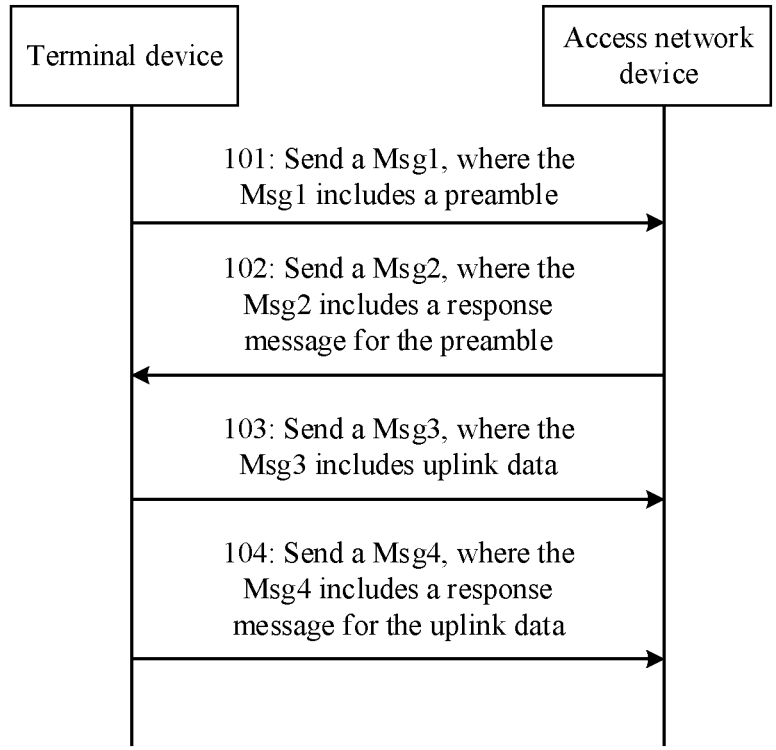
FIG. 1 is a schematic diagram of an existing 4-step random access procedure.

The 4-step random access is random access in which a random access message (that is, Msg1 in FIG. 1) includes only a preamble carried on a PRACH. That the random access message includes only the preamble carried on the PRACH may be understood as that the random access message includes the preamble carried on the PRACH but does not include uplink data carried on a PUSCH. To be specific, as shown in FIG. 1, in a 4-step random access process, the preamble and the uplink data are separately sent. For a detailed 4-step random access process, refer to the corresponding descriptions in the foregoing background. Details are not described herein again.

Figure 2:
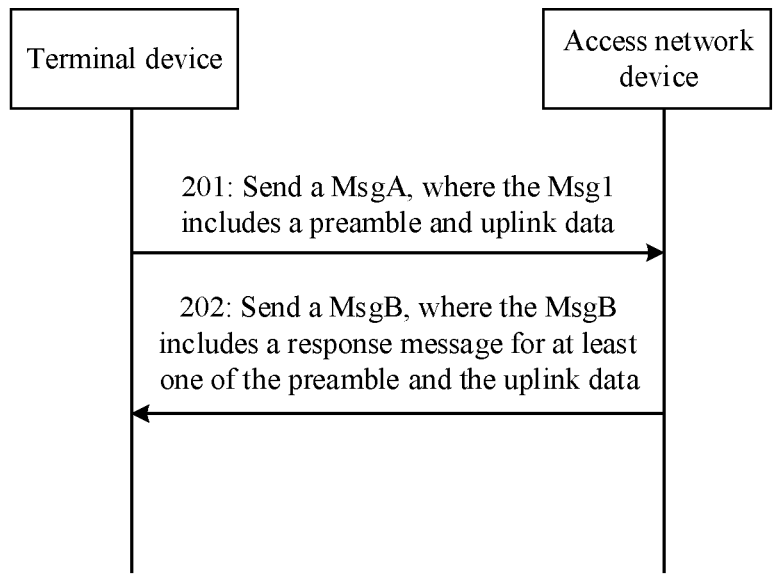
FIG. 2 is a schematic diagram of an existing 2-step random access procedure.

The 2-step random access is random access in which a random access message (that is, MsgA in FIG. 2) includes a preamble carried on a PRACH and uplink data carried on a PUSCH. To be specific, as shown in FIG. 2, in a 2-step random access process, the preamble and the uplink data are sent in one message. For a detailed 2-step random access process, refer to the corresponding descriptions in the foregoing background. Details are not described herein again.

Different from that in the 4-step random access, the random access message sent by the terminal device in the 2-step random access process includes the preamble and the uplink data. Therefore, the terminal device only needs to perform an exchange process with the access network device once. This reduces an uplink data transmission latency.

Figure 4:
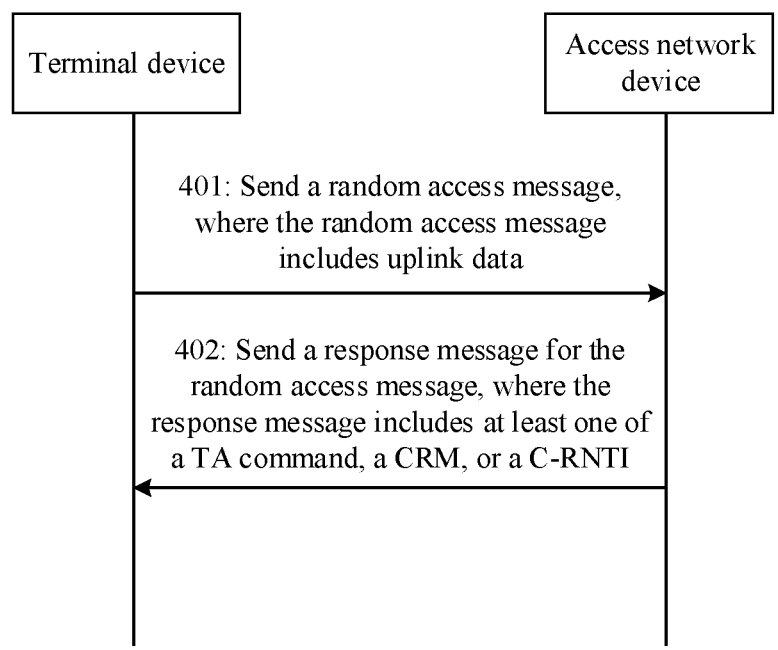
FIG. 4 is a schematic diagram of a grant-free random access procedure according to an embodiment of this application.

To further reduce the uplink data transmission latency, embodiments of this application provide new random access, that is, grant-free random access. The grant-free random access means that a random access message includes only uplink data carried on a PUSCH. In other words, the random access message in the grant-free random access includes the uplink data carried on the PUSCH, but does not include a preamble carried on a PRACH. A grant-free random access process may be shown in FIG. 4.

401: A terminal device sends a random access message to an access network device, where the random access message includes uplink data carried on a PUSCH.

402: The access network device sends a response message for the random access message to the terminal device, where the response message includes at least one of a timing advance command (timing advance command, TA), a contention resolution message (contention resolution message, CRM), or a cell radio network temporary identifier (cell-radio network temporary identifier, C-RNTI). Alternatively, the response message may include other information such as an RRC message and an uplink scheduling grant. This is not limited in embodiments of this application.

In the 2-step random access process or the 4-step random access process, a purpose of sending the preamble by the terminal device is to obtain a TA command. After receiving the preamble, the access network device measures TA by using the preamble, and notifies the terminal device of a measured TA value by using the TA command in the response message for the random access message. For the grant-free random access, the random access message in the grant-free random access includes a demodulation reference signal (Demodulation Reference Signal, DMRS), and the DMRS can implement a function of the preamble. After receiving the random access message, the access network device may measure TA based on the detected DMRS, and notify the terminal device of a measured TA value by using the TA command in the response message for the random access message. Compared with the 2-step random access and the 4-step random access, the grant-free random access process saves the terminal device from sending a preamble, and can further reduce an uplink data transmission latency.

The following describes a UL BWP in embodiments of this application.

Specifically, a terminal device may initiate random access to an access network device on an uplink bandwidth part (uplink bandwidth part, UL BWP). The UL BWP is used by the terminal device to perform uplink transmission. A BWP is defined as a combination of a plurality of consecutive resource blocks (resource block, RB) in one carrier. A concept of the BWP is introduced mainly to enable a terminal device to better use a large carrier bandwidth. For a large carrier bandwidth, for example, 100 MHz, a bandwidth that needs to be used by a terminal device is usually limited. If the terminal device is required to perform full-bandwidth detection and maintenance in real time, power consumption of the terminal device brings great challenges. Introduction of the BWP concept is to divide an entire large carrier to allocate a bandwidth part to a terminal device for access and data transmission. The terminal device needs to perform a corresponding operation in only a bandwidth part configured by a system.

In embodiments of this application, the access network device may configure a plurality of UL BWPs for the terminal device. The plurality of UL BWPs include one initial uplink bandwidth part (initial UL BWP) and a plurality of other UL BWPs. The initial UL BWP means that the terminal device may initiate an initial access process in at least the UL BWP. In the plurality of other UL BWPs, only one UL BWP is active in a given time period. After the terminal device successfully performs random access, the terminal device can send a PUSCH in only the active UL BWP.

Optionally, a time-frequency resource of the initial UL BWP is notified by a network side to UE by using a parameter BWP-UplinkDedicated in a parameter ServingCellConfig in RRC signaling. A time-frequency resource of a non-initial UL BWP is notified by the network side to the UE by using a BWP-UplinkCommon message in an RRC parameter ServingCellConfig message. The network side may configure a plurality of non-initial UL BWPs, and indicate the first active uplink bandwidth part (first active UL BWP). Subsequently, activation statuses of different BWPs may be switched by using a DCI indication. In this case, a maximum of four UL BWPs are configured for the terminal device, including one initial UL BWP and three other UL BWPs. For example, four UL BWPs are configured for the terminal device: a BWP 0, a BWP 1, a BWP 2, and a BWP 3. The BWP 0 is an initial UL BWP, the BWP 1 is an active UL BWP, and the BWP 2 and the BWP 3 are inactive UL BWPs.

Optionally, a time-frequency resource of the initial UL BWP may be notified to the UE by using a parameter UplinkConfigCommon in a parameter ServingCellConfigCommon carried in a SIB1. A time-frequency resource of a non-initial UL BWP may be notified by the network side to the UE by using a parameter BWP-UplinkCommon in a parameter ServingCellConfig in RRC signaling. The network side may configure a plurality of non-initial UL BWPs, and indicate the first active uplink bandwidth part (first active UL BWP). In this case, the initial UL BWP is not configured by using the RRC signaling. Therefore, in addition to the initial UL BWP, a network device may configure a maximum of four UL BWPs by using BWP-UplinkCommon in ServingCellConfig. In this case, a maximum of five UL BWPs are configured for the terminal device, including one initial UL BWP and four other UL BWPs. For example, five UL BWPs are configured for the terminal device: a BWP 0, a BWP 1, a BWP 2, a BWP 3, and a BWP 4. The BWP 0 is an initial UL BWP, the BWP 1 is an active UL BWP, and the BWP 2 to the BWP 4 are inactive UL BWPs.

In an example, for details of the parameters for configuring the BWP, refer to related descriptions in the standard 3GPP TS 38.331.

Optionally, a plurality of UL BWPs in the UL BWPs configured for the terminal device may be active in a given time period. This is not limited in embodiments of this application.

In embodiments of this application, a configuration of each BWP of the terminal device includes configuration parameters of one or more types of random access. In other words, one or more types of random access are configured for each UL BWP of the terminal device.

For example, four UL BWPs are configured for the terminal device: a BWP 0, a BWP 1, a BWP 2, and a BWP 3. The BWP 0 is an initial UL BWP, the BWP 1 is an active UL BWP, and the BWP 2 and the BWP 3 are inactive UL BWPs. Random access configured for the BWP 0 to the BWP 3 may be the same. For example, grant-free random access, 2-step random access, and 4-step random access are configured for all of the BWP 0 to the BWP 3.

Alternatively, random access configured for the BWP 0 to the BWP 3 may be different. For example, 4-step random access is configured for the BWP 0. 2-step random access is configured for the BWP 11. Grant-free random access is configured for the BWP 2. Grant-free random access and 2-step random access are configured for the BWP 3.

In the conventional technology, the terminal device may perform random access in an active UL BWP through random access configured for the active UL BWP. However, a random access collision caused because there are a large quantity of random access users or a poor channel condition may cause a failure of random access of the terminal device. To improve a success rate of random access of a terminal device, embodiments of this application provide a random access method and an apparatus. The following further describes the random access method and the apparatus provided in this application.

Figure 5:
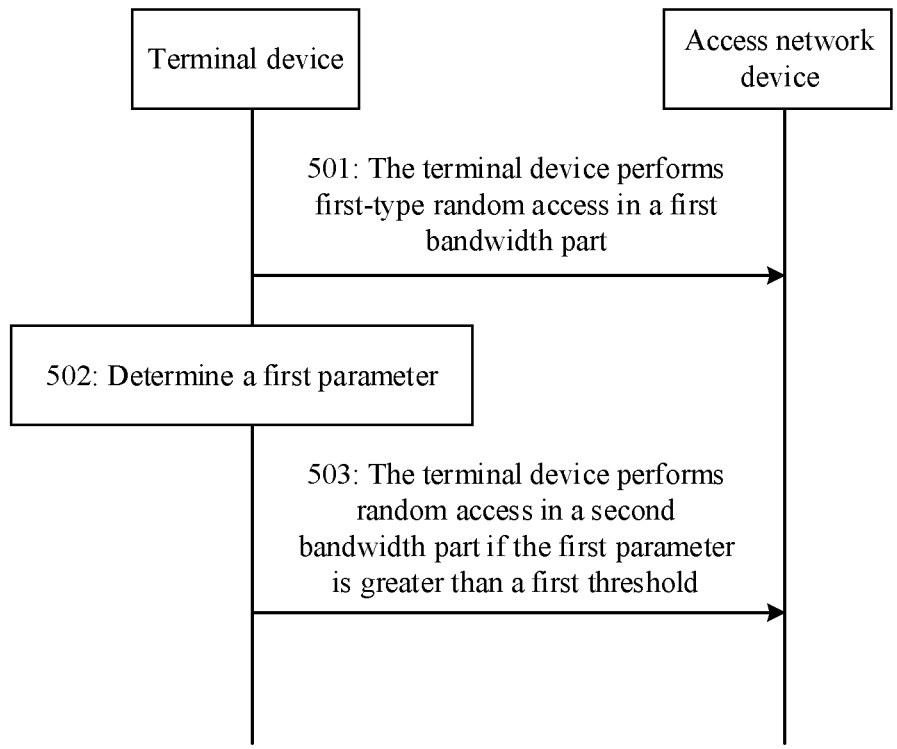
FIG. 5 is a schematic flowchart of a random access method according to an embodiment of this application.

FIG. 5 is a schematic flowchart of a random access method according to an embodiment of this application. Step 501 to step 503 are performed by a terminal device or a chip in the terminal device. An example in which the terminal device performs the method is used below for description. As shown in FIG. 5, the random access method includes the following step 501 to step 503.

501: The terminal device performs first-type random access in a first bandwidth part.

502: The terminal device determines a first parameter.

Specifically, in a process in which the terminal device performs first-type random access in the first bandwidth part, the terminal device determines the first parameter. The first parameter is duration for performing first-type random access in the first bandwidth part, or the first parameter is a quantity of times of sending a first-type random access message. The first-type random access message is a random access message sent when first-type random access is performed.

In this embodiment of this application, the random access duration refers to a time interval between a moment at which the terminal device sends the random access message for the first time in the random access process and a current determining moment. The current determining moment is a moment at which the first parameter is determined. Within the time interval, the terminal device may send the random access message a plurality of times in the random access process. For example, the random access is 2-step random access. A moment at which the terminal device sends a MsgA for the first time in a 2-step random access process is t1. Duration of the 2-step random access needs to be determined at t2. In this case, the random access duration is t2−t1. Within the time interval t2−t1, the terminal device may send a random access message a plurality of times, for example, two, three, or more times, in the 2-step random access process. A definition of duration of other random access is similar, and details are not described herein.

503: The terminal device performs random access in a second bandwidth part if the first parameter is greater than a first threshold.

As described above, one or more active UL BWPs may be configured for the terminal device. The first bandwidth part is an active UL BWP (uplink bandwidth part). If a plurality of active UL BWPs are configured for the terminal device, the first bandwidth part may be any one of the plurality of active UL BWPs. Optionally, the first bandwidth part may alternatively not be an active UL BWP, and the first bandwidth part may be any UL BWP configured for the terminal device.

The second bandwidth part is a UL BWP configured for the terminal device. An identifier of the second bandwidth part is different from an identifier of the first bandwidth part. To be specific, in a configuration of the terminal device, a configuration parameter of the second bandwidth part is different from a configuration parameter of the first bandwidth part. The second bandwidth part may be an initial UL BWP. Alternatively, the second bandwidth part may be any UL BWP that is configured for the terminal device and whose identifier is different from that of the first bandwidth part.

For example, four UL BWPs are configured for the terminal device: a BWP 0, a BWP 1, a BWP 2, and a BWP 3. The BWP 0 is an initial UL BWP, the BWP 1 is an active UL BWP, and the BWP 2 and the BWP 3 are inactive UL BWPs. The first bandwidth part may be the BWP 1, and the second bandwidth part may be the BWP 0. Alternatively, the first bandwidth part may be the BWP 0, and the second bandwidth part may be the BWP 1. Alternatively, the first bandwidth part may be the BWP 2, and the second bandwidth part may be the BWP 3.

A configuration of the first bandwidth part may include configuration parameters of one or more types of random access. In other words, one or more types of random access are configured for the first bandwidth part. The first-type random access is one type of random access configured for the first bandwidth part. A configuration of the second bandwidth part may also include configuration parameters of one or more types of random access.

In an optional implementation, one or more of grant-free random access, 2-step random access, or 4-step random access may be configured for the first bandwidth part. The first-type random access is one of the grant-free random access, the 2-step random access, or the 4-step random access. For specific descriptions of the grant-free random access, the 2-step random access, and the 4-step random access, refer to the foregoing corresponding descriptions. Details are not described herein again.

In an optional implementation, one or more of grant-free random access, 2-step random access, or 4-step random access may also be configured for the second bandwidth part. Random access configured for the first bandwidth part may be the same as or different from random access configured for the second bandwidth part.

Specifically, in a process in which the terminal device performs first-type random access in the first bandwidth part, the terminal device determines the first parameter. The first parameter is duration for performing first-type random access in the first bandwidth part, or the first parameter is a quantity of times of sending a first-type random access message. When the first parameter is the duration of the first-type random access, the first threshold may be specifically a first duration threshold. When the first parameter is the quantity of times of sending the first-type random access message, the first threshold may be specifically a first quantity-of-time threshold. If the first parameter is greater than the first threshold, it indicates that the first-type random access in the first bandwidth part fails. If the first-type random access continues to be performed in the first bandwidth part, random access of the terminal device fails. Therefore, if the first parameter is greater than the first threshold, the terminal device may switch to the second bandwidth part to perform random access. In this way, a success rate of random access can be improved, and it can be ensured that the terminal device accesses a network in a timely manner. The terminal device may perform first-type random access or another type of random access in the second bandwidth part.

For example, four UL BWPs are configured for the terminal device: a BWP 0, a BWP 1, a BWP 2, and a BWP 3. The BWP 0 is an initial UL BWP, the BWP 1 is an active UL BWP, and the BWP 2 and the BWP 3 are inactive UL BWPs. The first bandwidth part is the BWP 1, the second bandwidth part is the BWP 0, and the first-type random access is 2-step random access. The terminal device performs 2-step random access in the BWP 1. The terminal device detects access duration of the 2-step random access or a quantity of times of sending a random access message. The random access message may also be referred to as a random access request, that is, the MsgA in FIG. 2. It is assumed that the first duration threshold is 5 seconds or the first quantity-of-time threshold is 5. If the access duration of the 2-step random access is greater than 5 seconds or the quantity of times of sending the random access message is greater than 5, it indicates that the 2-step random access in the BWP 1 fails. Therefore, in this case, the terminal device may switch to the BWP 0, and perform random access in the BWP 0. A case in which the first-type random access is the grant-free random access or the 4-step random access is similar, and details are not described herein.

It can be learned that, according to the method described in FIG. 5, a success rate of random access can be improved, and it can be ensured that the terminal device accesses a network in a timely manner.

When the random access configured for the first bandwidth part includes one or more of the grant-free random access, the 2-step random access, or the 4-step random access, possible random access in the first bandwidth part may have the following seven configuration manners. The following describes step 501 to step 503 in detail for each configuration manner.

1. Only the 2-Step Random Access is Configured for the First Bandwidth Part

In the configuration manner 1, only the 2-step random access is configured for the first bandwidth part. Therefore, the first-type random access is the 2-step random access.

Figure 6:
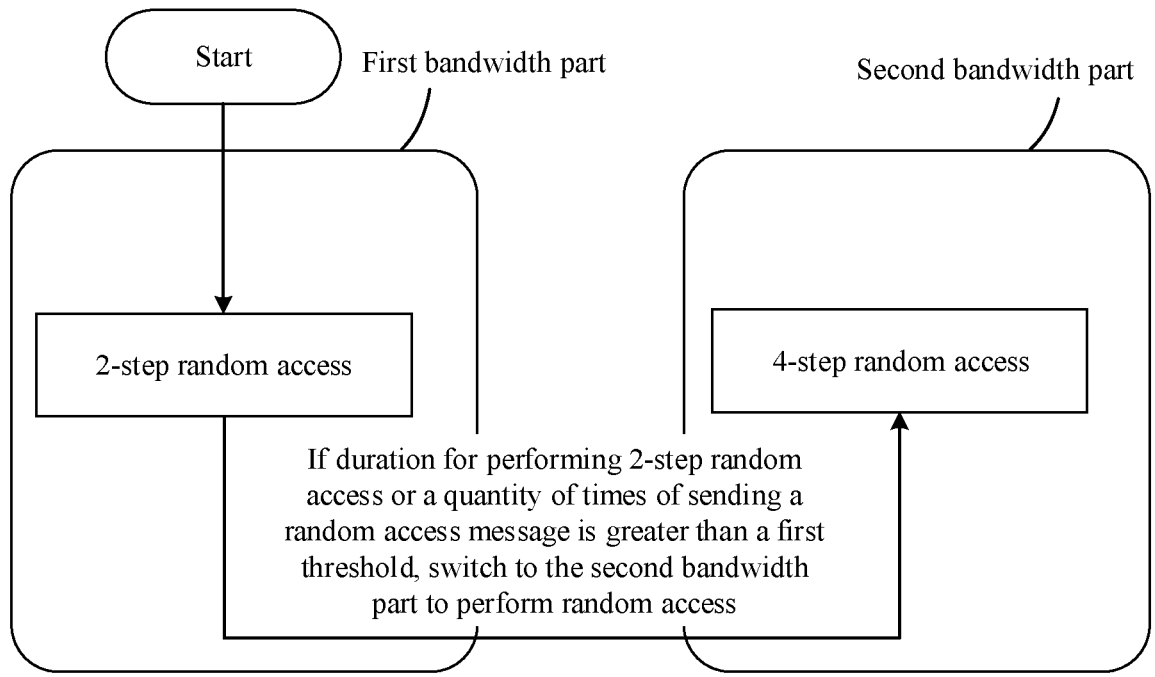
FIG. 6 is a schematic flowchart of another random access method according to an embodiment of this application.

FIG. 6 is a schematic diagram of another random access method according to an embodiment of this application. As shown in FIG. 6, only the 2-step random access is configured for the first bandwidth part. Therefore, the terminal device may directly perform 2-step random access in the first bandwidth part. If duration in which the terminal device performs 2-step random access in the first bandwidth part or a quantity of times of sending a random access message is greater than the first threshold, the terminal device performs random access in the second bandwidth part. In all schematic diagrams of embodiments of this application, an example in which only the 4-step random access is configured for the second bandwidth part and the terminal device performs 4-step random access in the second bandwidth part is used. Certainly, in all embodiments of this application, a plurality of types of random access may alternatively be configured for the second bandwidth part, and the terminal device selects one type of random access configured for the second bandwidth part to perform random access. For details about how the terminal device selects one type of random access configured for the second bandwidth part, refer to the following corresponding descriptions. Details are not described herein again.

In an optional implementation, when a random access transmission occasion (PRACH occasion, RO) resource corresponding to the 2-step random access is unavailable and a physical uplink shared channel transmission occasion (PUSCH occasion, PO) resource corresponding to the RO resource is available, a specific implementation in which the terminal device performs 2-step random access in the first bandwidth part is: The terminal device sends a random access message to an access network device on the PO resource in the first bandwidth part, where the random access message includes uplink data carried on a PUSCH; and the terminal device receives a response message that is for the random access message and that is sent by the access network device.

In embodiments of this application, a PRACH resource may be represented by an RO resource. The RO resource represents a time-frequency resource for transmitting a preamble, includes one or more subcarriers in frequency domain, and includes one or more time domain symbols in time domain. A PUSCH resource may be represented by a PO resource. The PO resource represents a time-frequency resource for transmitting a PUSCH, includes one or more subcarriers in frequency domain, and includes one or more time domain symbols in time domain.

Figure 7:
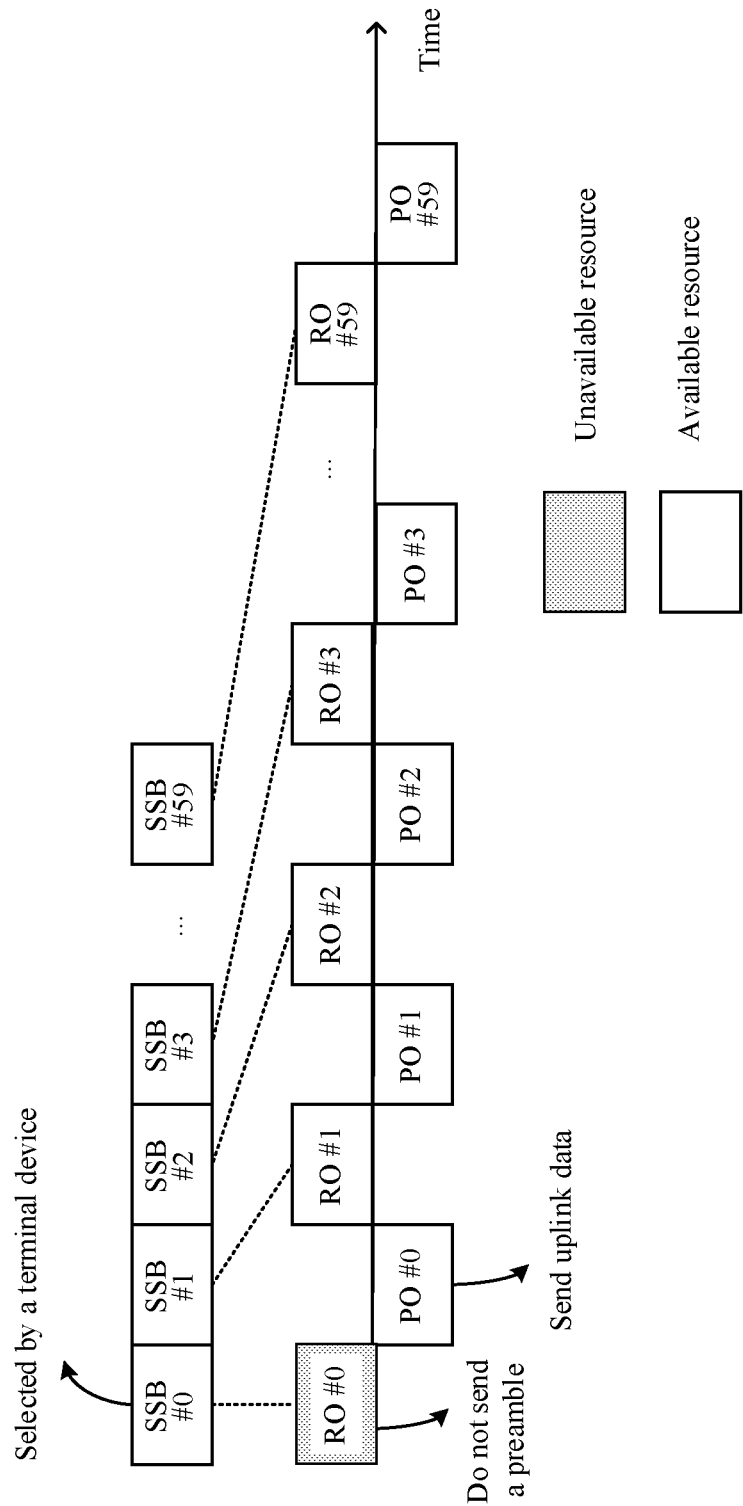
FIG. 7 is a schematic diagram of a random access transmission occasion and a physical uplink shared channel transmission occasion according to an embodiment of this application.

In embodiments of this application, configuration parameters of the 2-step random access include a correspondence between a synchronization signal block (SS/PBCH block, SSB) and an RO resource and a correspondence between an RO resource and a PO resource, or include parameters for configuring the foregoing correspondences. The access network device periodically sends an SSB. The access network device sends a plurality of SSBs in each period. As shown in FIG. 7, for example, the access network device may send 60 SSBs in one period, which are respectively an SSB #0 to an SSB #59. Each SSB corresponds to at least one RO for the 2-step random access. As shown in FIG. 7, the SSB #0 corresponds to an RO #0, the SSB #1 corresponds to an RO #1, . . . , and the SSB #59 corresponds to an RO #59. The RO #0 corresponds to a PO #0, the RO #1 corresponds to a PO #1, . . . , and the RO #59 corresponds to a PO #59. After detecting the plurality of SSBs, the terminal device may select one SSB from the plurality of SSBs. For example, the terminal device may select an SSB with a largest reference signal received power (reference signal received power, RSRP) measurement value, or select any SSB whose RSRP measurement value is greater than a preset RSRP threshold, or select any SSB when RSRP measurement values of all SSBs are less than a preset RSRP threshold. As shown in FIG. 7, assuming that the terminal device selects the SSB #0, if the RO #0 is unavailable and the PO #0 is available, the terminal device does not send, on the RO #0, a preamble carried on a PRACH, and the terminal device sends, on the PO #0, uplink data carried on a PUSCH.

In this optional implementation, the uplink data can be sent to the access network device in a timely manner.

In an optional implementation, when an RO resource corresponding to the 2-step random access is available and a PO resource corresponding to the RO resource is unavailable, a specific implementation in which the terminal device performs 2-step random access in the first bandwidth part is: The terminal device sends a random access message to an access network device on the RO resource in the first bandwidth part, where the random access message includes a preamble carried on a PRACH; and the terminal device receives a response message that is for the random access message and that is sent by the access network device.

Figure 8:
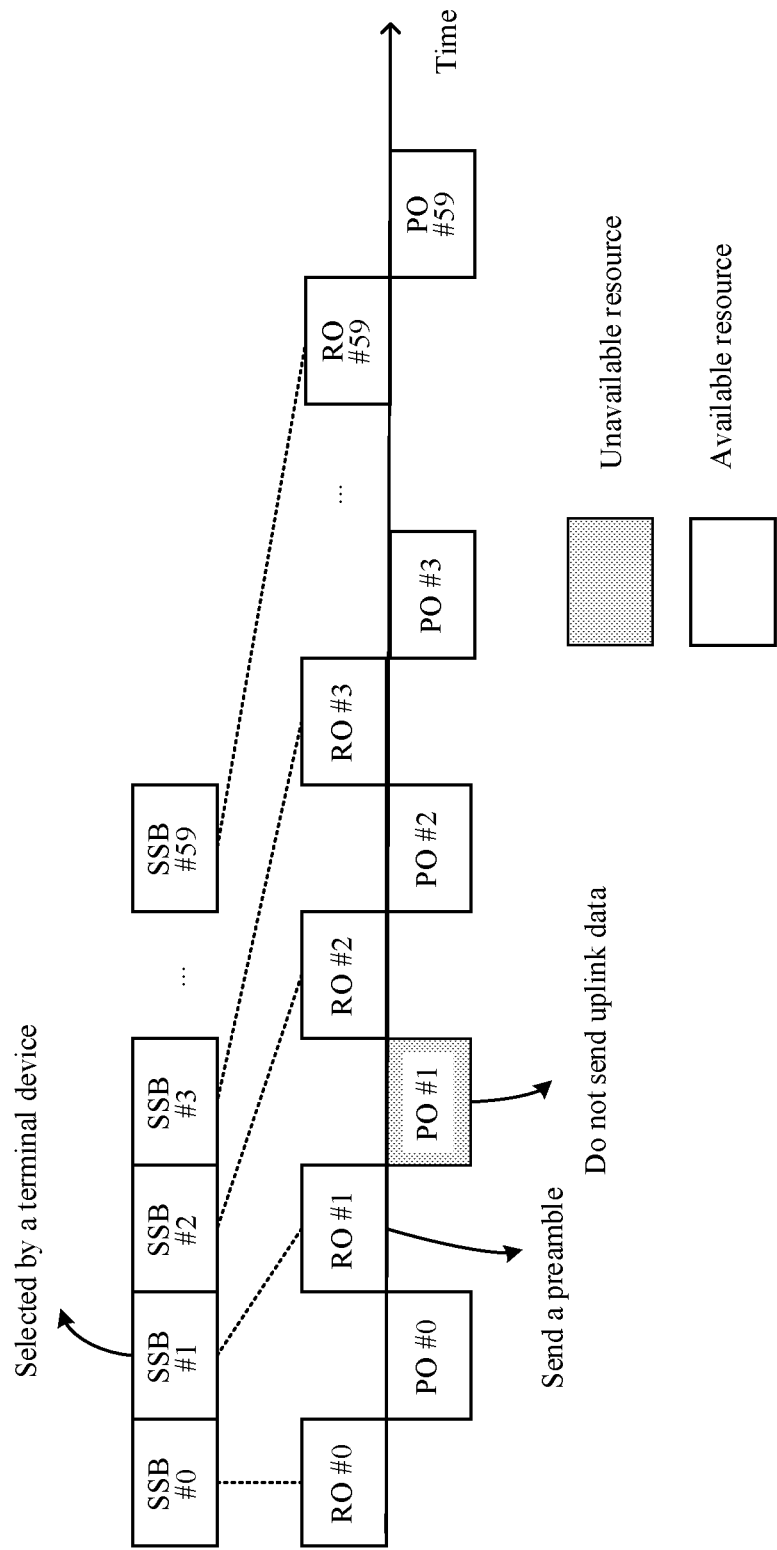
FIG. 8 is a schematic diagram of another random access transmission occasion and another physical uplink shared channel transmission occasion according to an embodiment of this application.

For example, as shown in FIG. 8, assuming that the terminal device selects the SSB #1, if the RO #1 is available and the PO #1 is unavailable, the terminal device sends, on the RO #1, a preamble carried on a PRACH, and the terminal device does not send, on the PO #1, uplink data carried on a PUSCH.

In this optional implementation, the preamble can be sent to the access network device in a timely manner.

Optionally, when the RO resource corresponding to the 2-step random access is available, and the PO resource corresponding to the RO resource is unavailable, the access network device sends a response message for the random access message after successfully detecting the preamble sent by the terminal device. The information includes uplink scheduling grant indication information, and the uplink scheduling grant indication information is used to indicate a transmission resource of a MsgA PUSCH. The terminal device sends, on the transmission resource indicated by the uplink scheduling grant indication information, uplink data carried on the PUSCH.

In this optional implementation, it helps the terminal device send the uplink data to the access network device in a timely manner.

In another embodiment, if the RO resource corresponding to the 2-step random access is available, and the PO resource corresponding to the RO resource is unavailable, the terminal device may discard the RO resource. The terminal device waits for a next available RO resource and PO resource, sends, on the available RO resource, the preamble carried on the PRACH, and sends, on the available PO resource associated with the available RO resource, the uplink data carried on the PUSCH.

In another embodiment, if the RO resource corresponding to the 2-step random access is unavailable, and the PO resource corresponding to the RO resource is available, the terminal device may discard the PO resource. The terminal device waits for a next available RO resource and PO resource, sends, on the available RO resource, the preamble carried on the PRACH, and sends, on the available PO resource associated with the available RO resource, the uplink data carried on the PUSCH.

Figure 9:
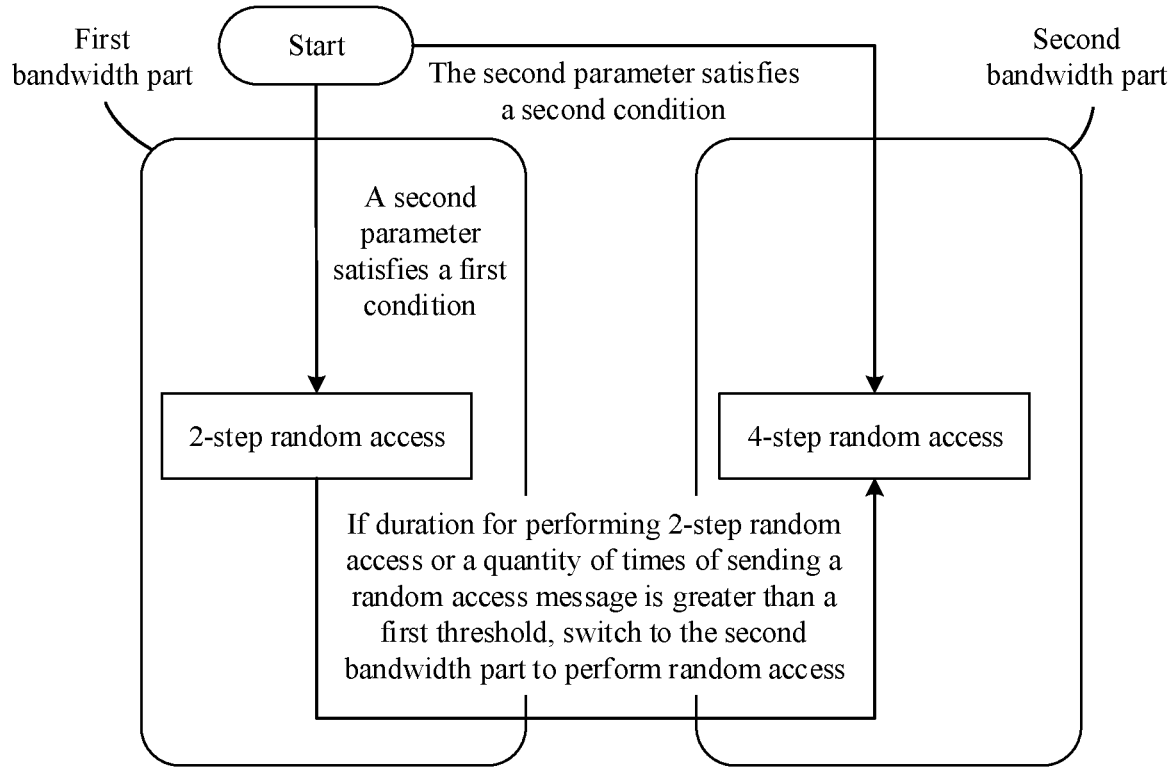
FIG. 9 is a schematic flowchart of still another random access method according to an embodiment of this application.

In an optional implementation, as shown in FIG. 9, the terminal device may alternatively first determine whether a second parameter satisfies a first condition. If the second parameter satisfies the first condition, the terminal device performs 2-step random access in the first bandwidth part. If the second parameter satisfies a second condition, the terminal device switches to the second bandwidth part to perform random access.

The second parameter includes at least one of a reference signal received power (reference signal received power, RSRP) measurement value, a size of to-be-transmitted uplink data, a network status of 2-step random access, and a time difference measurement value. The first condition and the second condition are different.

(1) The Second Parameter Includes the RSRP Measurement Value.

When the terminal initiates random access, if uplink time out-of-synchronization occurs between the terminal device and the access network device, a channel condition between the terminal and the access network device may be interfered with by another user due to the uplink time out-of-synchronization, and consequently uplink channel quality is relatively poor. Similarly, if quality of an uplink channel between the terminal and the access network is relatively poor, it may be caused by uplink asynchronization between the terminal and the access network device.

When the uplink channel quality is relatively poor, or the uplink time out-of-synchronization occurs between the terminal device and the access network device, in the 4-step random access, because the preamble is sent before the uplink data, after receiving the preamble, the access network device sends TA to the terminal device, so that the terminal device may first perform time synchronization with the access network device. Because the terminal device is time-synchronized with the access network device, a probability that the access network device successfully decodes the uplink data sent during the 4-step random access is relatively high. In the 2-step random access, the preamble and the uplink data are simultaneously sent. In this case, the access network device may successfully detect the preamble, but fails to decode the data. Then, the access network device sends a response message for the preamble to the terminal device, where the response message includes a TA command, a temporary cell radio network temporary identifier TC-RNTI, and an uplink scheduling grant. The terminal may modulate uplink time synchronization based on the TA command carried in the response message, and resend the uplink data in the random access message based on the uplink scheduling grant in the response message. In the grant-free random access, the preamble is not sent, and the uplink data is directly sent. In this case, the access network device fails to decode the data, and the access network device cannot obtain an accurate TA value. Therefore, the terminal cannot adjust uplink time synchronization in a timely manner. It can be learned from the foregoing analysis that, to reduce a random access latency (or ensure a latency characteristic of each random access manner), channel quality requirements of the 4-step random access, the 2-step random access, and the grant-free random access are in ascending order.

In this embodiment of this application, if determining that the RSRP measurement value is greater than or equal to an RSRP threshold, the terminal device performs 2-step random access in the first bandwidth part. If the RSRP measurement value is less than the RSRP threshold, the terminal device may switch to the second bandwidth part to perform random access. For example, 4-step random access is performed in the second bandwidth part. In other words, the first condition is that the RSRP measurement value is greater than or equal to the RSRP threshold, and the second condition is that the RSRP measurement value is less than the RSRP threshold.

The RSRP measurement value may be a received power measurement value of a synchronization signal block (SS/PBCH block, SSB). The RSRP measurement value may be an RSRP value of an SSB selected by the terminal device. Alternatively, the RSRP measurement value may be an average value of RSRP values of a plurality of SSBs. For example:

$$M_{rsrp\_cell} = \sum_{i=0}^{N_{ssb\_max}} ss\_rsrp / N_{ssb\_max}$$

Herein, $M_{rsrp\_cell}$ is the average value of the RSRP values of the plurality of SSBs. ss_rsrp is an instantaneous RSRP value of each SSB for calculating the average value, and $N_{ssb\_max}$ is a quantity of SSBs for calculating the average value. The access network device may configure a minimum RSRP threshold thresh_ssb_consolidation of an SSB for calculating the average value and a quantity $N_{ssb}$ of SSBs for calculating the average value, where s_rsrp≥thresh_ssb_consolidation, and $N_{ssb\_max} \leq N_{ssb}$.

In this embodiment, when only the 2-step random access is configured for the first bandwidth part, the terminal device may first determine whether the RSRP measurement value is greater than or equal to a preset RSRP threshold. If the RSRP measurement value is greater than or equal to the preset RSRP threshold, channel quality is relatively good, and a success rate of performing 2-step random access is high. In this case, 2-step random access may be performed in the first bandwidth part. If the RSRP measurement value is less than the preset RSRP threshold, channel quality is relatively poor, and a success rate of performing 2-step random access is low. In this case, the second bandwidth part may be used, and other random access is performed in the second bandwidth part, for example, 4-step random access is performed in the second bandwidth part. It can be learned that determining random access based on the RSRP measurement value helps improve a success rate of random access.

(2) The Second Parameter Includes the Size of the To-Be-Transmitted Uplink Data.

Under a same channel quality condition and/or a basically same transmission resource condition, a smaller to-be-transmitted data packet indicates a higher decoding success rate. Therefore, if a to-be-transmitted uplink data packet is relatively small, the to-be-transmitted uplink data packet may be preferentially sent through grant-free random access. Because small uplink data requires short transmission time, random access duration is not excessively long. Relatively large uplink data may be preferentially sent through 4-step random access. This helps avoid excessively long random access duration caused due to retransmission of the relatively large uplink data. Therefore, when the size of the to-be-transmitted uplink data is smaller, the terminal device may select a random access manner with shorter random access duration. Three random access manners are used herein as an example for description. When the size of the to-be-transmitted uplink data is greater than a first size threshold, 4-step random access may be performed. When the size of the to-be-transmitted uplink data is less than the first size threshold, and the size of the to-be-transmitted uplink data is greater than a second size threshold, 2-step random access may be performed. When the size of the to-be-transmitted uplink data is less than the second size threshold, grant-free random access may be performed. Therefore, the 2-step random access and the grant-free random access are suitable for transmitting relatively small uplink data. This helps reduce random access duration.

In this embodiment, when the second parameter is the size of the to-be-transmitted uplink data, if the terminal device determines that the size of the to-be-transmitted uplink data is less than or equal to an uplink data size threshold, the terminal device performs 2-step random access in the first bandwidth part. If the size of the to-be-transmitted uplink data is greater than the uplink data size threshold, the terminal device may switch to the second bandwidth part to perform random access. In other words, the first condition is that the size of the to-be-transmitted uplink data is less than or equal to the uplink data size threshold, and the second condition is that the size of the to-be-transmitted uplink data is greater than the uplink data size threshold.

The size of the to-be-transmitted uplink data may also be referred to as a payload (payload) of the to-be-transmitted uplink data. Alternatively, the size of the to-be-transmitted uplink data may be replaced with a payload level, and the uplink data size threshold may be replaced with a payload level threshold. For example, an uplink data payload corresponding to a payload level 0 is not greater than 56 bits, and an uplink data payload corresponding to a payload level 1 is not greater than 72 bits.

In this embodiment, if the size of the to-be-transmitted uplink data is less than or equal to a preset size threshold, it indicates that the uplink data is relatively small, and 2-step random access may be performed in the first bandwidth part. This helps reduce random access duration. If the size of the to-be-transmitted uplink data is greater than the preset size threshold, it indicates that the uplink data is relatively large, and the terminal device needs to switch to the second bandwidth part and perform other random access in the second bandwidth part, for example, perform 4-step random access in the second bandwidth part.

It can be learned that determining random access based on the size of the to-be-transmitted uplink data helps the terminal device access a network in a timely manner.

(3) The Second Parameter Includes the Network Status of Random Access.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration. Three random access manners are used herein as an example for description. If the quantity of active users of random access is less than or equal to a first active user quantity threshold, the terminal device may select the grant-free random access manner. If the quantity of active users of random access is greater than the first active user quantity threshold and less than or equal to a second active user quantity threshold, the terminal device may select the 2-step random access manner. If the quantity of active users of random access is greater than the second active user quantity threshold, the terminal device may select the 4-step random access manner. A principle of selecting a random access manner based on the resource amount or the system capacity is the same as that described above, and details are not described.

In a possible embodiment, the terminal may determine the network status by listening to a system resource usage status, to determine the random access manner.

In a possible embodiment, the access network device may determine, based on the network status, random access that the terminal device needs to select, and then indicate the random access to the terminal device by using indication information. For example, if a network status indication value is 2, the terminal may select the grant-free random access; if a network status indication value is 1, the terminal device may select the 2-step random access manner; otherwise, the terminal selects the 4-step random access manner. Values of the network status indication value are merely used to describe implementation of the foregoing predefined rule, and do not limit a specific form and value of the network status indication value.

In this embodiment, if the quantity of active users of random access is less than or equal to an active user quantity threshold, the terminal device performs 2-step random access in the first bandwidth part. If the quantity of active users of random access is greater than the active user quantity threshold, the terminal device performs random access in the second bandwidth part. If there are a large quantity of active users of random access, the 2-step random access of the terminal device may fail due to resource collision. Therefore, if there are a large quantity of active users of random access, the terminal device may switch to the second bandwidth part to perform other random access, for example, perform 4-step random access in the second bandwidth part. A case of the resource amount or the system capacity is similar, and details are not described herein. In other words, the first condition is that the quantity of active users of random access is less than or equal to the active user quantity threshold, and the second condition is that the quantity of active users of random access is greater than the active user quantity threshold.

In another embodiment, the access network device may determine, based on the network status of random access, random access that the terminal device needs to select, and then indicate the random access to the terminal device by using indication information. For example, when determining that the quantity of active users of random access is less than or equal to the active user quantity threshold, the access network device may indicate the terminal device to perform 2-step random access in the first bandwidth part. When determining that the quantity of active users of random access is greater than the active user quantity threshold, the access network device may indicate the terminal device to perform random access in the second bandwidth part. For example, 4-step random access is performed in the second bandwidth part.

It can be learned that determining random access based on the network status of 2-step random access helps improve a success rate of random access of the terminal device.

(4) The Second Parameter Includes the Time Difference Measurement Value.

Generally, the time difference measurement value is a time difference between reference time points of two random access time-frequency resources. For example, the reference time point may be a start symbol or an end symbol of a transmission occasion, a start symbol or an end symbol of a preamble in a random access message, a start symbol or an end symbol of a payload part in a random access message, a start symbol or an end symbol of a random access response corresponding to a random access message, or another specific location.

In this embodiment, only the 2-step random access is configured in the first bandwidth part, and the time difference measurement value may be a difference between a reference time point of the 2-step random access and a reference time point of a random access trigger event.

Figure 10:
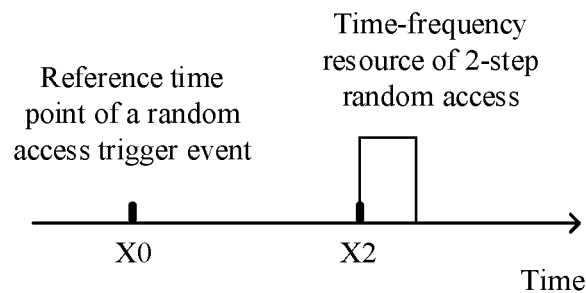
FIG. 10 is a schematic diagram of a reference time point according to an embodiment of this application.

For example, as shown in FIG. 10, the reference time point of the random access trigger event is X0, the reference time point of a time-frequency resource of the 2-step random access is X2, Y0 is the difference between the reference time point X0 of the 2-step random access and the reference time point X2 of the random access trigger event, and Y0=X2−X0. If Y0 is greater than or equal to a time difference threshold T0, the terminal device performs 2-step random access in the first bandwidth part. If Y0 is less than the time difference threshold T0, the terminal device performs random access in the second bandwidth part. In other words, the first condition is that Y0 is greater than or equal to the time difference threshold T0, and the second condition is that Y0 is less than the time difference threshold T0. T0 may be an empirical value. If Y0 is greater than or equal to the time difference threshold T0, it indicates that a user needs to wait for a relatively long time to perform random access. Therefore, if Y0 is greater than or equal to the time difference threshold T0, the terminal device may switch to the second bandwidth part to perform random access, for example, perform 4-step random access in the second bandwidth part.

It can be learned that determining random access based on the time difference measurement value helps the terminal device access a network in a timely manner.

Optionally, a plurality of types of information in the foregoing four types of information may be combined to determine whether to switch to the second bandwidth part for random access.

In an optional implementation, if a plurality of types of random access may be configured for the second bandwidth part, when the terminal device switches to the second bandwidth part because the first parameter is greater than the first threshold, the terminal device may select one of the plurality of random access manners to perform random access. Alternatively, the terminal device may select, based on a third parameter, one of the plurality of types of random access configured for the second bandwidth part, to perform random access. For example, the third parameter may be at least one of a reference signal received power (reference signal received power, RSRP) measurement value, a size of to-be-transmitted uplink data, a network status of random access, and time difference measurement values corresponding to the plurality of types of random access. It should be noted that this optional implementation may also be applied to another configuration manner.

(1) The Third Parameter Includes the RSRP Measurement Value.

When the RSRP measurement value is larger, the terminal device may select a random access manner with shorter random access duration.

For example, the grant-free random access, the 2-step random access, and the 4-step random access are configured for the second bandwidth part. If the RSRP measurement value is greater than or equal to a first RSRP threshold, the grant-free random access may be selected. If the RSRP measurement value is less than the first RSRP threshold and greater than a second RSRP threshold, the 2-step random access may be selected. If the RSRP measurement value is less than the second preset RSRP threshold, the 4-step random access may be selected. When two of the grant-free random access, the 2-step random access, and the 4-step random access are configured for the second bandwidth part, a selection principle is the same. Details are not described herein.

Determining random access based on the RSRP measurement value helps improve a success rate of random access.

(2) The Third Parameter Includes the Size of the To-Be-Transmitted Uplink Data.

When the size of the to-be-transmitted uplink data is smaller, the terminal device may select a random access manner with shorter random access duration.

For example, the grant-free random access, the 2-step random access, and the 4-step random access are configured for the second bandwidth part. If the size of the to-be-transmitted uplink data is less than or equal to a first uplink data size threshold, the grant-free random access may be selected. If the size of the to-be-transmitted uplink data is greater than the first uplink data size threshold and less than or equal to a second uplink data size threshold, the 2-step random access may be selected. If the size of the to-be-transmitted uplink data is greater than the second uplink data size threshold, the 4-step random access may be selected. When two of the grant-free random access, the 2-step random access, and the 4-step random access are configured for the second bandwidth part, a selection principle is the same. Details are not described herein.

Determining random access based on the size of the to-be-transmitted uplink data helps the terminal device access a network in a timely manner.

(3) The Third Parameter Includes the Network Status of Random Access.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration.

For example, the grant-free random access, the 2-step random access, and the 4-step random access are configured for the second bandwidth part. If the quantity of active users of random access is less than or equal to a first active user quantity threshold, the terminal device may select the grant-free random access manner. If the quantity of active users of random access is greater than the first active user quantity threshold and less than or equal to a second active user quantity threshold, the terminal device may select the 2-step random access manner. If the quantity of active users of random access is greater than the second active user quantity threshold, the terminal device may select the 4-step random access manner. A principle of selecting a random access manner based on the resource amount or the system capacity is the same as that described above, and details are not described. When two of the grant-free random access, the 2-step random access, and the 4-step random access are configured for the second bandwidth part, a selection principle is the same. Details are not described herein.

In a possible embodiment, the terminal may determine the network status by listening to a system resource usage status, to determine the random access manner.

In a possible embodiment, the access network device may determine, based on the network status, random access that the terminal device needs to select, and then indicate the random access to the terminal device by using indication information. For example, if a network status indication value is 2, the terminal may select PUSCH-only; if a network status indication value is 1, the terminal device may select the 2-step random access manner; otherwise, the terminal selects the 4-step random access manner.

Determining random access based on the network status of 2-step random access helps improve a success rate of random access.

(4) The Third Parameter Includes the Time Difference Measurement Value.

The time difference measurement value is a time difference between reference time points of two random access time-frequency resources. For example, for descriptions of the reference time point, refer to the descriptions corresponding to the second parameter. Details are not described herein again. The terminal device may select, in the second bandwidth part based on the time difference measurement value, a random access manner with a highest probability of accessing a network in a timely manner.

Figure 11:
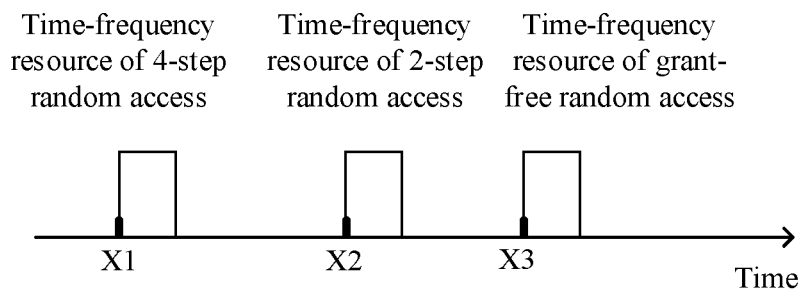
FIG. 11 is a schematic diagram of another reference time point according to an embodiment of this application.

For example, the 2-step random access, the 4-step random access, and the grant-free random access are configured for the terminal device. The 2-step random access is configured in the first bandwidth part, and the 4-step random access and the grant-free random access are configured in the second bandwidth part. As shown in FIG. 11, a location of a time-frequency resource of the 4-step random access is before a location of a time-frequency resource of the 2-step random access. The location of the time-frequency resource of the 2-step random access is before that of a time-frequency resource of the grant-free random access. A reference time point of the time-frequency resource of the 4-step random access is X1, a reference time point of the time-frequency resource of the 2-step random access is X2, and a reference time point of the time-frequency resource of the grant-free random access is X3. A time difference measurement value Y1 between the reference time point of the time-frequency resource of the 2-step random access and the reference time point of the time-frequency resource of the 4-step random access is X2–X1. A time difference measurement value Y2 between the reference time point of the time-frequency resource of the grant-free random access and the reference time point of the time-frequency resource of the 2-step random access is X3–X2. A time difference measurement value Y3 between the reference time point of the time-frequency resource of the grant-free random access and the reference time point of the time-frequency resource of the 4-step random access is X3–X1.

If Y3 is less than or equal to a time difference threshold T3, and Y2 is less than or equal to a time difference threshold T2, the terminal device performs grant-free random access in the second bandwidth part. If Y3 is greater than the time difference threshold T3, and Y1 is less than or equal to a time difference threshold T1, the terminal device performs 2-step random access in the first bandwidth part. If Y3 is greater than the time difference threshold T3, and Y1 is greater than the time difference threshold T1, the terminal device performs 4-step random access in the second bandwidth part.

The time difference threshold T3 may be a difference between average historical access duration of the grant-free random access and average historical access duration of the 4-step random access. Alternatively, T3 may be an empirical value. The time difference threshold T2 may be a difference between the average historical access duration of the grant-free random access and average historical access duration of the 2-step random access. Alternatively, T2 may be an empirical value. The time difference threshold T1 may be a difference between the average historical access duration of the 4-step random access and the average historical access duration of the 2-step random access. Alternatively, T1 may be an empirical value.

For example, if T3 is 10 ms, it indicates that access duration of the grant-free random access is 10 ms shorter than access duration of the 4-step random access. If the time difference measurement value Y3 between the reference time point of the time-frequency resource of the grant-free random access and the reference time point of the time-frequency resource of the 4-step random access is 8, it indicates that the time-frequency resource of the grant-free random access is only 8 ms later than the time-frequency resource of the 4-step random access. In this case, time of successfully accessing a network through the grant-free random access is 2 ms earlier than time of successfully accessing a network through the 4-step random access. Likewise, if T2 is 5 ms, it indicates that access duration of the grant-free random access is 5 ms shorter than access duration of the 4-step random access. If the time difference measurement value Y2 between the reference time point of the time-frequency resource of the grant-free random access and the reference time point of the time-frequency resource of the 2-step random access is 4, it indicates that the time-frequency resource of the grant-free random access is only 4 ms later than the time-frequency resource of the 4-step random access. In this case, time of successfully accessing a network through the grant-free random access is 1 ms earlier than time of successfully accessing a network through the 4-step random access. Therefore, when Y3 is less than or equal to the time difference threshold T3, and Y2 is less than or equal to the time difference threshold T2, selecting the grant-free random access can access a network in a more timely manner. A principle used when the 2-step random access or the 4-step random access is selected is the same, and details are not described herein.

It can be learned that determining random access based on the time difference measurement value helps the terminal device access a network in a timely manner.

2. Only the Grant-Free Random Access is Configured for the First Bandwidth Part

In the configuration manner 2, only the grant-free random access is configured for the first bandwidth part. Therefore, the first-type random access is the grant-free random access.

Figure 12:
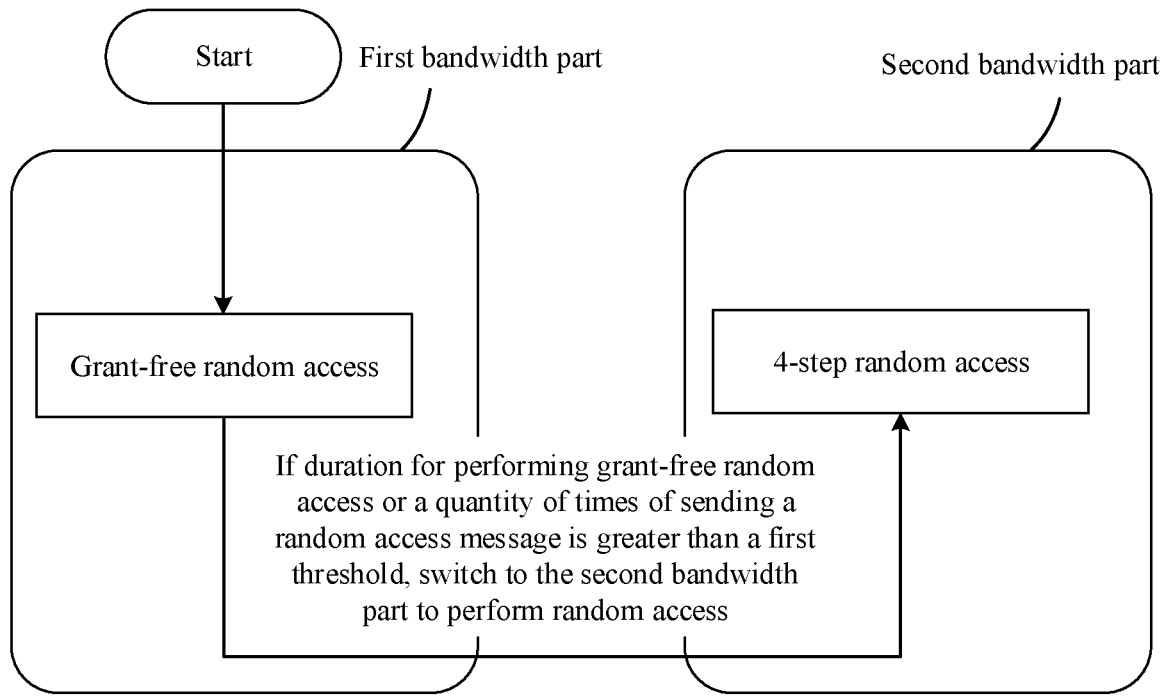
FIG. 12 is a schematic flowchart of still another random access method according to an embodiment of this application.

FIG. 12 is a schematic diagram of another random access method according to an embodiment of this application. As shown in FIG. 12, only the grant-free random access is configured for the first bandwidth part. Therefore, the terminal device may directly perform grant-free random access in the first bandwidth part. If duration in which the terminal device performs grant-free random access in the first bandwidth part or a quantity of times of sending a random access message is greater than the first threshold, the terminal device performs random access in the second bandwidth part.

Figure 13:
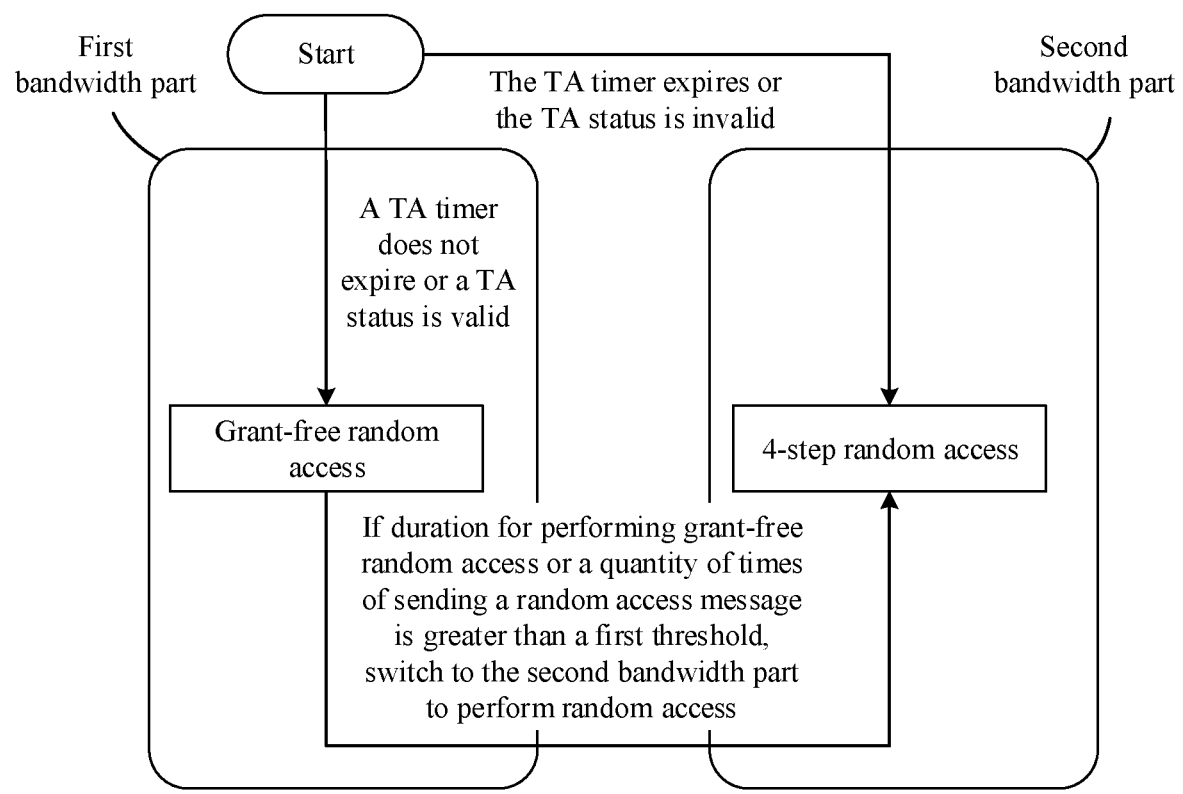
FIG. 13 is a schematic flowchart of still another random access method according to an embodiment of this application.

In a first optional implementation, as shown in FIG. 13, before performing grant-free random access in the first bandwidth part, the terminal device further needs to determine whether a TA timer expires or whether a TA status is valid. The terminal device performs grant-free random access in the first bandwidth part only if the TA timer does not expire or the TA status is valid. As shown in FIG. 13, if the TA timer expires or the TA status is invalid, or duration in which the terminal device performs grant-free random access in the first bandwidth part or a quantity of times of sending a random access message is greater than the first threshold, the terminal device performs random access in the second bandwidth part.

After the terminal device performs random access to an access network device, the access network device feeds back TA to the terminal device. The TA has a validity period. For example, if the validity period of the TA is 10 minutes, that the TA timer expires means that a value of the TA timer exceeds 10 minutes. If the TA timer expires, the TA status is invalid, and it indicates that in this case, the terminal device may not be synchronized with the access network device in terms of time. If the TA timer does not expire, or the TA status is valid, it indicates that the terminal device is synchronized with the access network device in terms of time. When the terminal device is synchronized with the access network device in terms of time, a success rate of performing grant-free random access is relatively high. Therefore, grant-free random access is performed in the first bandwidth part only when the TA timer does not expire or the TA status is valid. This helps improve a success rate of random access.

Figure 14:
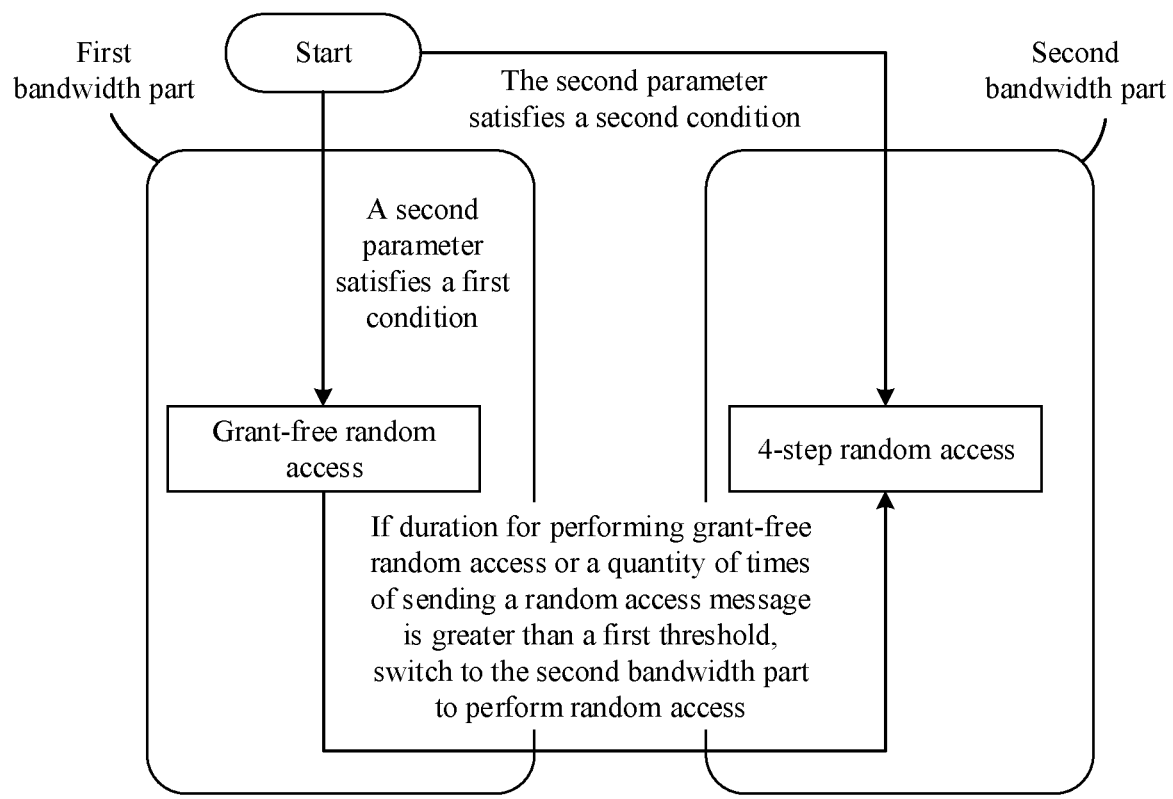
FIG. 14 is a schematic flowchart of still another random access method according to an embodiment of this application.

In a second optional implementation, as shown in FIG. 14, before performing grant-free random access in the first bandwidth part, the terminal device further needs to determine whether a second parameter satisfies a first condition. The terminal device performs grant-free random access in the first bandwidth part only if the second parameter satisfies the first condition. As shown in FIG. 14, if the second parameter satisfies a second condition, or duration in which the terminal device performs grant-free random access in the first bandwidth part or a quantity of times of sending a random access message is greater than the first threshold, the terminal device performs random access in the second bandwidth part. The first condition and the second condition are different.

The second parameter includes at least one of a reference signal received power RSRP measurement value, a size of to-be-transmitted uplink data, a network status of random access, and a time difference measurement value.

(1) The Second Parameter Includes the RSRP Measurement Value.

A specific implementation principle of determining, based on the RSRP measurement value, whether to perform grant-free random access in the first bandwidth part is the same as the specific implementation principle of determining, based on the RSRP measurement value, whether to perform 2-step random access in the first bandwidth part in the configuration manner 1. Details are not described herein. The 2-step random access in the configuration manner 1 may be replaced with the grant-free random access.

(2) The Second Parameter Includes the Size of the To-Be-Transmitted Uplink Data.

A specific implementation principle of determining, based on the network status of random access, whether to perform grant-free random access in the first bandwidth part is the same as the specific implementation principle of determining, based on the network status of random access, whether to perform 2-step random access in the first bandwidth part in the configuration manner 1. The 2-step random access in the configuration manner 1 may be replaced with the grant-free random access.

(3) The Second Parameter Includes the Network Status of Random Access.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration.

Alternatively, the access network device determines, based on the network status (for example, at least one of a plurality of conditions such as a quantity of active users, an available random access resource amount, and/or a system capacity), random access that the terminal device needs to select, and then indicates the random access to the terminal device by using indication information.

A specific implementation principle of determining, based on the network status of random access, whether to perform grant-free random access in the first bandwidth part is the same as the specific implementation principle of determining, based on the network status of random access, whether to perform 2-step random access in the first bandwidth part in the configuration manner 1. The 2-step random access in the configuration manner 1 may be replaced with the grant-free random access.

(4) The Second Parameter Includes the Time Difference Measurement Value.

In this embodiment, only the grant-free random access is configured in the first bandwidth part, and the time difference measurement value may be a difference between a reference time point of the grant-free random access and a reference time point of a random access trigger event. A specific implementation principle of determining, based on the time difference measurement value, whether to perform grant-free random access in the first bandwidth part is the same as the specific implementation principle of determining, based on the time difference measurement value, whether to perform 2-step random access in the first bandwidth part in the configuration manner 1. The 2-step random access in the configuration manner 1 may be replaced with the grant-free random access.

Figure 15:
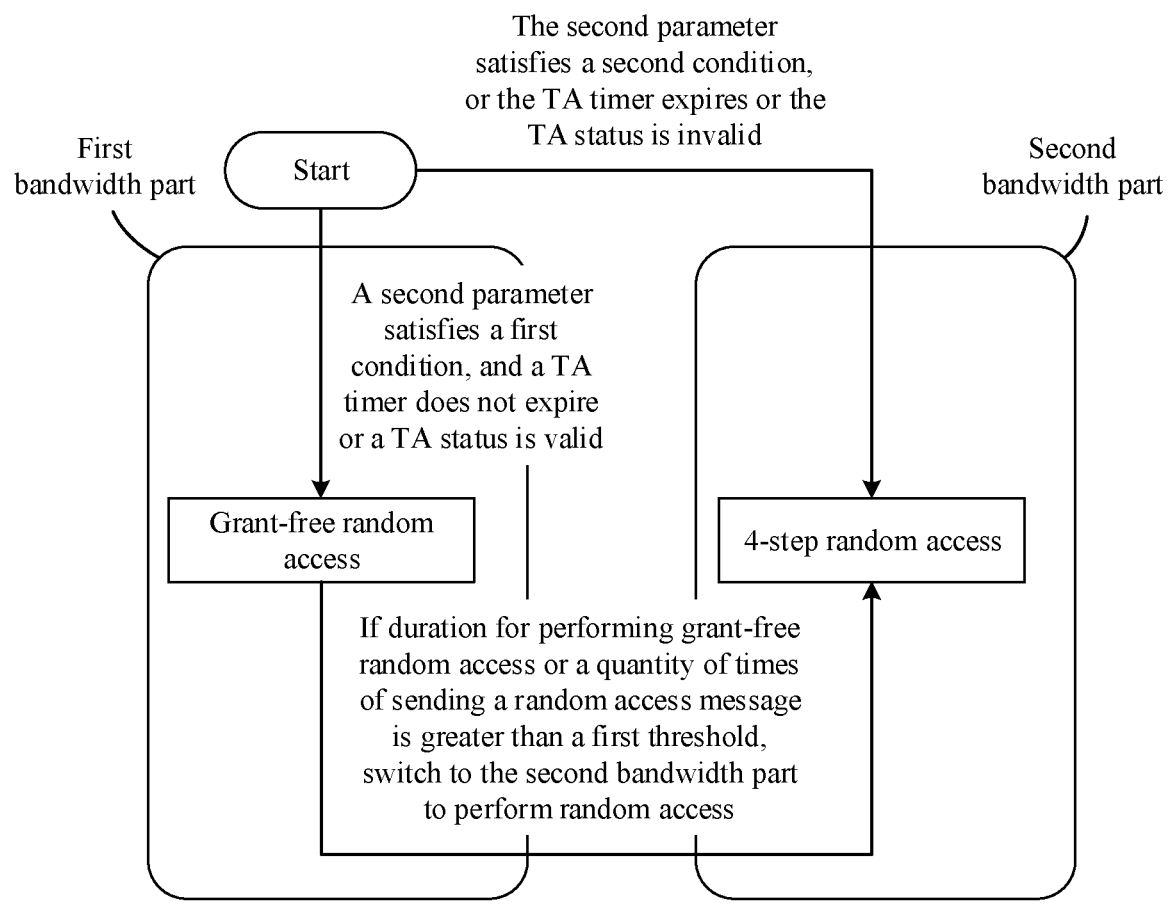
FIG. 15 is a schematic flowchart of still another random access method according to an embodiment of this application.

In a third optional implementation, the first optional implementation and the second optional implementation may be combined, and random access is selected based on both TA and a second parameter. For example, as shown in FIG. 15, the terminal device performs grant-free random access in the first bandwidth part only if the second parameter satisfies a first condition and a TA timer does not expire or a TA status is valid. As shown in FIG. 15, if the TA timer expires or the TA status is invalid, or the second parameter satisfies a second condition, or if the TA timer expires or the TA status is invalid, or duration in which the terminal device performs grant-free random access in the first bandwidth part or a quantity of times of sending a random access message is greater than the first threshold, the terminal device performs random access in the second bandwidth part.

The second parameter and a preset rule corresponding to the second parameter are applicable to another scenario or another similar embodiment.

In another possible implementation, when the terminal device switches to the second bandwidth part, the terminal device initiates random access in the second bandwidth part. A random access manner is not limited to a 4-step random access manner. If the second parameter and the preset rule corresponding to the second parameter change in different bandwidth parts, or duration of random access selected by the terminal device in the first bandwidth part or a quantity of times of sending a random access message is greater than a maximum transmission quantity-of-time threshold corresponding to the first bandwidth part, the terminal device may select a random access manner based on a specific status in the second bandwidth part. A specific embodiment or step is not limited herein.

3. Only the 4-Step Random Access is Configured for the First Bandwidth Part

In the configuration manner 3, only the 4-step random access is configured for the first bandwidth part. Therefore, the first-type random access is the 4-step random access. Only the 4-step random access is configured for the first bandwidth part. Therefore, the terminal device may directly perform 4-step random access in the first bandwidth part. If duration in which the terminal device performs 4-step random access in the first bandwidth part or a quantity of times of sending a random access message is greater than the first threshold, the terminal device performs random access in the second bandwidth part.

In an optional implementation, if a plurality of types of random access may be configured for the second bandwidth part, when the terminal switches to the second bandwidth part because the first parameter is greater than the first threshold, the terminal may select one of the plurality of random access manners to perform random access. Alternatively, the terminal device may select, based on a third parameter, one of the plurality of types of random access configured for the second bandwidth part, to perform random access. For specific steps, refer to the foregoing descriptions.

4. The Grant-Free Random Access and the 2-Step Random Access are Configured for the First Bandwidth Part In the configuration manner 4, the first-type random access may be either of the grant-free random access and the 2-step random access.

Figure 16:
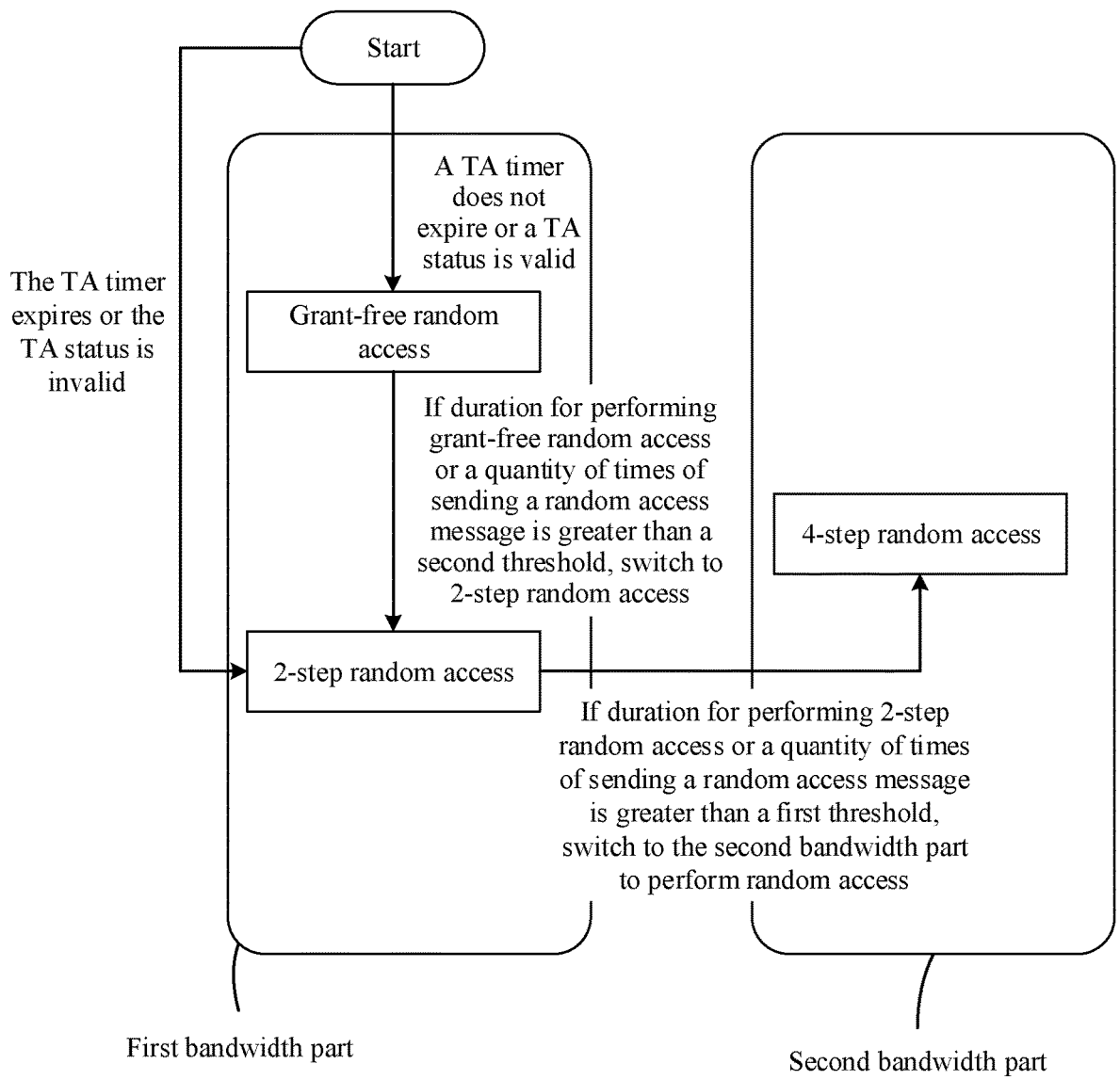
FIG. 16 is a schematic flowchart of still another random access method according to an embodiment of this application.

In a first optional implementation, FIG. 16 is a schematic diagram of another random access method according to an embodiment of this application. As shown in FIG. 16, the grant-free random access and the 2-step random access are configured for the first bandwidth part. The terminal device performs grant-free random access in the first bandwidth part if a TA timer does not expire or a TA status is valid. If a TA timer corresponding to the grant-free random access expires or a TA status corresponding to the grant-free random access is invalid, or duration for performing grant-free random access in the first bandwidth part or a quantity of times of sending a random access message is greater than a second threshold, the terminal device performs 2-step random access in the first bandwidth part. If duration in which the terminal device performs 2-step random access in the first bandwidth part or a quantity of times of sending a random access message is greater than the first threshold, the terminal device performs random access in the second bandwidth part.

In other words, in the first optional implementation, when the TA timer does not expire or the TA status is valid, the grant-free random access is preferentially selected to perform random access in the first bandwidth part. If the grant-free random access in the first bandwidth part is unavailable (that is, the duration for performing grant-free random access in the first bandwidth part is greater than a second duration threshold or the quantity of times of sending a random access message is greater than a second quantity-of-time threshold), the 2-step random access is selected to perform random access in the first bandwidth part. If the 2-step random access in the first bandwidth part is unavailable (that is, the duration for performing 2-step random access in the first bandwidth part is greater than a third duration threshold corresponding to the 2-step random access or the quantity of times of sending a random access message is greater than a third quantity-of-time threshold corresponding to the 2-step random access), the terminal device switches to the second bandwidth part to perform random access, for example, perform 4-step random access. It can be learned that in the first optional implementation, when the TA timer does not expire or the TA status is valid, the grant-free random access is preferentially selected. This helps improve a success rate of random access and helps reduce an uplink data transmission latency.

Figure 17:
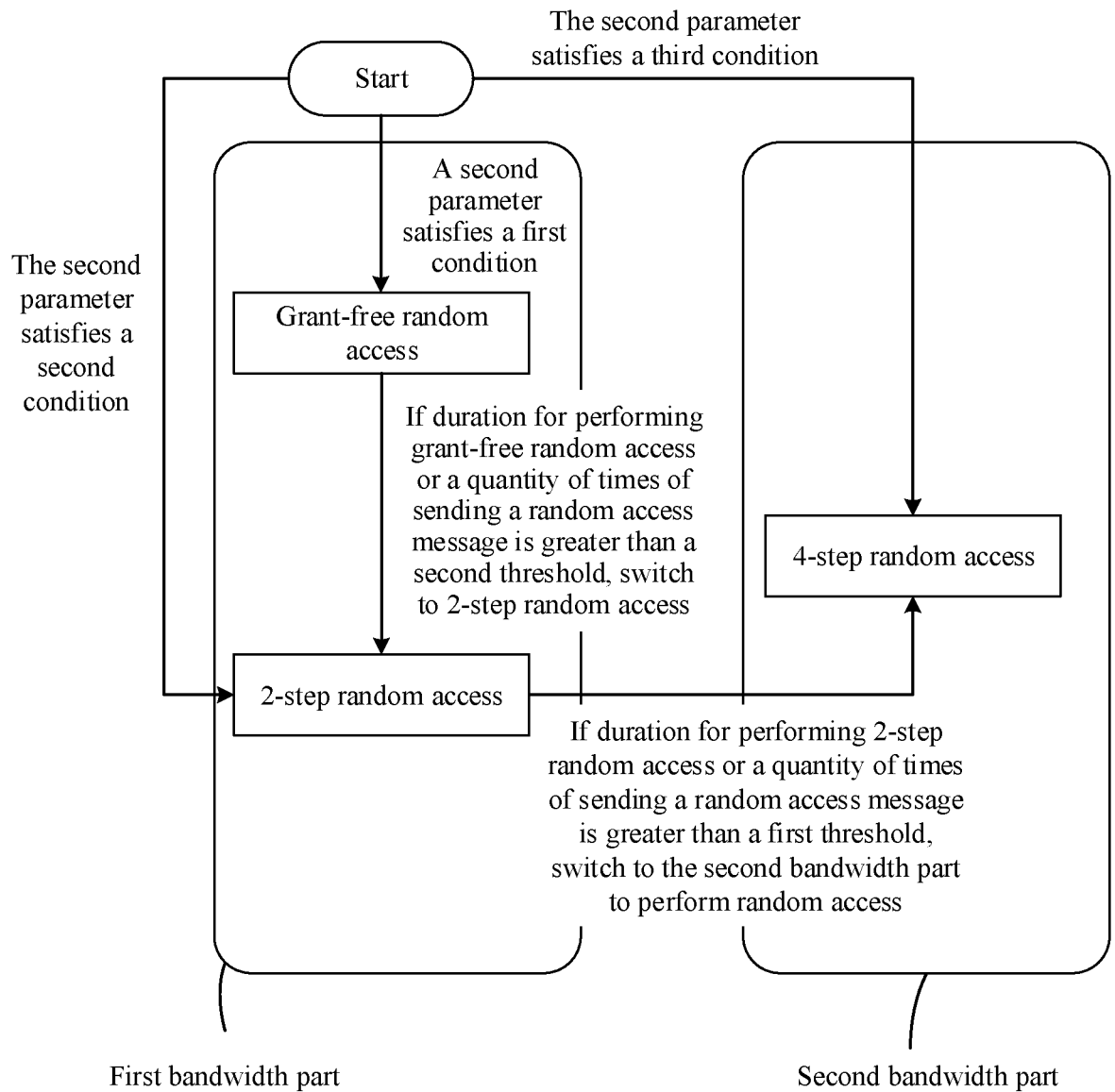
FIG. 17 is a schematic flowchart of still another random access method according to an embodiment of this application.

In a second optional implementation, FIG. 17 is a schematic diagram of another random access method according to an embodiment of this application. As shown in FIG. 17, the grant-free random access and the 2-step random access are configured for the first bandwidth part. Grant-free random access is performed in the first bandwidth part if a second parameter satisfies a first condition. The terminal device performs 2-step random access in the first bandwidth part if duration for performing grant-free random access in the first bandwidth part or a quantity of times of sending a random access message is greater than a second threshold, or the second parameter satisfies a second condition. The terminal device performs random access in the second bandwidth part if the second parameter satisfies a third condition, or duration for performing 2-step random access in the first bandwidth part or a quantity of times of sending a random access message is greater than the first threshold.

The second parameter includes at least one of an RSRP measurement value, a size of to-be-transmitted uplink data, a network status of random access, and a time difference measurement value. For beneficial effects of the second optional implementation, refer to the descriptions corresponding to the second parameter in the configuration manner 1. Details are not described herein again.

(1) The Second Parameter Includes the RSRP Measurement Value.

In this embodiment of this application, if the RSRP measurement value is greater than or equal to a first RSRP threshold, the terminal device performs grant-free random access in the first bandwidth part. If the RSRP measurement value is less than the first preset RSRP threshold and greater than a second RSRP threshold, the terminal device performs 2-step random access in the first bandwidth part. If the RSRP measurement value is less than the second RSRP threshold, the terminal device performs random access in the second bandwidth part, for example, performs 4-step random access in the second bandwidth part. In other words, the first condition is that the RSRP measurement value is greater than or equal to the first RSRP threshold. The second condition is that the RSRP measurement value is less than the first preset RSRP threshold and greater than the second RSRP threshold. The third condition is that the RSRP measurement value is less than the second RSRP threshold.

Determining random access based on the RSRP measurement value helps improve a success rate of random access.

(2) The Second Parameter Includes the Size of the To-Be-Transmitted Uplink Data.

In this embodiment of this application, if the size of the to-be-transmitted uplink data is less than or equal to a first uplink data size threshold, the terminal device performs grant-free random access in the first bandwidth part. If the size of the to-be-transmitted uplink data is greater than the first uplink data size threshold and less than or equal to a second uplink data size threshold, the terminal device performs 2-step random access in the first bandwidth part. If the size of the to-be-transmitted uplink data is greater than the second uplink data size threshold, the terminal device performs random access in the second bandwidth part, for example, performs 4-step random access in the second bandwidth part. In other words, the first condition is that the size of the to-be-transmitted uplink data is less than or equal to the first uplink data size threshold. The second condition is that the size of the to-be-transmitted uplink data is greater than the first uplink data size threshold and less than or equal to the second uplink data size threshold. The third condition is that the size of the to-be-transmitted uplink data is greater than the second uplink data size threshold.

Determining random access based on the size of the to-be-transmitted uplink data helps the terminal device access a network in a timely manner.

(3) The Second Parameter Includes a Network Status of Random Access Configured for the First Bandwidth Part.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration.

Alternatively, the access network device determines, based on the network status (for example, at least one of a plurality of conditions such as a quantity of active users, an available random access resource amount, and/or a system capacity), random access that the terminal device needs to select, and then indicates the random access to the terminal device by using indication information.

In this embodiment, for example, if the quantity of active users of random access is less than or equal to a first active user quantity threshold, the terminal device performs grant-free random access in the first bandwidth part. If the quantity of active users of random access is greater than the first active user quantity threshold and less than a second active user quantity threshold, the terminal device performs 2-step random access in the first bandwidth part. If the quantity of active users of random access is greater than the second active user quantity threshold, the terminal device switches to the second bandwidth part to perform random access, for example, performs 4-step random access in the second bandwidth part. A principle of selecting a random access manner based on the resource amount or the system capacity is the same as that described above, and details are not described. In other words, the first condition is that the quantity of active users of random access is less than or equal to the first active user quantity threshold. The second condition is that the quantity of active users of random access is greater than the first active user quantity threshold and less than the second active user quantity threshold. The third condition is that the quantity of active users of random access is greater than the second active user quantity threshold.

In another possible embodiment, the access network device may send a network status indication value to the terminal to determine a random access manner. For example, if the network status indication value sent by the access network device is 2, the terminal device may select the grant-free random access manner. If the network status indication value sent by the access network device is 1, the terminal device may select the 2-step random access manner.

If the network status indication value sent by the access network device is 0, the terminal device may switch to the second bandwidth part to initiate random access, for example, perform 4-step random access in the second bandwidth part. In this embodiment, a relationship between a network status indication value and a random access manner is not limited to the described example. The network device may send different network status indication values to different users.

Determining random access based on the network status of 2-step random access helps improve a success rate of random access.

(4) The Second Parameter Includes the Time Difference Measurement Value.

Time difference measurement values include a time difference measurement value Y1, a time difference measurement value Y2, and a time difference measurement value Y3. As shown in FIG. 11, the time difference measurement value Y1 between a reference time point X2 of a time-frequency resource of the 2-step random access and a reference time point X1 of a time-frequency resource of the 4-step random access is X2−X1. The time difference measurement value Y2 between a reference time point X3 of a time-frequency resource of the grant-free random access and the reference time point X2 of the time-frequency resource of the 2-step random access is X3−X2. The time difference measurement value Y3 between the reference time point X3 of the time-frequency resource of the grant-free random access and the reference time point X1 of the time-frequency resource of the 4-step random access is X3−X1. For descriptions of the reference time point, refer to the foregoing descriptions.

If Y3 is less than or equal to a time difference threshold T3, and Y2 is less than or equal to a time difference threshold T2, the terminal device performs grant-free random access in the second bandwidth part. If Y3 is greater than the time difference threshold T3, and Y1 is less than or equal to a time difference threshold T1, the terminal device performs 2-step random access in the first bandwidth part. If Y3 is greater than the time difference threshold T3, and Y1 is greater than the time difference threshold T1, the terminal device performs 4-step random access in the second bandwidth part. In other words, the first condition is that Y3 is less than or equal to the time difference threshold T3, and Y2 is less than or equal to the time difference threshold T2. The second condition is that Y3 is greater than the time difference threshold T3, and Y1 is less than or equal to the time difference threshold T1. The third condition is that Y3 is greater than the time difference threshold T3, and Y1 is greater than the time difference threshold T1.

The time difference threshold T3 may be a difference between average historical access duration of the grant-free random access and average historical access duration of the 4-step random access. Alternatively, T3 may be an empirical value. The time difference threshold T2 may be a difference between the average historical access duration of the grant-free random access and average historical access duration of the 2-step random access. Alternatively, T2 may be an empirical value. The time difference threshold T1 may be a difference between the average historical access duration of the 4-step random access and the average historical access duration of the 2-step random access. Alternatively, T1 may be an empirical value.

It can be learned that determining random access based on the time difference measurement value helps the terminal device access a network in a timely manner.

Figure 18:
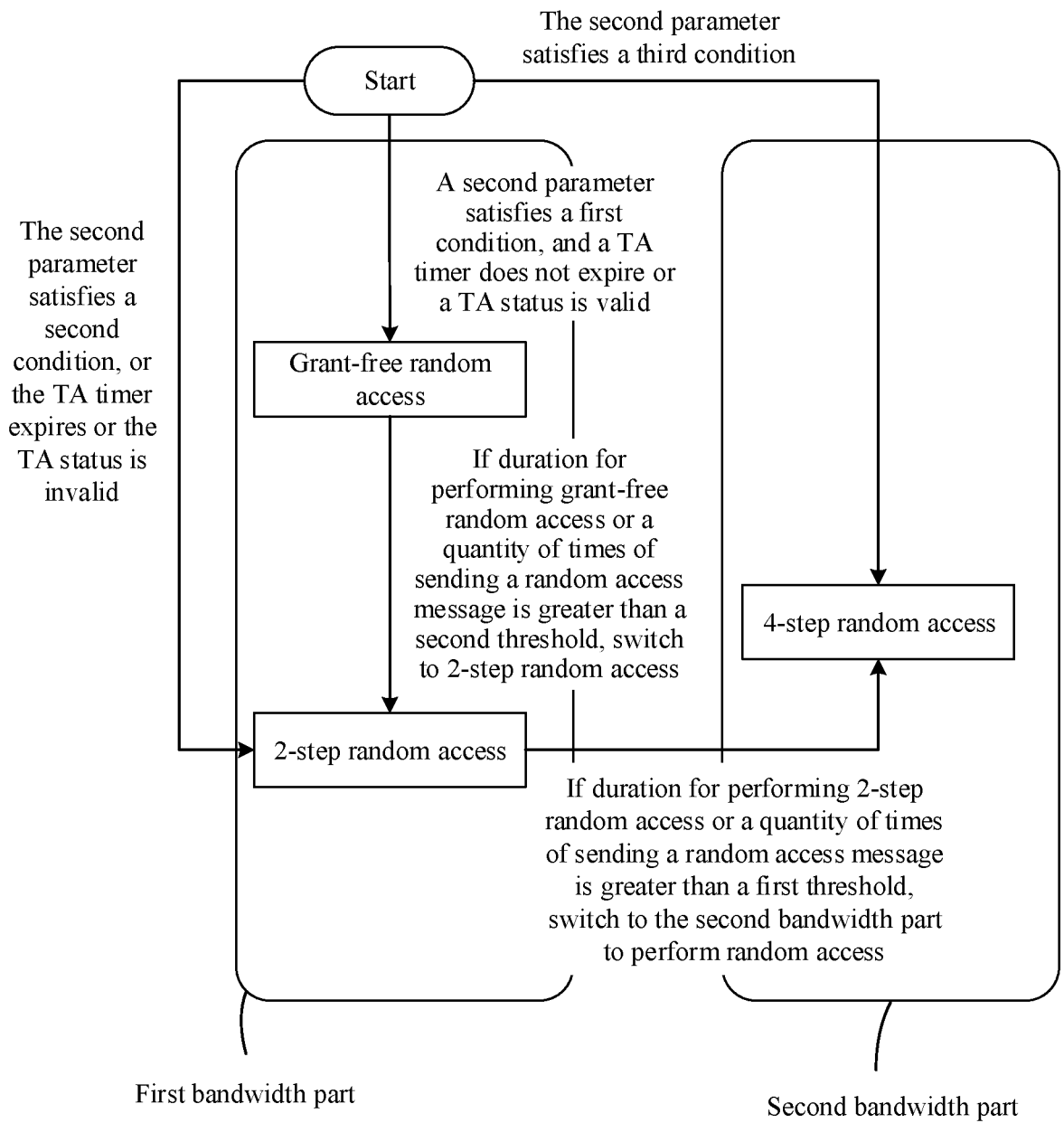
FIG. 18 is a schematic flowchart of still another random access method according to an embodiment of this application.

In a third optional implementation, the foregoing two optional implementations may be combined, and random access is selected based on both TA and a second parameter. For example, as shown in FIG. 18, the terminal device performs grant-free random access in the first bandwidth part if a TA timer does not expire or a TA status is valid and the second parameter satisfies a first condition. If a TA timer expires or a TA status is invalid, duration for performing grant-free random access in the first bandwidth part or a quantity of times of sending a random access message is greater than a second threshold, or the second parameter satisfies a second condition, the terminal device performs 2-step random access in the first bandwidth part. If duration in which the terminal device performs 2-step random access in the first bandwidth part or a quantity of times of sending a random access message is greater than the first threshold, or the second parameter satisfies a third condition, the terminal device performs random access in the second bandwidth part. This helps improve a success rate of random access.

In another possible implementation, when a terminal user switches to the second bandwidth part, the terminal initiates random access in the second bandwidth part, and a random access manner is not limited to the 4-step random access manner. If the second parameter and a preset rule corresponding to the second parameter change in different bandwidth parts, or duration of random access selected by the terminal in the first bandwidth part or a quantity of times of sending a random access message is greater than a maximum transmission quantity-of-time threshold corresponding to the first bandwidth part, the terminal may select a random access manner based on a specific status in the second bandwidth part. A specific embodiment or step is not limited herein.

5. The Grant-Free Random Access and the 4-Step Random Access are Configured for the First Bandwidth Part In the configuration manner 5, the first-type random access may be either of the grant-free random access and the 4-step random access.

Figure 19:
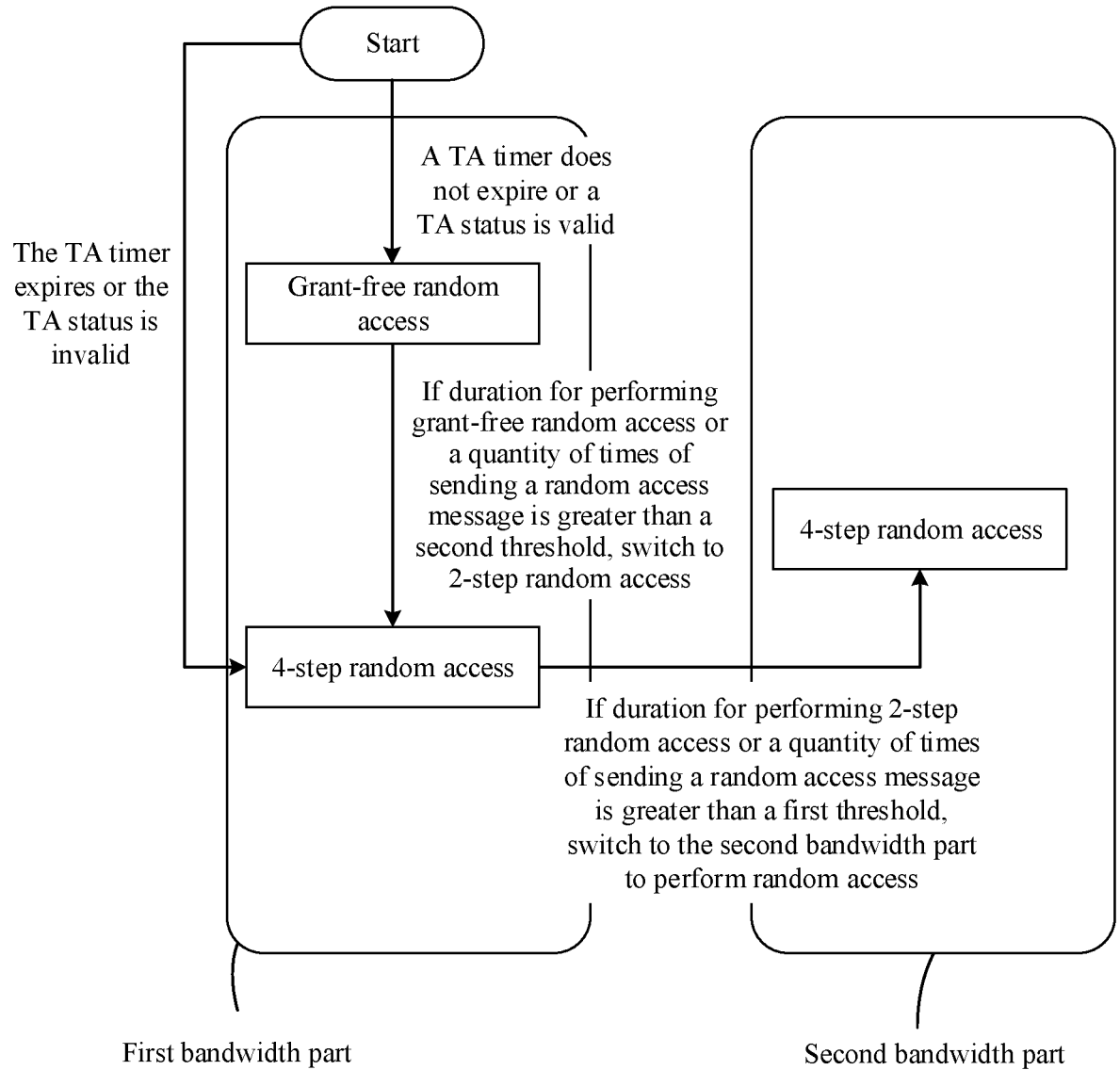
FIG. 19 is a schematic flowchart of still another random access method according to an embodiment of this application.

In a first optional implementation, FIG. 19 is a schematic diagram of another random access method according to an embodiment of this application. As shown in FIG. 19, the grant-free random access and the 4-step random access are configured for the first bandwidth part. The terminal device performs grant-free random access in the first bandwidth part if a TA timer does not expire or a TA status is valid. If a TA timer expires or a TA status is invalid, or duration for performing grant-free random access in the first bandwidth part or a quantity of times of sending a random access message is greater than a second threshold, the terminal device performs 4-step random access in the first bandwidth part. If duration in which the terminal device performs 4-step random access in the first bandwidth part or a quantity of times of sending a random access message is greater than the first threshold, the terminal device performs random access in the second bandwidth part.

In other words, in the first optional implementation, when the TA timer does not expire or the TA status is valid, the grant-free random access is preferentially selected. If the grant-free random access in the first bandwidth part is unavailable (that is, the duration for performing grant-free random access in the first bandwidth part or the quantity of times of sending a random access message is greater than the second threshold), the 4-step random access is selected. If the 4-step random access in the first bandwidth part is unavailable (that is, the duration for performing 4-step random access in the first bandwidth part or the quantity of times of sending a random access message is greater than the first threshold corresponding to a maximum quantity of sending times), the terminal device switches to the second bandwidth part to perform random access. It can be learned that implementing the first optional implementation helps improve a success rate of random access and reduce an uplink data transmission latency.

Optionally, a selection priority of the grant-free random access and a selection priority of the 4-step random access may also be interchanged. To be specific, 4-step random access is performed in the first bandwidth part if the TA timer does not expire or the TA status is valid. Grant-free random access is performed in the first bandwidth part if the TA timer expires or the TA status is invalid.

Figure 20:
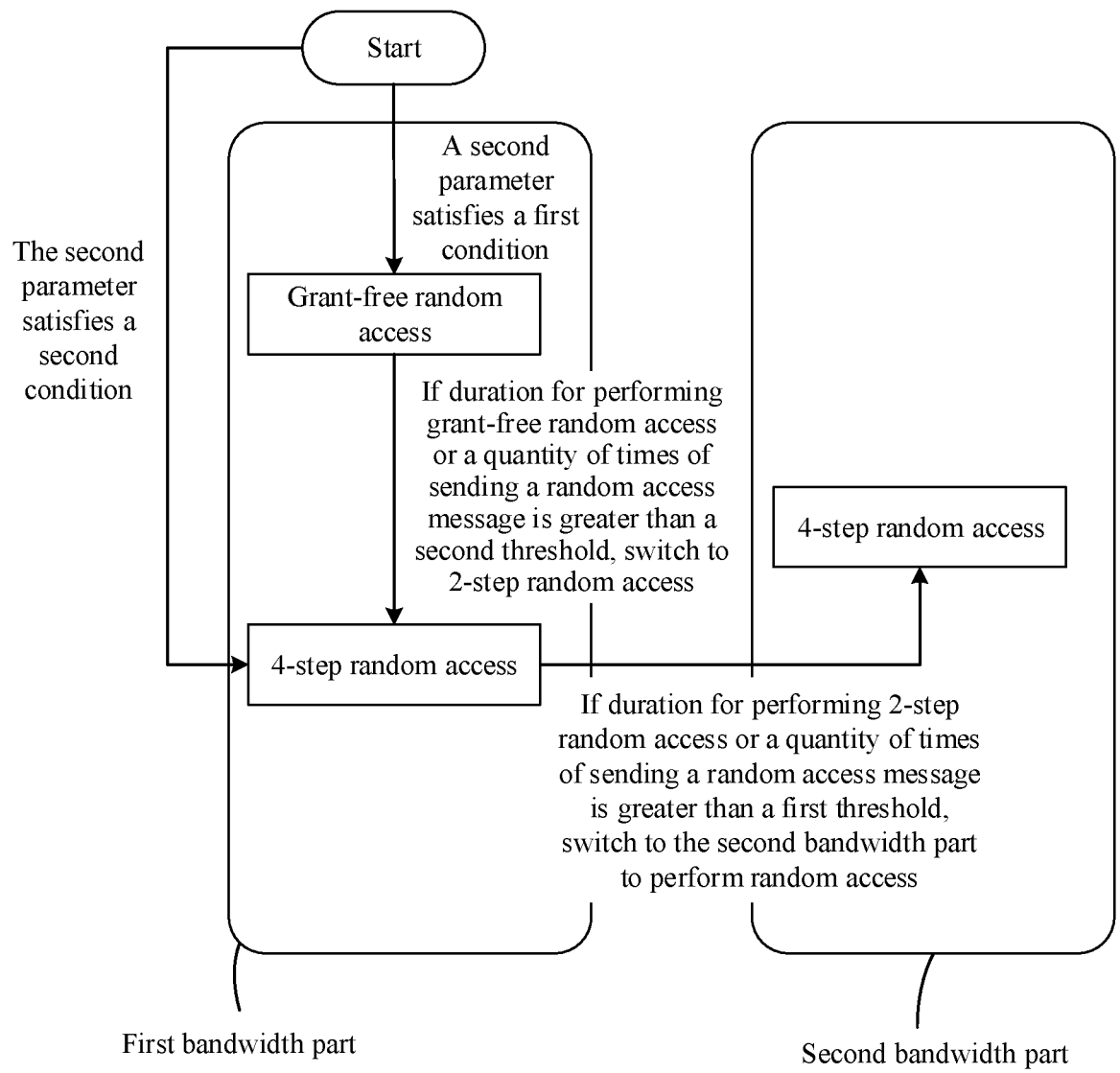
FIG. 20 is a schematic flowchart of still another random access method according to an embodiment of this application.

In a second optional implementation, FIG. 20 is a schematic diagram of another random access method according to an embodiment of this application. As shown in FIG. 20, the grant-free random access and the 4-step random access are configured for the first bandwidth part. Grant-free random access is performed in the first bandwidth part if a second parameter satisfies a first condition. The terminal device performs 4-step random access in the first bandwidth part if duration for performing grant-free random access in the first bandwidth part or a quantity of times of sending a random access message is greater than a second threshold, or the second parameter satisfies a second condition. The terminal device performs random access in the second bandwidth part if duration for performing 2-step random access in the first bandwidth part or a quantity of times of sending a random access message is greater than the first threshold. The second parameter includes at least one of an RSRP measurement value, a size of to-be-transmitted uplink data, a network status of random access, and a time difference measurement value. For beneficial effects of the second optional implementation, refer to the descriptions corresponding to the second parameter in the configuration manner 1. Details are not described herein again.

(1) The Second Parameter Includes the RSRP Measurement Value.

In this embodiment of this application, if the RSRP measurement value is greater than or equal to a first RSRP threshold, the terminal device performs grant-free random access in the first bandwidth part. If the RSRP measurement value is less than the first RSRP threshold, the terminal device performs 4-step random access in the first bandwidth part. In other words, the first condition is that the RSRP measurement value is greater than or equal to the first RSRP threshold, and the second condition is that the RSRP measurement value is less than the first RSRP threshold.

(2) The Second Parameter Includes the Size of the To-Be-Transmitted Uplink Data.

In this embodiment of this application, if the size of the to-be-transmitted uplink data is less than or equal to a first uplink data size threshold, the terminal device performs grant-free random access in the first bandwidth part. If the size of the to-be-transmitted uplink data is greater than the first uplink data size threshold, the terminal device performs 4-step random access in the first bandwidth part. In other words, the first condition is that the size of the to-be-transmitted uplink data is less than or equal to the first uplink data size threshold, and the second condition is that the size of the to-be-transmitted uplink data is greater than the first uplink data size threshold.

(3) The Second Parameter Includes the Network Status of Random Access.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration.

Alternatively, the access network device determines, based on the network status (for example, at least one of a plurality of conditions such as a quantity of active users, an available random access resource amount, and/or a system capacity), random access that the terminal device needs to select, and then indicates the random access to the terminal device by using indication information.

In this embodiment, for example, if the quantity of active users of random access is less than or equal to a first active user quantity threshold, the terminal device performs grant-free random access in the first bandwidth part. If the quantity of active users of random access is greater than the first active user quantity threshold, the terminal device performs 4-step random access in the first bandwidth part. A principle of selecting a random access manner based on the resource amount or the system capacity is the same as that described above, and details are not described herein. In other words, the first condition is that the quantity of active users of random access is less than or equal to the first active user quantity threshold. The second condition is that the quantity of active users of random access is greater than the first active user quantity threshold.

In another possible embodiment, the access network device may send a network status indication value to the terminal to determine a random access manner. For example, if the network status indication value sent by the access network device is 2, the terminal may select the grant-free random access manner. If the network status indication value sent by the access network device is another value, the terminal may select the 4-step random access manner. In this embodiment, a relationship between a network status indication value and a random access manner is not limited to the described example. The network device may send different network status indication values to different users.

(4) The Second Parameter Includes the Time Difference Measurement Value.

A time difference measurement value is a difference between a reference time point of a time-frequency resource of the grant-free random access and a reference time point of a time-frequency resource of the 4-step random access. For descriptions of the reference time point, refer to the foregoing descriptions.

For example, a location of the time-frequency resource of the 4-step random access is before that of the time-frequency resource of the grant-free random access. The reference time point of the time-frequency resource of the 4-step random access is X1 and the reference time point of the time-frequency resource of the grant-free random access is X3. The time difference measurement value Y3 between the time-frequency resource of the grant-free random access and the time-frequency resource of the 4-step random access is X3–X1. If Y3 is less than or equal to a time difference threshold T3, the terminal device performs grant-free random access in the first bandwidth part. If Y3 is greater than the time difference threshold T3, the terminal device performs 4-step random access in the first bandwidth part. The time difference threshold T3 may be a difference between average historical access duration of the 4-step random access and average historical access duration of the grant-free random access. Alternatively, T3 may be an empirical value. In other words, the first condition is that Y3 is less than or equal to the time difference threshold T3. The second condition is that Y3 is greater than the time difference threshold T3.

Figure 21:
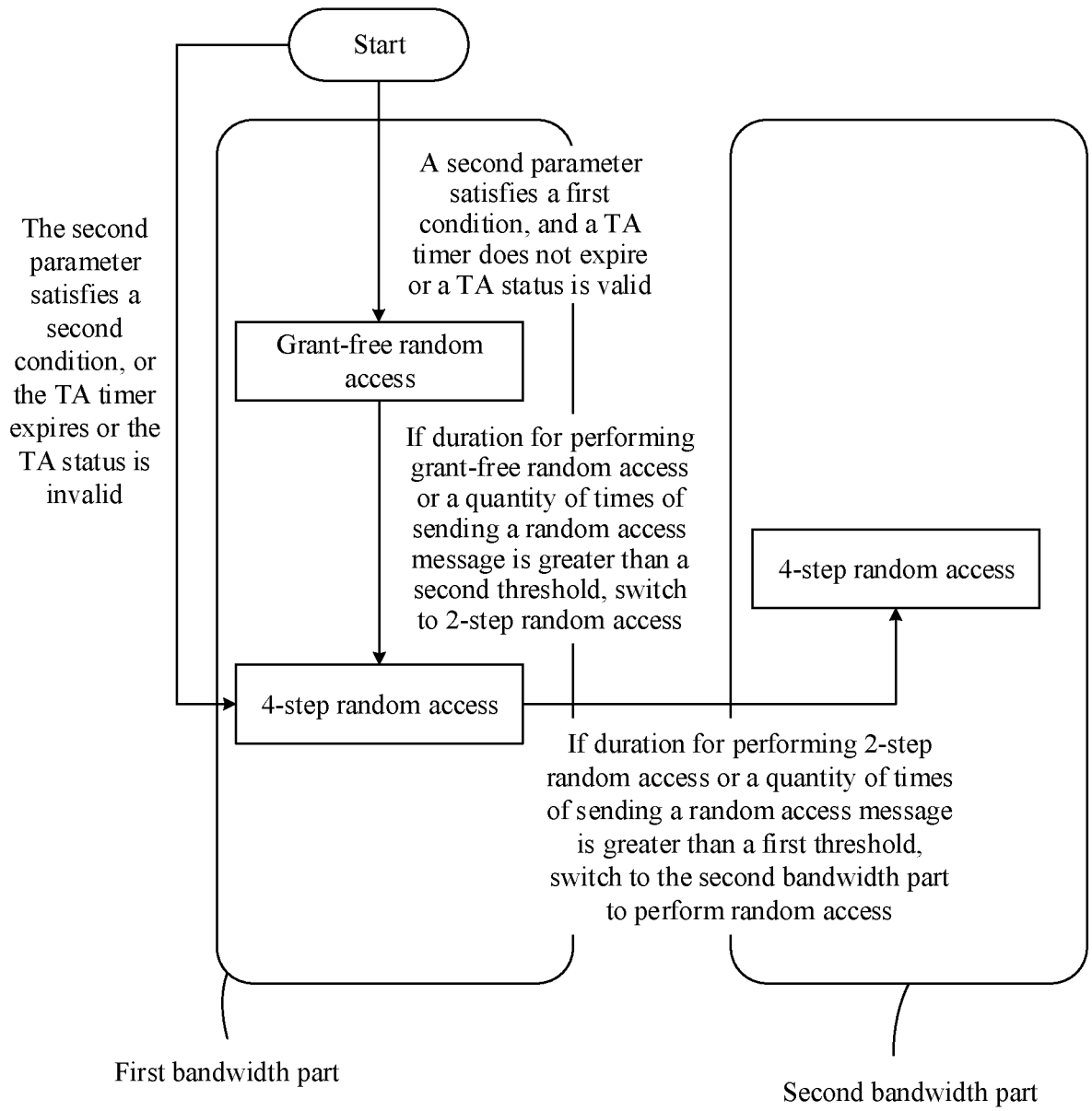
FIG. 21 is a schematic flowchart of still another random access method according to an embodiment of this application.

In a third optional implementation, the first optional implementation and the second optional implementation may be combined, and random access is selected based on both TA and a second parameter. For example, as shown in FIG. 21, the terminal device performs grant-free random access in the first bandwidth part if a TA timer does not expire or a TA status is valid and the second parameter satisfies a first condition. If a TA timer corresponding to the grant-free random access expires or a TA status corresponding to the grant-free random access is invalid, duration for performing grant-free random access in the first bandwidth part or a quantity of times of sending a random access message is greater than a second threshold, or the second parameter satisfies a second condition, the terminal device performs 4-step random access in the first bandwidth part. If duration in which the terminal device performs 4-step random access in the first bandwidth part or a quantity of times of sending a random access message is greater than the first threshold, the terminal device performs random access in the second bandwidth part. This helps improve a success rate of random access.

6. The 2-Step Random Access and the 4-Step Random Access are Configured for the First Bandwidth Part In the configuration manner 6, the first-type random access may be either of the 2-step random access and the 4-step random access. An implementation principle of the configuration manner 6 is the same as that of the configuration manner 5. The grant-free random access in the second optional implementation in the configuration manner 5 may be replaced with the 2-step random access.

7. The Grant-Free Random Access, the 2-Step Random Access, and the 4-Step Random Access are Configured for the First Bandwidth Part In the configuration manner 7, the first-type random access may be any one of the grant-free random access, the 2-step random access, and the 4-step random access.

Figure 22:
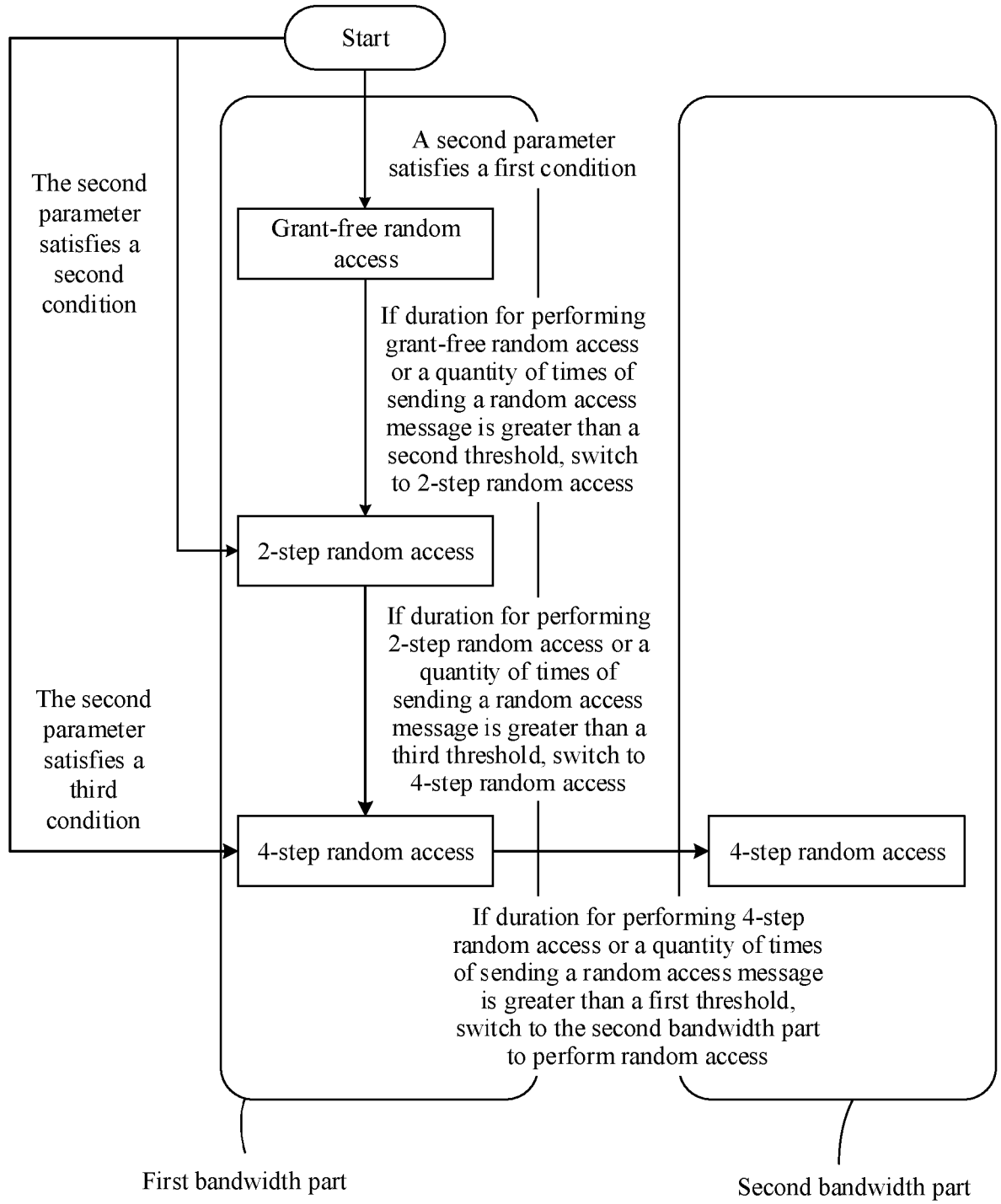
FIG. 22 is a schematic flowchart of still another random access method according to an embodiment of this application.

In a first optional implementation, FIG. 22 is a schematic diagram of another random access method according to an embodiment of this application. As shown in FIG. 22, the grant-free random access, the 2-step random access, and the 4-step random access are configured for the first bandwidth part. Grant-free random access is performed in the first bandwidth part if a second parameter satisfies a first condition. The terminal device performs 2-step random access in the first bandwidth part if duration for performing grant-free random access in the first bandwidth part or a quantity of times of sending a random access message is greater than a second threshold, or the second parameter satisfies a second condition. The terminal device performs 4-step random access in the first bandwidth part if the second parameter satisfies a third condition, or duration for performing 2-step random access in the first bandwidth part or a quantity of times of sending a random access message is greater than a third threshold. The terminal device performs random access in the second bandwidth part if duration for performing 4-step random access in the first bandwidth part or a quantity of times of sending a random access message is greater than the first threshold. The second parameter includes at least one of an RSRP measurement value, a size of to-be-transmitted uplink data, a network status of random access configured for the first bandwidth part, and a time difference measurement value.

(1) The Second Parameter Includes the RSRP Measurement Value.

In this embodiment of this application, if the RSRP measurement value is greater than or equal to a first RSRP threshold, the terminal device performs grant-free random access in the first bandwidth part. If the RSRP measurement value is less than the first RSRP threshold and greater than a second RSRP threshold, the terminal device performs 2-step random access in the first bandwidth part. If the RSRP measurement value is less than the second RSRP threshold, the terminal device performs 4-step random access in the first bandwidth part. In other words, the first condition is that the RSRP measurement value is greater than or equal to the first RSRP threshold. The second condition is that the RSRP measurement value is less than the first RSRP threshold and greater than the second RSRP threshold. The third condition is that the RSRP measurement value is less than the second RSRP threshold.

(2) The Second Parameter Includes the Size of the To-Be-Transmitted Uplink Data.

In this embodiment of this application, if the size of the to-be-transmitted uplink data is less than or equal to a first uplink data size threshold, the terminal device performs grant-free random access in the first bandwidth part. If the size of the to-be-transmitted uplink data is greater than the first uplink data size threshold and less than or equal to a second uplink data size threshold, the terminal device performs 2-step random access in the first bandwidth part. If the size of the to-be-transmitted uplink data is greater than the second uplink data size threshold, the terminal device performs 4-step random access in the first bandwidth part. In other words, the first condition is that the size of the to-be-transmitted uplink data is less than or equal to the first uplink data size threshold. The second condition is that the size of the to-be-transmitted uplink data is greater than the first uplink data size threshold and less than or equal to the second uplink data size threshold. The third condition is that the size of the to-be-transmitted uplink data is greater than the second uplink data size threshold.

(3) The Second Parameter Includes the Network Status of Random Access.

The network status may include a quantity of active users of random access, a random access resource amount, a system capacity, or the like. A smaller quantity of active users of random access, a better random access resource, or a larger system capacity indicates a higher success rate of random access initiated by the terminal device. Therefore, if the network status during random access is better, the terminal device may select a random access manner with shorter random access duration.

Alternatively, the access network device determines, based on the network status (for example, at least one of a plurality of conditions such as a quantity of active users, an available random access resource amount, and/or a system capacity), random access that the terminal device needs to select, and then indicates the random access to the terminal device by using indication information.

In this embodiment, for example, if the quantity of active users of random access is less than or equal to a first active user quantity threshold, the terminal device performs grant-free random access in the first bandwidth part. If the quantity of active users of random access is greater than the first active user quantity threshold and less than a second active user quantity threshold, the terminal performs 2-step random access in the first bandwidth part. If the quantity of active users of random access is greater than the second active user quantity threshold, the terminal device performs 4-step random access in the first bandwidth part. A principle of selecting a random access manner based on the resource amount or the system capacity is the same as that described above, and details are not described herein. In other words, the first condition is that the quantity of active users of random access is less than or equal to the first active user quantity threshold. The second condition is that the quantity of active users of random access is greater than the first active user quantity threshold and less than the second active user quantity threshold. The third condition is that the quantity of active users of random access is greater than the second active user quantity threshold.

In another possible embodiment, the access network device may send a network status indication value to the terminal to determine a random access manner. For example, if the network status indication value sent by the access network device is 2, the terminal device performs grant-free random access in the first bandwidth part. If the network status indication value sent by the access network device is 1, the terminal performs 2-step random access in the first bandwidth part. If the network status indication value sent by the access network device is 0, the terminal device performs 4-step random access in the first bandwidth part. In this embodiment, a relationship between a network status indication value and a random access manner is not limited to the described example. The network device may send different network status indication values to different users.

Determining random access based on the network status of 2-step random access helps improve a success rate of random access.

(4) The Second Parameter Includes the Time Difference Measurement Value.

Time difference measurement values include Y1, Y2, and Y3. Y1 is a time difference measurement value between a reference time point X2 of a time-frequency resource of the 2-step random access and a reference time point X1 of a time-frequency resource of the 4-step random access. Y2 is a time difference measurement value between a reference time point X3 of a time-frequency resource of the grant-free random access and the reference time point X2 of the time-frequency resource of the 2-step random access. The time difference measurement value Y3 between the reference time point X3 of the time-frequency resource of the grant-free random access and the reference time point X1 of the time-frequency resource of the 4-step random access is X3−X1. For descriptions of the reference time point, refer to the foregoing descriptions.

If Y3 is less than or equal to a time difference threshold T3, Y2 is less than or equal to a time difference threshold T2, and Y1 is less than or equal to a time difference threshold T1, the terminal device performs grant-free random access in the first bandwidth part. If Y3 is greater than the time difference threshold T3, and Y1 is less than or equal to the time difference threshold T1, the terminal device performs 2-step random access in the first bandwidth part. If Y3 is greater than the time difference threshold T3, and Y1 is greater than the time difference threshold T1, the terminal device performs 4-step random access in the first bandwidth part. In other words, the first condition is that Y3 is less than or equal to the time difference threshold T3, Y2 is less than or equal to the time difference threshold T2, and Y1 is less than or equal to the time difference threshold T1. The first condition is that Y3 is greater than the time difference threshold T3, and Y1 is less than or equal to the time difference threshold T1. The third condition is that Y3 is greater than the time difference threshold T3, and Y1 is greater than the time difference threshold T1.

The time difference threshold T3 may be a difference between average historical access duration of the grant-free random access and average historical access duration of the 4-step random access. Alternatively, T3 may be an empirical value. The time difference threshold T2 may be a difference between the average historical access duration of the grant-free random access and average historical access duration of the 2-step random access. Alternatively, T2 may be an empirical value. The time difference threshold T1 may be a difference between the average historical access duration of the 4-step random access and the average historical access duration of the 2-step random access. Alternatively, T1 may be an empirical value.

Figure 23:
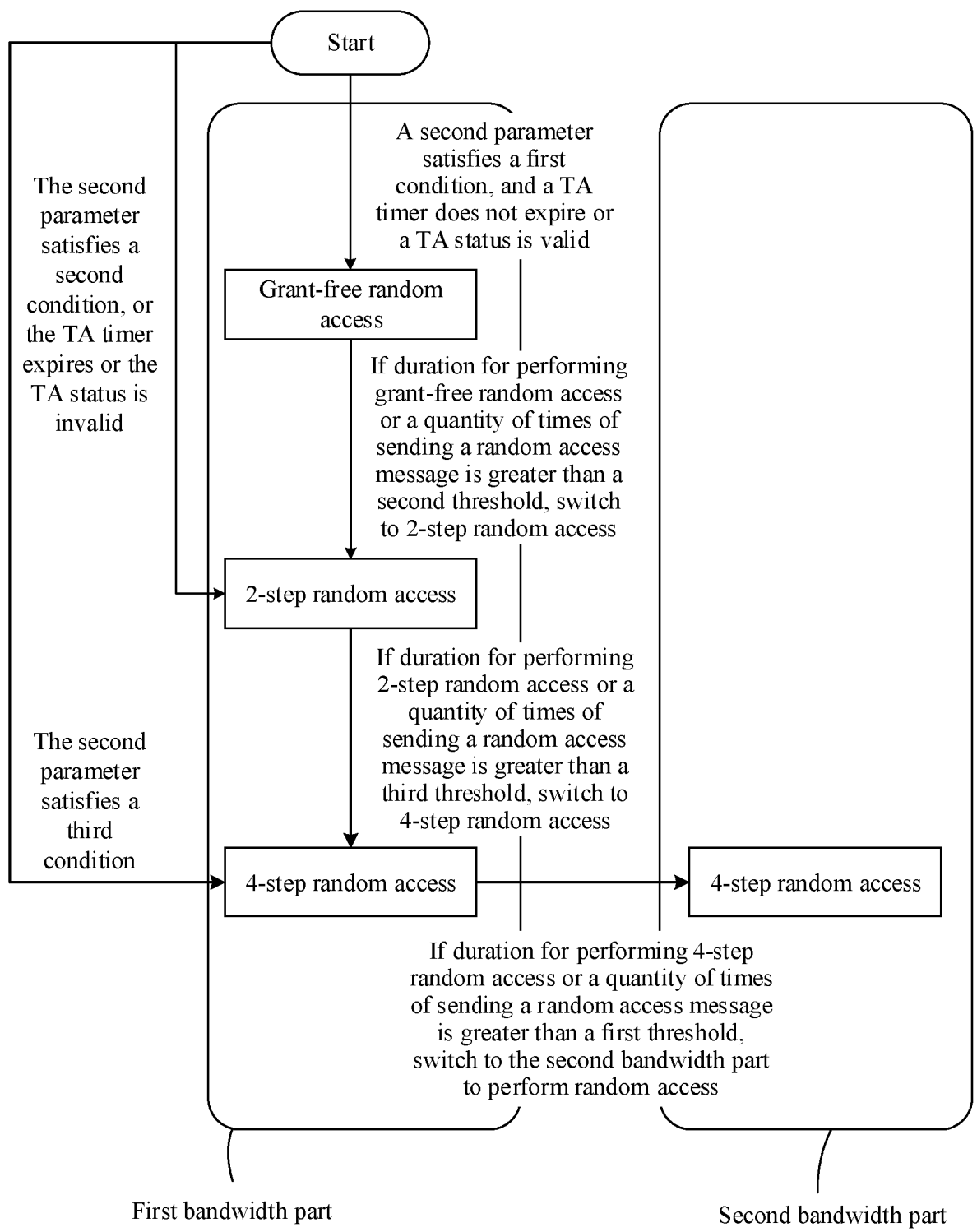
FIG. 23 is a schematic flowchart of still another random access method according to an embodiment of this application.

In a second optional implementation, FIG. 23 is a schematic diagram of another random access method according to an embodiment of this application. As shown in FIG. 23, the grant-free random access, the 2-step random access, and the 4-step random access are configured for the first bandwidth part. The terminal device performs grant-free random access in the first bandwidth part if a TA timer does not expire or a TA status is valid and the second parameter satisfies a first condition. If the TA timer expires or the TA status is invalid, the second parameter satisfies a second condition, or duration for performing grant-free random access in the first bandwidth part or a quantity of times of sending a random access message is greater than a second threshold, the terminal device performs 2-step random access in the first bandwidth part. The terminal device performs 4-step random access in the first bandwidth part if the second parameter satisfies a third condition, or duration in which the terminal device performs 2-step random access in the first bandwidth part or a quantity of times of sending a random access message is greater than a third threshold. If duration in which the terminal device performs 4-step random access in the first bandwidth part or a quantity of times of sending a random access message is greater than the first threshold, the terminal device performs random access in the second bandwidth part.

In the first optional implementation, random access in the first bandwidth part can be properly selected. This helps reduce an uplink transmission latency and improve a success rate of random access.

In a possible implementation, the terminal device performs grant-free random access in the first bandwidth part if a TA timer does not expire or a TA status is valid. If the TA timer expires or the TA status is invalid, or duration for performing grant-free random access in the first bandwidth part or a quantity of times of sending a random access message is greater than a second threshold, the terminal may select the 2-step random access and the 4-step random access.

In this case, whether the terminal selects the 2-step random access or the 4-step random access may be determined based on a second parameter and a preset rule of the second parameter. In this case, the access network device configures only one threshold. If the second parameter is greater than the threshold, the terminal device performs 2-step random access in the first bandwidth part. If the second parameter is less than the threshold, or duration for performing 2-step random access in the first bandwidth part or a quantity of times of sending a random access message is greater than a third threshold, the terminal device performs 4-step random access in the first bandwidth part.

Alternatively, the terminal device performs 4-step random access in the first bandwidth part if the TA timer expires or the TA status is invalid. If duration in which the terminal device performs 4-step random access in the first bandwidth part or a quantity of times of sending a random access message is greater than the first threshold, the terminal device performs random access in the second bandwidth part. The terminal device performs random access in the second bandwidth part if duration for performing 4-step random access in the first bandwidth part or a quantity of times of sending a random access message is greater than the first threshold. The second parameter includes at least one of an RSRP measurement value, a size of to-be-transmitted uplink data, a network status of random access, and a time difference measurement value.

Based on this optional implementation, random access in the first bandwidth part can be properly selected. This helps reduce an uplink transmission latency and improve a success rate of random access.

Figure 24:
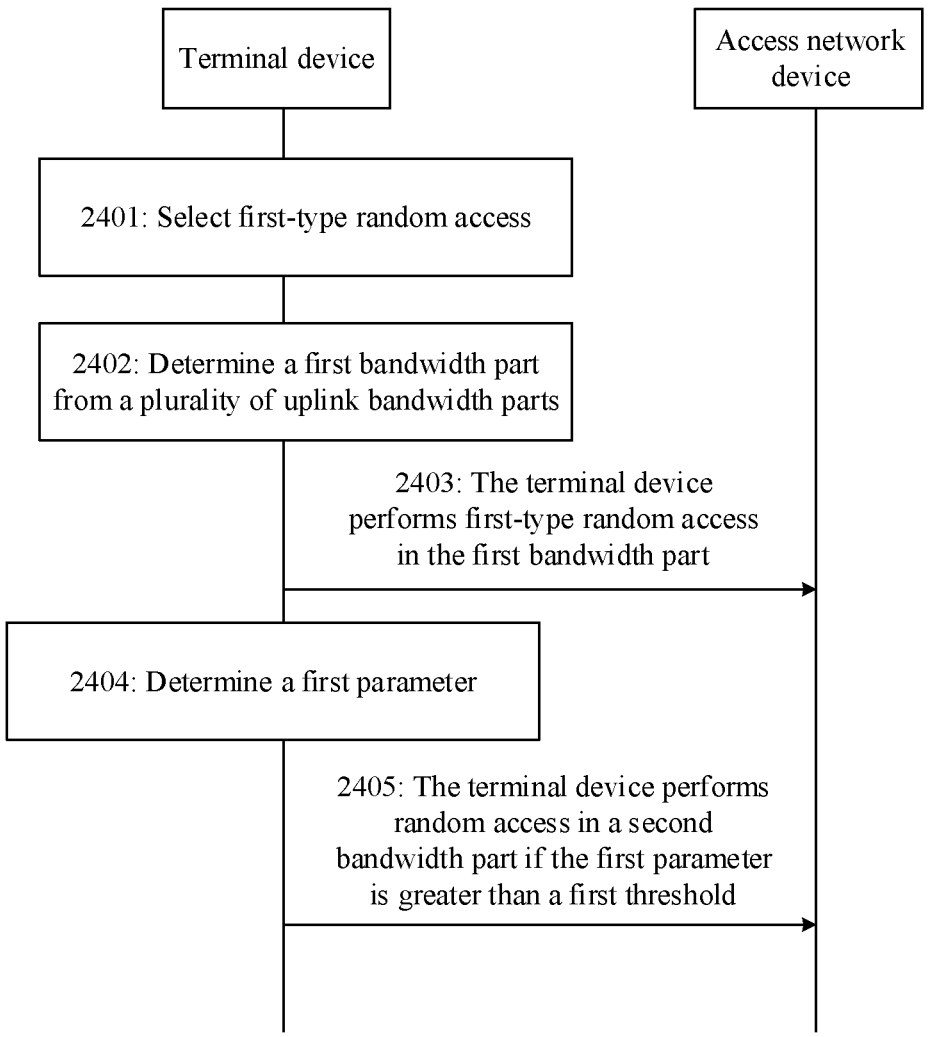
FIG. 24 is a schematic flowchart of still another random access method according to an embodiment of this application.

FIG. 24 is a schematic flowchart of a random access method according to an embodiment of this application. Step 2401 to step 2403 are performed by a terminal device or a chip in the terminal device. An example in which the terminal device performs the method is used below for description. A difference between the embodiment corresponding to FIG. 24 and the embodiment corresponding to FIG. 5 lies in that, in the embodiment corresponding to FIG. 24, the terminal device needs to first select random access, and then select a bandwidth part to perform random access. As shown in FIG. 24, the random access method includes the following step 2401 to step 2405.

2401. The terminal device selects first-type random access

A plurality of types of random access are configured for the terminal device. The terminal device may first select one type of random access from the plurality of types of configured random access, and then select a bandwidth part for random access. The first-type random access may be any type of random access configured for the terminal device. Alternatively, the terminal device may select the first-type random access from the plurality of types of random access based on the second parameter in the foregoing method embodiment.

2402: The terminal device determines a first bandwidth part from a plurality of uplink bandwidth parts.

The first bandwidth part is an uplink bandwidth part for which a configuration parameter of the first-type random access is configured.

For example, four BWPs are configured for the terminal device: a BWP 0 to a BWP 3. The BWP 0 is an initial UL BWP. The BWP 1 is an active UL BWP. The BWP 2 and the BWP 3 are inactive UL BWPs. 4-step random access is configured for the BWP 0. 2-step random access and grant-free random access are configured for all of the BWP 1 to the BWP 3. In other words, the 4-step random access, the 2-step random access, and the grant-free random access are configured for the terminal device.

The terminal device may detect an RSRP measurement value. If the RSRP measurement value is greater than or equal to a first RSRP threshold, the terminal device selects the grant-free random access. The grant-free random access is configured for all of the BWP 1 to the BWP 3. Therefore, the first bandwidth part may be determined from the BWP 1 to the BWP 3. For example, one BWP in the BWP 1 to the BWP 3 may be randomly determined as the first bandwidth part, or the active BWP 1 may be selected as the first bandwidth part. Alternatively, the first bandwidth part may be determined from the BWP 1 to the BWP 3 based on another parameter, for example, another value in the second parameter in the foregoing embodiment. If the terminal device selects the BWP 1 as the first bandwidth part, the terminal device performs grant-free random access in the BWP 1.

If the RSRP measurement value is less than the first preset RSRP threshold and greater than a second RSRP threshold, the terminal device selects the 2-step random access. The 2-step random access is configured for all of the BWP 1 to the BWP 3. Therefore, the first bandwidth part may be determined from the BWP 1 to the BWP 3. If the terminal device selects the BWP 1 as the first bandwidth part, the terminal device performs 2-step random access in the BWP 1.

If the RSRP measurement value is less than the second RSRP threshold, the 4-step random access is selected. The 4-step random access is configured for the BWP 0. Therefore, the BWP 0 may be determined as the first bandwidth part. In this case, the terminal device performs 2-step random access in the BWP 0.

2403: The terminal device performs first-type random access in the first bandwidth part.

2404: The terminal device determines a first parameter.

2405: The terminal device performs random access in a second bandwidth part if the first parameter is greater than a first threshold.

For specific implementation of step 2403 to step 2405, refer to the descriptions in the embodiment corresponding to FIG. 5. Details are not described herein again.

In an optional implementation, only the first-type random access is configured for the first bandwidth part. In this case, the terminal device performs random access in the second bandwidth part if the terminal device determines that the first parameter is greater than the first threshold.

In an optional implementation, a plurality of types of random access are configured for the first bandwidth part. After determining that the first parameter is greater than the first threshold, the terminal device may perform second-type random access in the first bandwidth part or perform random access in the second bandwidth part. The second-type random access is different from the first-type random access, and a priority of the second-type random access is lower than a priority of the first-type random access. Optionally, priorities of the grant-free random access, the 2-step random access, and the 4-step random access are in descending order. For example, if the first-type random access is random access that has a lowest priority and that is configured for the first bandwidth part, after determining that the first parameter is greater than the first threshold, the terminal device may perform random access in the second bandwidth part. If the first-type random access is not random access that has a lowest priority and that is configured for the first bandwidth part, after determining that the first parameter is greater than the first threshold, the terminal device may perform second-type random access in the first bandwidth part.

For example, the grant-free random access, the 2-step random access, and the 4-step random access are configured for the first bandwidth part. The first-type random access is the grant-free random access. The terminal device performs grant-free random access in the first bandwidth part. If duration for performing grant-free random access or a quantity of times of sending a random access message is greater than the first threshold, the terminal device performs 2-step random access. If duration for performing 2-step random access or a quantity of times of sending a random access message is greater than a second threshold, the terminal device performs 4-step random access. If duration for performing 4-step random access or a quantity of times of sending a random access message is greater than a third threshold, the terminal device performs random access in the second bandwidth part.

In an optional implementation, at least the first-type random access or random access whose priority is lower than that of the first-type random access is configured for the second bandwidth part. For example, if the first-type random access is the grant-free random access, at least one of the grant-free random access, the 2-step random access, and the 4-step random access is configured for the second bandwidth part. For another example, if the first-type random access is the 2-step random access, at least one of the 2-step random access and the 4-step random access is configured for the second bandwidth part. For another example, if the first-type random access is the 2-step random access, at least the 4-step random access is configured for the second bandwidth part.

According to the method described in FIG. 24, the terminal device can first determine random access, and then determine a bandwidth part. In this way, random access can be more flexible.

Figure 25:
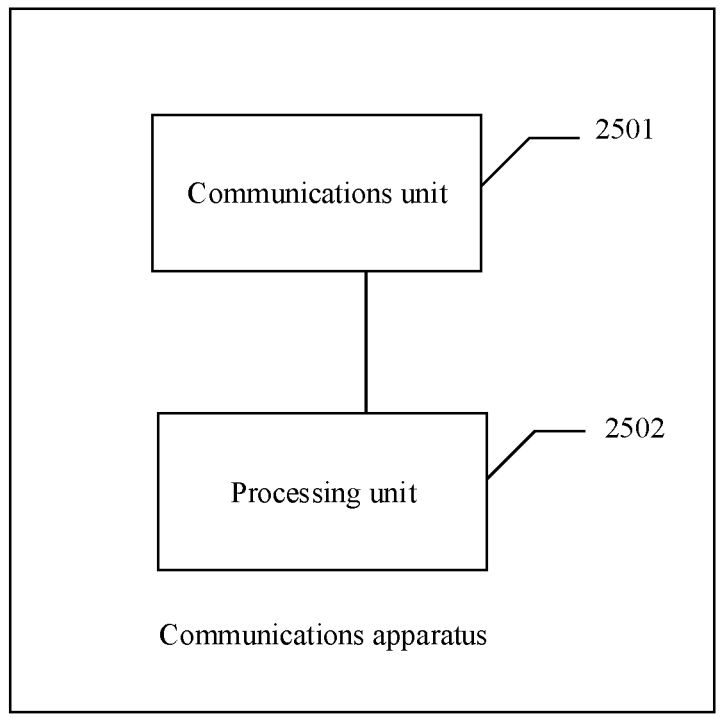
FIG. 25 is a schematic diagram of a structure of a communications apparatus according to an embodiment of this application.

FIG. 25 is a schematic diagram of a structure of another communications apparatus according to an embodiment of this application. The communications apparatus shown in FIG. 25 may be configured to perform some or all functions of the terminal device in the method embodiment described in FIG. 5 or FIG. 24. The apparatus may be a terminal device, an apparatus in the terminal device, or an apparatus that can be used together with the terminal device. The communications apparatus may alternatively be a chip system. The communications apparatus shown in FIG. 25 may include a communications unit 2501 and a processing unit 2502.

The communications unit 2501 is configured to perform first-type random access in a first bandwidth part, where the first bandwidth part is an active uplink bandwidth part. The processing unit 2502 is configured to determine a first parameter, where the first parameter is duration for performing first-type random access in the first bandwidth part, or the first parameter is a quantity of times of sending a first-type random access message. The communications unit 2501 is further configured to perform random access in a second bandwidth part if the first parameter is greater than a first threshold, where the second bandwidth part is an uplink bandwidth part, and an identifier of the second bandwidth part is different from an identifier of the first bandwidth part.

In an optional implementation, the first-type random access is one of grant-free random access, 2-step random access, or 4-step random access: a random access message of the grant-free random access includes only uplink data carried on a physical uplink shared channel PUSCH; a random access message of the 2-step random access includes a preamble carried on a physical random access channel PRACH and uplink data carried on a PUSCH; and a random access message of the 4-step random access includes a preamble carried on a PRACH.

In an optional implementation, the first-type random access is the 2-step random access; and when a random access transmission occasion RO resource that corresponds to the first-type random access and that is configured in the first bandwidth part is unavailable and a physical uplink shared channel transmission occasion PO resource corresponding to the random access transmission occasion RO resource is available, a manner in which the communications unit 2501 performs first-type random access in the first bandwidth part is specifically: sending a random access message to an access network device on the PO resource in the first bandwidth part, where the random access message includes uplink data carried on a PUSCH; and receiving a response message for the random access message from the access network device.

In an optional implementation, the first-type random access is the 2-step random access; and when a random access transmission occasion RO resource that corresponds to the first-type random access and that is configured in the first bandwidth part is available and a physical uplink shared channel transmission occasion PO resource corresponding to the random access transmission occasion RO resource is unavailable, a manner in which the communications unit 2501 performs first-type random access in the first bandwidth part is specifically: sending a random access message to an access network device on the RO resource in the first bandwidth part, where the random access message includes a preamble carried on a PRACH; and receiving a response message for the random access message from the access network device.

In an optional implementation, the first-type random access is the 2-step random access, and a manner in which the communications unit 2501 performs first-type random access in the first bandwidth part is specifically: performing first-type random access in the first bandwidth part if a second parameter satisfies a first condition, where the second parameter includes at least one of a reference signal received power RSRP measurement value, a size of to-be-transmitted uplink data, a network status of random access, and a time difference measurement value. The communications unit 2501 is alternatively configured to perform random access in the second bandwidth part if the second parameter satisfies a second condition, where the first condition is different from the second condition.

In an optional implementation, the first-type random access is the grant-free random access, and a manner in which the communications unit 2501 performs first-type random access in the first bandwidth part is specifically: performing grant-free random access in the first bandwidth part if a timing advance TA timer does not expire or a TA status is valid. The communications unit 2501 is alternatively configured to perform random access in the second bandwidth part if the TA timer expires or the TA status is invalid.

In an optional implementation, the first-type random access is the grant-free random access, and a manner in which the communications unit 2501 performs first-type random access in the first bandwidth part is specifically: performing first-type random access in the first bandwidth part if a second parameter satisfies a first condition, where the second parameter includes at least one of a reference signal received power RSRP measurement value, a size of to-be-transmitted uplink data, a network status of random access, and a time difference measurement value. The communications unit 2501 is alternatively configured to perform random access in the second bandwidth part if the second parameter satisfies a second condition, where the first condition is different from the second condition.

In an optional implementation, a configuration of the first bandwidth part includes a configuration parameter of the grant-free random access and a configuration parameter of the 2-step random access, and the first-type random access is the grant-free random access or the 2-step random access.

In an optional implementation, the first-type random access is the 2-step random access, and the communications unit 2501 is further configured to perform grant-free random access in the first bandwidth part if a timing advance TA timer does not expire or a TA status is valid. A manner in which the communications unit 2501 performs first-type random access in the first bandwidth part is specifically: performing first-type random access in the first bandwidth part if the TA timer expires or the TA status is invalid, or duration for performing grant-free random access in the first bandwidth part or a quantity of times of sending a random access message is greater than a second threshold.

In an optional implementation, the first-type random access is the 2-step random access, and the communications unit 2501 is further configured to perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value. A manner in which the communications unit 2501 performs first-type random access in the first bandwidth part is specifically: performing first-type random access in the first bandwidth part if duration for performing grant-free random access in the first bandwidth part or a quantity of times of sending a random access message is greater than a second threshold, or the second parameter satisfies a second condition. The communications unit 2501 is alternatively configured to perform random access in the second bandwidth part if the second parameter satisfies a third condition, where the first condition, the second condition, and the third condition are different from each other.

In an optional implementation, a configuration of the first bandwidth part includes a configuration parameter of the grant-free random access and a configuration parameter of the 4-step random access, and the first-type random access is the grant-free random access or the 4-step random access.

In an optional implementation, the first-type random access is the 4-step random access, and the communications unit 2501 is further configured to perform grant-free random access in the first bandwidth part if a timing advance TA timer does not expire or a TA status is valid. A manner in which the communications unit 2501 performs first-type random access in the first bandwidth part is specifically: performing first-type random access in the first bandwidth part if the TA timer expires or the TA status is invalid, or duration for performing grant-free random access in the first bandwidth part or a quantity of times of sending a random access message is greater than a second threshold.

In an optional implementation, the first-type random access is the 4-step random access, and the communications unit 2501 is further configured to perform grant-free random access in the first bandwidth part if a second parameter satisfies a first condition, where the second parameter includes at least one of a reference signal received power RSRP measurement value, a size of to-be-transmitted uplink data, a network status of random access, and a time difference measurement value. A manner in which the communications unit 2501 performs first-type random access in the first bandwidth part is specifically: performing first-type random access in the first bandwidth part if duration for performing grant-free random access in the first bandwidth part or a quantity of times of sending a random access message is greater than a second threshold, or the second parameter satisfies a second condition, where the first condition is different from the second condition.

In an optional implementation, a configuration of the first bandwidth part includes a configuration parameter of the grant-free random access, a configuration parameter of the 2-step random access, and a configuration parameter of the 4-step random access.

In an optional implementation, the first-type random access is the 4-step random access, and the communications unit 2501 is further configured to perform grant-free random access in the first bandwidth part if a timing advance TA timer does not expire or a TA status is valid and a second parameter satisfies a first condition, where the second parameter includes at least one of a reference signal received power RSRP measurement value, a size of to-be-transmitted uplink data, a network status of random access, and a time difference measurement value; or the communications unit 2501 is further configured to perform 2-step random access in the first bandwidth part if the TA timer expires or the TA status is invalid, the second parameter satisfies a second condition, or duration for performing grant-free random access in the first bandwidth part or a quantity of times of sending a random access message is greater than a second threshold. A manner in which the communications unit 2501 performs first-type random access in the first bandwidth part is specifically: performing first-type random access in the first bandwidth part if the second parameter satisfies a third condition, or duration for performing 2-step random access in the first bandwidth part or a quantity of times of sending a random access message is greater than a third threshold. The first condition, the second condition, and the third condition are different from each other.

In an optional implementation, the processing unit 2502 is further configured to select the first-type random access before the communications unit 2501 performs first-type random access in the first bandwidth part; and the processing unit 2502 is further configured to determine the first bandwidth part from a plurality of uplink bandwidth parts, where the first bandwidth part is an uplink bandwidth part for which a configuration parameter of the first-type random access is configured.

In an optional implementation, a configuration of the second bandwidth part includes one or more of the configuration parameter of the grant-free random access, the configuration parameter of the 2-step random access, or the configuration parameter of the 4-step random access.

It should be noted that when the communications apparatus is a terminal device or a component that implements the foregoing function in the terminal device, the processing unit 2502 may be one or more processors, and the communications unit 2501 may be a transceiver. When the communications apparatus is a chip, the processing unit 2502 may be one or more processors, and the communications unit 2501 may be an input/output interface, which is alternatively referred to as a communications interface, an interface circuit, an interface, or the like.

For an operation performed by the communications apparatus, refer to the operation performed by the terminal device in the method embodiments of this application. For example, reference may be made to the related descriptions of the terminal device in the embodiments corresponding to FIG. 5 to FIG. 24, and details are not described herein again.

Figure 26A:
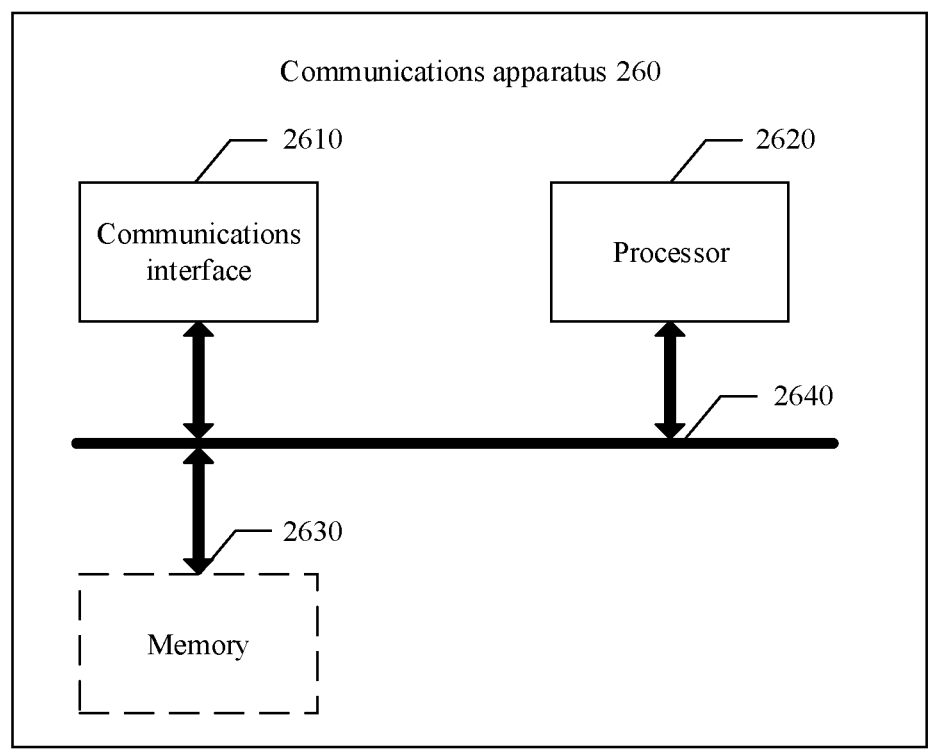
FIG. 26A is a schematic diagram of a structure of another communications apparatus according to an embodiment of this application.

FIG. 26A shows a communications apparatus 260 according to an embodiment of this application. The communications apparatus is configured to implement a function of the terminal device in the foregoing method. The apparatus may be a terminal device or an apparatus used in the terminal device. For example, the terminal device may be a mobile phone, a wearable device, a tablet computer, or the like. The apparatus used in the terminal device may be a chip system or a chip in the terminal device. The chip system may include a chip, or may include a chip and another discrete component. The apparatus 260 includes at least one processor 2620, configured to implement a data processing function of the terminal device in the methods provided in embodiments of this application. The apparatus 260 may further include a communications interface 2610, configured to implement sending and receiving operations of the terminal device in the methods provided in embodiments of this application. In embodiments of this application, the communications interface may be a transceiver, a circuit, a bus, a module, or a communications interface of another type, and is configured to communicate with another device by using a transmission medium. For example, the communications interface 2610 is used by an apparatus in the apparatus 260 to communicate with another device. The processor 2620 receives and sends data through the communications interface 2610, and is configured to implement the methods in the foregoing method embodiments.

The apparatus 260 may further include at least one memory 2630, configured to store program instructions and/or data. The memory 2630 is coupled to the processor 2620. The coupling in this embodiment of this application is an indirect coupling or a communication connection between apparatuses, units, or modules, may be in an electrical form, a mechanical form, or another form, and is used for information exchange between the apparatuses, the units, or the modules. The processor 2620 may cooperate with the memory 2630. The processor 2620 may execute the program instructions stored in the memory 2630. At least one of the at least one memory may be included in the processor.

In this embodiment of this application, a specific connection medium among the communications interface 2610, the processor 2620, and the memory 2630 is not limited. In this embodiment of this application, the memory 2630, the communications interface 2620, and the communications interface 2610 are connected by using a bus 2640 in FIG. 26A. The bus is represented by using a thick line in FIG. 26A. The foregoing is merely an example for description. A connection manner between other components is not limited thereto. The bus may be classified into an address bus, a data bus, a control bus, and the like. For ease of representation, only one thick line is used to represent the bus in FIG. 26A, but this does not mean that there is only one bus or only one type of bus.

When the apparatus 260 is specifically an apparatus used in a terminal device, for example, when the apparatus 260 is specifically a chip or a chip system, the communications interface 2610 may output or receive a baseband signal. When the apparatus 260 is specifically a terminal device, the communications interface 2610 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by a combination of hardware in the processor and a software module.

Figure 26B:
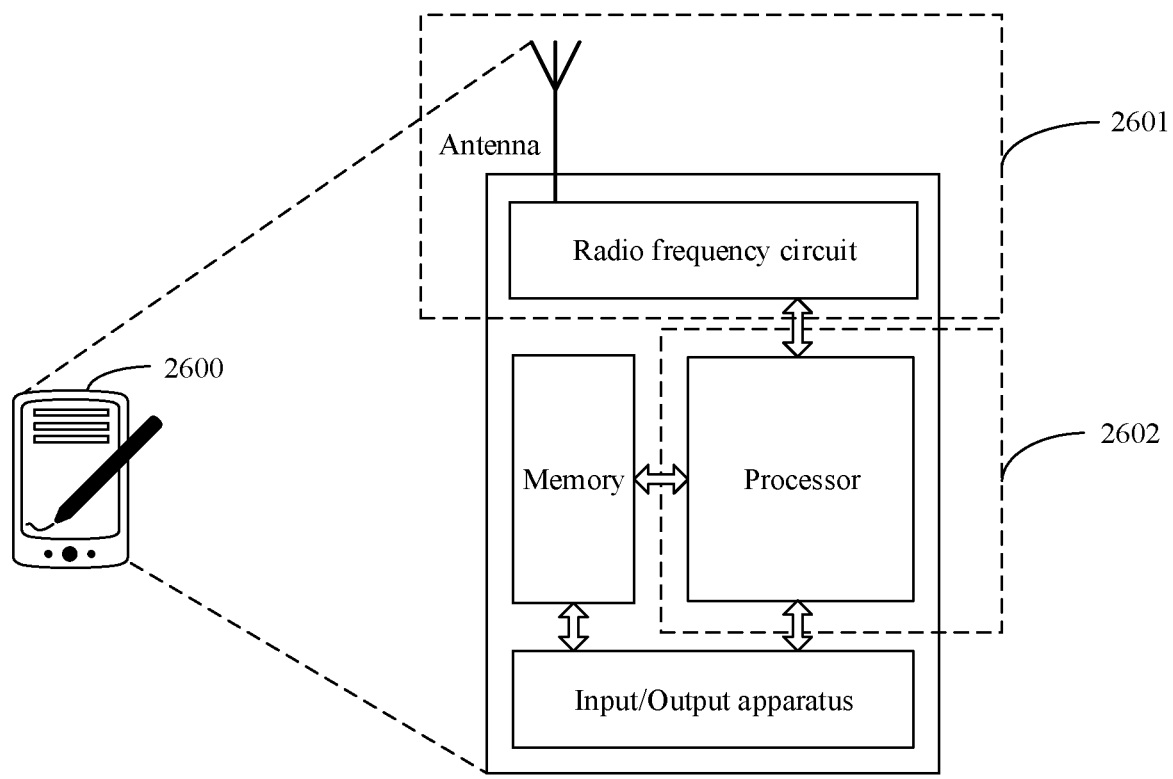
FIG. 26B is a schematic diagram of a structure of another communications apparatus according to an embodiment of this application.

For example, FIG. 26B is a schematic diagram of a structure of another terminal device 2600 according to an embodiment of this application. The terminal device may perform the operations performed by the terminal device in the foregoing method embodiments.

For ease of description, FIG. 26B shows only main components of the terminal device. As shown in FIG. 26B, the terminal device 2600 includes a processor, a memory, a radio frequency circuit, an antenna, and an input/output apparatus. The processor is mainly configured to: process a communications protocol and communication data, control the entire terminal device, execute a software program, and process data of the software program, for example, configured to support the terminal device in performing the procedures described in FIG. 5, FIG. 6, FIG. 9, and FIG. 12 to FIG. 24. The memory is mainly configured to store the software program and the data. The radio frequency circuit is mainly configured to: perform conversion between a baseband signal and a radio frequency signal, and process the radio frequency signal. The antenna is mainly configured to send/receive a radio frequency signal in a form of an electromagnetic wave. The terminal device 2600 may further include the input/output apparatus, such as a touchscreen, a display, or a keyboard, and is mainly configured to: receive data entered by a user, and output data to the user. It should be noted that some types of terminal devices may have no input/output apparatus.

After the terminal device is powered on, the processor may read a software program in a storage unit, explain and execute the software program, and process data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 26B shows only one memory and one processor. In an actual terminal device, there may be a plurality of processors and a plurality of memories. The memory may also be referred to as a storage medium, a storage device, or the like. This is not limited in embodiments of this application.

In an optional implementation, the processor may include a baseband processor and a central processing unit (central processing unit, CPU). The baseband processor is mainly configured to process a communications protocol and communication data. The CPU is mainly configured to: control the entire terminal device, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random access memory, RAM); or the memory may include a non-volatile memory (non-volatile memory), for example, a flash memory (flash memory), a hard disk drive (hard disk drive, HDD), or a solid-state drive (solid-state drive, SSD); or the memory may include a combination of the foregoing types of memories.

For example, in this embodiment of this application, as shown in FIG. 26B, the antenna and the radio frequency circuit that have a transceiver function may be considered as a communications unit 2601 of the terminal device 2600, and the processor having a processing function may be considered as a processing unit 2602 of the terminal device 2600.

The communications unit 2601 may also be referred to as a transceiver, a transceiver machine, a transceiver apparatus, or the like, and is configured to implement a transceiver function. Optionally, a component that is in the communications unit 2601 and that is configured to implement a receiving function may be considered as a receiving unit, and a component that is in the communications unit 2601 and that is configured to implement a sending function may be considered as a sending unit. In other words, the communications unit 2601 includes the receiving unit and the sending unit. For example, the receiving unit may also be referred to as a receiving machine, a receiver, a receiving circuit, or the like; and the sending unit may be referred to as a transmitting machine, a transmitter, a transmitting circuit, or the like.

In some embodiments, the communications unit 2601 and the processing unit 2602 may be integrated into one component, or may be separated as different components. In addition, the processor and the memory may be integrated into one component, or may be separated as different components.

The communications unit 2601 may be configured to perform receiving and sending operations of the terminal device in the foregoing method embodiments. The processing unit 2602 may be configured to perform a data processing operation of the terminal device in the foregoing method embodiments. Alternatively, the communications unit 2601 may be configured to perform an operation implemented by the communications unit 2501, and the processing unit 2602 may be configured to perform an operation implemented by the processing unit 2502.

Figure 27:
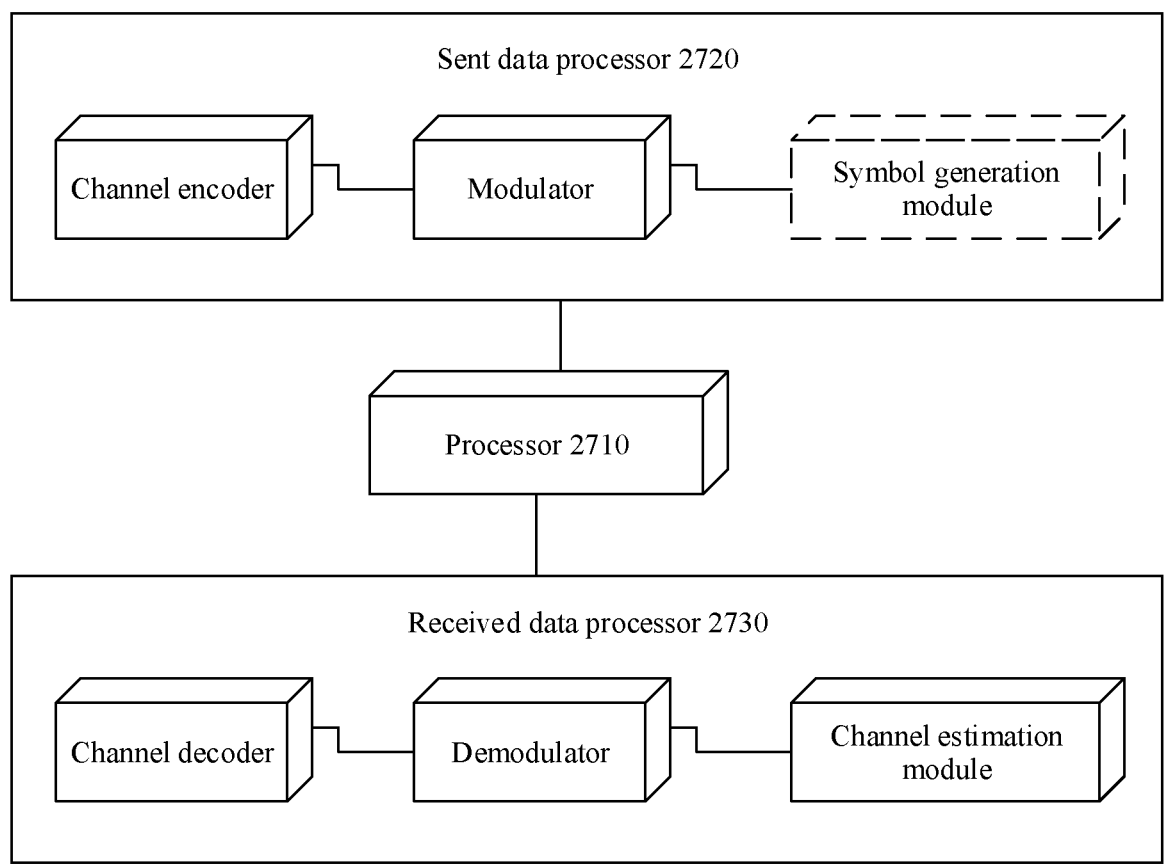
FIG. 27 is a schematic diagram of a structure of still another communications apparatus according to an embodiment of this application.

When the communications apparatus in this embodiment of this application is a terminal device, further refer to a device shown in FIG. 27. The device includes a processor 2710, a sent data processor 2720, and a received data processor 2730. The processing unit 2502 in the foregoing embodiment may be the processor 2710 in FIG. 27, and implements a corresponding function. The communications unit 2501 in the foregoing embodiment may be the received data processor 2730 in FIG. 27 and the sent data processor 2720 in FIG. 27. Although FIG. 27 shows a channel encoder and a channel decoder, it may be understood that these modules are merely examples, and do not constitute a limitation on this embodiment.

An embodiment of the present invention further provides a computer-readable storage medium. The computer-readable storage medium stores instructions. When the instructions are run on a processor, method procedures in the foregoing method embodiments are implemented.

An embodiment of the present invention further provides a computer program product. When the computer program product runs on a processor, method procedures in the foregoing method embodiments are implemented.

When the devices provided in this application are implemented by using software, all or some of the devices may be implemented in a form of a computer program product. The computer program product includes one or more computer instructions. When the computer program instructions are loaded and executed on a computer, the procedures or functions according to embodiments of this application are all or partially implemented. The computer may be a general-purpose computer, a dedicated computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Cross reference may be made to descriptions of embodiments provided in this application, and the descriptions of the embodiments have different focuses. For a part not described in detail in an embodiment, refer to related descriptions of another embodiment. For 7N ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A random access method, wherein the method comprises:
    performing, by a terminal device, first-type random access in a first bandwidth part, wherein the first bandwidth part is an active uplink bandwidth part;
    determining, by the terminal device, a first parameter, wherein the first parameter is a duration for performing the first-type random access in the first bandwidth part, or the first parameter is a quantity of times of sending a first-type random access message; and in response to determining that the first parameter is greater than a first threshold, performing, by the terminal device, random access in a second bandwidth part, wherein the second bandwidth part is an uplink bandwidth part, and the second bandwidth part is different from the first bandwidth part, wherein the first-type random access is one of grant-free random access, 2-step random access, or 4-step random access, wherein a random access message of the grant-free random access comprises uplink data carried on a physical uplink shared channel (PUSCH), a random access message of the 2-step random access comprises a preamble carried on a physical random access channel (PRACH) and uplink data carried on a PUSCH, and a random access message of the 4-step random access comprises a preamble carried on the PRACH.

2. The method according to claim 1, wherein the first-type random access is the 2-step random access, and the performing, by a terminal device, first-type random access in a first bandwidth part further comprises:
in response to determining that a random access transmission occasion (RO) resource that corresponds to the first-type random access and that is configured in the first bandwidth part is unavailable and a physical uplink shared channel transmission occasion (PO) resource corresponding to the RO resource is available,
sending, by the terminal device, a random access message to an access network device on the PO resource in the first bandwidth part, wherein the random access message comprises uplink data carried on the PUSCH.

3. The method according to claim 1, wherein the first-type random access is the 2-step random access, and the performing, by a terminal device, first-type random access in a first bandwidth part further comprises:
in response to determining that a RO resource that corresponds to the first-type random access and that is configured in the first bandwidth part is available and a PO resource corresponding to the RO resource is unavailable,
sending, by the terminal device, a random access message to an access network device on the RO resource in the first bandwidth part, wherein the random access message comprises a preamble carried on the PRACH.

4. The method according to claim 1, wherein the first-type random access is the 2-step random access, and the method further comprises:
in response to determining that a second parameter satisfies a first condition, performing, by the terminal device, first-type random access in the first bandwidth part, wherein the second parameter comprises at least one of a reference signal received power (RSRP) measurement value, a size of to-be-transmitted uplink data, a network status of random access, and a time difference measurement value; or
in response to determining that the second parameter satisfies a second condition, performing, by the terminal device, random access in the second bandwidth part, wherein the first condition is different from the second condition.

5. The method according to claim 1, wherein the first-type random access is the grant-free random access, and the method further comprises:
in response to determining that a timing advance (TA) timer does not expire or a TA status is valid, performing, by the terminal device, grant-free random access in the first bandwidth part; or
in response to determining that the TA timer expires or the TA status is invalid, performing, by the terminal device, random access in the second bandwidth part.

6. The method according to claim 1, wherein the first-type random access is the grant-free random access, and the method further comprises:
in response to determining that a second parameter satisfies a first condition, performing, by the terminal device, first-type random access in the first bandwidth part, wherein the second parameter comprises at least one of a RSRP measurement value, a size of to-be-transmitted uplink data, a network status of random access, and a time difference measurement value; or
in response to determining that the second parameter satisfies a second condition, performing, by the terminal device, random access in the second bandwidth part, wherein the first condition is different from the second condition.

7. The method according to claim 1, wherein a configuration of the first bandwidth part comprises a configuration parameter of the grant-free random access and a configuration parameter of the 2-step random access, and the first-type random access is the grant-free random access or the 2-step random access.

8. The method according to claim 7, wherein the first-type random access is the 2-step random access, and the method further comprises:
in response to determining that a TA timer does not expire or a TA status is valid, performing, by the terminal device, grant-free random access in the first bandwidth part; or
in response to determining that the TA timer expires, the TA status is invalid, a duration for performing grant-free random access in the first bandwidth part is greater than a second threshold, or a quantity of times of sending a random access message is greater than a second threshold, performing, by the terminal device, first-type random access in the first bandwidth part.

9. The method according to claim 7, wherein the first-type random access is the 2-step random access, and the method further comprises:
in response to determining that a second parameter satisfies a first condition, performing, by the terminal device, grant-free random access in the first bandwidth part, wherein the second parameter comprises at least one of a RSRP measurement value, a size of to-be-transmitted uplink data, a network status of random access, and a time difference measurement value;
in response to determining that a duration for performing grant-free random access in the first bandwidth part, a quantity of times of sending a random access message is greater than a second threshold, or the second parameter satisfies a second condition, performing, by the terminal device, first-type random access in the first bandwidth part; or
in response to determining that the second parameter satisfies a third condition, performing, by the terminal device, random access in the second bandwidth part, wherein the first condition, the second condition, and the third condition are different from each other.

10. The method according to claim 1, wherein a configuration of the first bandwidth part comprises a configuration parameter of the grant-free random access and a configuration parameter of the 4-step random access, and the first-type random access is the grant-free random access or the 4-step random access.

11. The method according to claim 10, wherein the first-type random access is the 4-step random access, and the method further comprises:

in response to determining that a TA timer does not expire or a TA status is valid, performing, by the terminal device, grant-free random access in the first bandwidth part; or in response to determining that the TA timer expires, the TA status is invalid, a duration for performing grant-free random access in the first bandwidth part is greater than a second threshold or a quantity of times of sending a random access message is greater than a second threshold, performing, by the terminal device, first-type random access in the first bandwidth part.

12. The method according to claim 10, wherein the first-type random access is the 4-step random access, and the method further comprises:

in response to determining that a second parameter satisfies a first condition performing, by the terminal device, grant-free random access in the first bandwidth part, wherein the second parameter comprises at least one of a RSRP measurement value, a size of to-be-transmitted uplink data, a network status of random access, and a time difference measurement value; or in response to determining that a duration for performing grant-free random access in the first bandwidth part is greater than a second threshold, a quantity of times of sending a random access message is greater than a second threshold, or the second parameter satisfies a second condition, performing, by the terminal device, first-type random access in the first bandwidth part, wherein the first condition is different from the second condition.

13. The method according to claim 1, wherein a configuration of the first bandwidth part comprises a configuration parameter of the grant-free random access, a configuration parameter of the 2-step random access, and a configuration parameter of the 4-step random access.

14. The method according to claim 13, wherein the first-type random access is the 4-step random access, and the method further comprises:

in response to determining that a TA timer does not expire, or a TA status is valid and a second parameter satisfies a first condition, performing, by the terminal device, grant-free random access in the first bandwidth part, wherein the second parameter comprises at least one of a RSRP measurement value, a size of to-be-transmitted uplink data, a network status of random access, and a time difference measurement value; or in response to determining that the TA timer expires, the TA status is invalid, the second parameter satisfies a second condition, a duration for performing grant-free random access in the first bandwidth part is greater than a second threshold, or a quantity of times of sending a random access message is greater than a second threshold, performing, by the terminal device, 2-step random access in the first bandwidth part; or in response to determining that if the second parameter satisfies a third condition, a duration for performing 2-step random access in the first bandwidth part is greater than a third threshold, or a quantity of times of sending a random access message is greater than a third threshold, performing, by the terminal device, first-type random access in the first bandwidth part, wherein the first condition, the second condition, and the third condition are different from each other.

15. The method according to claim 1, wherein before the performing, by a terminal device, first-type random access in a first bandwidth part, the method further comprises:

selecting, by the terminal device, the first-type random access; and determining, by the terminal device, the first bandwidth part from a plurality of uplink bandwidth parts, wherein the first bandwidth part is an uplink bandwidth part for which a configuration parameter of the first-type random access is configured.

16. The method according to claim 1, wherein a configuration of the second bandwidth part comprises one or more of a configuration parameter of the grant-free random access, a configuration parameter of the 2-step random access, or a configuration parameter of the 4-step random access.

17. A non-transitory computer storage medium, storing computer instructions that, when executed by a terminal device, cause the terminal device to perform:

performing first-type random access in a first bandwidth part, wherein the first bandwidth part is an active uplink bandwidth part;

determining a first parameter, wherein the first parameter is a duration for performing the first-type random access in the first bandwidth part, or the first parameter is a quantity of times of sending a first-type random access message; and in response to determining that the first parameter is greater than a first threshold, performing random access in a second bandwidth part, wherein the second bandwidth part is an uplink bandwidth part, and the second bandwidth part is different from the first bandwidth part, wherein the first-type random access is one of grant-free random access, 2-step random access, or 4-step random access, wherein a random access of the grant-free random access comprises uplink data carried on a physical uplink shared channel (PUSCH), a random access message of the 2-step random access comprises a preamble carried on a physical random free random access comprises uplink data carried on a physical uplink shared channel (PUSCH) access channel (PRACH) and uplink data carried on a PUSCH, and a random access message of the 4-step random access comprises a preamble carried on the PRACH.

18. The non-transitory computer storage medium according to claim 17, wherein the first-type random access is the 2-step random access, and the performing, by a terminal device, first-type random access in a first bandwidth part further comprises:

in response to determining that a random access transmission occasion (RO) resource that corresponds to the first-type random access and that is configured in the first bandwidth part is unavailable and a physical uplink shared channel transmission occasion (PO) resource corresponding to the RO resource is available, sending a random access message to an access network device on the PO resource in the first bandwidth part, wherein the random access message comprises uplink data carried on the PUSCH.

* * * * *

UNITED STATES PATENT AND TRADEMARK OFFICE
CERTIFICATE OF CORRECTION

PATENT NO. : 12,382,501 B2  
APPLICATION NO. : 17/707388  
DATED : August 5, 2025  
INVENTOR(S) : Shuangshuang Xing and Yiqun Wu Page 1 of 1

It is certified that error appears in the above-identified patent and that said Letters Patent is hereby corrected as shown below:

In the Claims

In Column 58, In Line 38, In Claim 17, after "access" insert -- message --.

In Column 58, In Line 42, In Claim 17, after "random" delete "free random".

In Column 58, In Line 43-44, In Claim 17, after "access" delete "comprises uplink data carried on a physical uplink shared channel (PUSCH) access".

Signed and Sealed this  
Thirtieth Day of December, 2025

John A. Squires  
*Director of the United States Patent and Trademark Office*